(12) United States Patent
Hatami-Hanza

(10) Patent No.: US 12,321,325 B2
(45) Date of Patent: Jun. 3, 2025

(54) KNOWLEDGEABLE MACHINES AND APPLICATIONS

(71) Applicant: Hamid Hatami-Hanza, Thornhill (CA)

(72) Inventor: Hamid Hatami-Hanza, Thornhill (CA)

(73) Assignee: Hamid Hatami-Hanza, Thornhill (CA)

( * ) Notice: Subject to any disclaimer, the term of this patent is extended or adjusted under 35 U.S.C. 154(b) by 69 days.

(21) Appl. No.: 17/080,245

(22) Filed: Oct. 26, 2020

(65) Prior Publication Data

US 2021/0073191 A1 Mar. 11, 2021

Related U.S. Application Data

(60) Continuation-in-part of application No. 15/589,914, filed on May 8, 2017, now Pat. No. 10,846,274, and
(Continued)

(30) Foreign Application Priority Data

Jul. 26, 2007 (CA) ................................ CA 2595541

(51) Int. Cl.
*G06F 16/22* (2019.01)
*G06F 16/25* (2019.01)
(Continued)

(52) U.S. Cl.
CPC .............. *G06F 16/22* (2019.01); *G06F 16/25* (2019.01); *G06F 16/358* (2019.01); *G06F 16/367* (2019.01); *G06N 5/022* (2013.01)

(58) Field of Classification Search
CPC ........ G06F 16/22; G06F 16/25; G06F 16/358; G06F 16/367; G06N 5/022
See application file for complete search history.

(56) References Cited

U.S. PATENT DOCUMENTS 6,389,405 B1 * 5/2002 Oatman .................... G06N 5/04
706/50
6,711,585 B1 * 3/2004 Copperman .......... G06F 16/313
707/E17.084

(Continued)

OTHER PUBLICATIONS

S. Qiu, H. Wang and L. Cui, "A New Concept Relatedness Measure of Heterogeneous Ontologies in Collaborative System," 2007 11th International Conference on Computer Supported Cooperative Work in Design, Melbourne, VIC, Australia, 2007, pp. 663-668 (Year: 2007).*

(Continued)

*Primary Examiner* — Dennis Truong

(57) ABSTRACT

The present invention discloses methods, systems, and tools to extract the usable knowledge from a body of knowledge and build computer/machine useable data structures stored in one or more non-transitory storage media. The body of knowledge is regarded as a composition of ontological subjects (OSs) of different orders. Using the participation information of the OSs into each other, one or more association strength matrices and/or conditional occurrence probability matrices and/or ontological subject maps are built from which the value significance, information content, and type and strength of the relationship of the partitions (i.e. OSs of different orders) of the composition are calculated and learned. The methods systematically build one or more data structures carrying the actionable knowledge from a body of knowledge and enables one to build knowledgeable and context aware systems and machines for various desired applications. Exemplary systems and machines, for implementing the methods and some exemplary applications and services, are disclosed.

14 Claims, 27 Drawing Sheets

Related U.S. Application Data a continuation-in-part of application No. 15/805,629, filed on Nov. 7, 2017, now Pat. No. 10,885,073, said application No. 15/589,914 is a continuation of application No. 13/789,635, filed on Mar. 7, 2013, now Pat. No. 8,983,897, and a continuation of application No. 12/179,363, filed on Jul. 24, 2008, now abandoned, and a continuation of application No. 13/740,228, filed on Jan. 13, 2013, now Pat. No. 9,183,505, and a continuation of application No. 14/151,022, filed on Jan. 9, 2014, now Pat. No. 9,613,138, and a continuation of application No. 14/274,731, filed on May 11, 2014, now abandoned, and a continuation of application No. 14/018,102, filed on Sep. 4, 2013, now abandoned, which is a continuation of application No. 12/908,856, filed on Oct. 20, 2010, now abandoned, and a continuation of application No. 13/608,333, filed on Sep. 10, 2012, now Pat. No. 9,070,087, said application No. 13/789,635 is a division of application No. 12/547,879, filed on Aug. 26, 2009, now Pat. No. 8,452,725, said application No. 13/740,228 is a division of application No. 12/939,112, filed on Nov. 3, 2010, now Pat. No. 8,401,980, said application No. 14/151,022 is a division of application No. 13/962,895, filed on Aug. 8, 2013, now Pat. No. 8,793,253, which is a division of application No. 12/755,415, filed on Apr. 7, 2010, now Pat. No. 8,612,445, said application No. 14/274,731 is a continuation of application No. 12/955,496, filed on Nov. 29, 2010, now Pat. No. 8,775,365, said application No. 14/018,102 is a division of application No. 12/946,838, filed on Nov. 15, 2010, now Pat. No. 8,560,599, said application No. 15/589,914 is a continuation-in-part of application No. 14/616,687, filed on Feb. 7, 2015, now Pat. No. 9,679,030.

(60) Provisional application No. 61/546,054, filed on Oct. 11, 2011, provisional application No. 61/311,368, filed on Mar. 7, 2010, provisional application No. 61/263,685, filed on Nov. 23, 2009, provisional application No. 61/259,640, filed on Nov. 10, 2009, provisional application No. 61/253,511, filed on Oct. 21, 2009, provisional application No. 61/177,696, filed on May 13, 2009, provisional application No. 61/093,952, filed on Sep. 3, 2008.

(51) Int. Cl.
*G06F 16/358* (2025.01)
*G06F 16/36* (2019.01)
*G06N 5/022* (2023.01)

(56) References Cited

U.S. PATENT DOCUMENTS

| | | | | |
|---|---|---|---|---|
| 2003/0163597 | A1* | 8/2003 | Hellman | G06F 16/84 707/E17.058 |
| 2004/0083206 | A1* | 4/2004 | Wu | G06F 16/951 |
| 2006/0053172 | A1* | 3/2006 | Gardner | G06N 5/02 707/999.203 |
| 2006/0053175 | A1* | 3/2006 | Gardner | G16H 70/00 707/999.203 |
| 2006/0112045 | A1* | 5/2006 | Talbot | G06N 7/01 706/46 |
| 2006/0242147 | A1* | 10/2006 | Gehrking | G06F 16/353 |
| 2007/0192272 | A1* | 8/2007 | Elfayoumy | G06F 16/36 706/55 |
| 2011/0264649 | A1* | 10/2011 | Hsiao | G06N 5/022 707/739 |
| 2012/0166372 | A1* | 6/2012 | Ilyas | G06N 7/01 706/14 |
| 2013/0041921 | A1* | 2/2013 | Cooper | G06F 16/90335 707/E17.099 |

OTHER PUBLICATIONS

Song, Min, et al. "Integration of association rules and ontology for semantic-based query expansion." Data and Knowledge Engineering (2006). (Year: 2006).*

* cited by examiner $$asm_{ij}^{k|l} = f\left(com_{ij}^{k|l}, vsm_i^{k|l}, vsm_j^{k|l}\right) \dots \quad i,j = 1 \dots N$$

$vsm_i^{k|l}$: value significance of $OS_i^k$ $com_{ij}^{k|l}$: co-occurance number of $OS_i^k$ with $OS_j^k$ in $OS^l$'s $asm_{ij}^{k|l}$: value of an association strength mesaure of $SC_i^k$ with $OS_j^k$ $$ASM^{k|k} = \begin{array}{c} \\ OS_1^k \\ \\ OS_i^k \\ \\ OS_N^k \end{array} \overset{\begin{array}{ccccc} OS_1^k & & OS_j^k & & OS_N^k \end{array}}{\begin{pmatrix} asm_{11}^{kk} & \cdots & asm_{1j}^{kk} & \cdots & asm_{1N}^{kk} \\ \vdots & & \vdots & & \vdots \\ asm_{i1} & \cdots & asm_{ij} & \cdots & asm_{iN} \\ \vdots & & \vdots & & \vdots \\ asm_{N1} & \cdots & asm_{Nj} & \cdots & asm_{NN} \end{pmatrix}} \rightarrow RVSM\_2_i^{k|k}$$

$\searrow RVSM\_1_j^{k|k}$ $$\left(RVSM\_1_{j,:}^{l \rightarrow k|k}\right)^T = \left(PM^{kl}\right)^T \times RVSM\_1_j^{k|k} =$$

$$\begin{array}{c} OS_1^l \\ \vdots \\ OS_j^l \\ \vdots \\ OS_M^l \end{array} \overset{\begin{array}{ccccc} OS_1^k & \cdots & OS_i^k & \cdots & OS_N^k \end{array}}{\begin{pmatrix} pm_{11}^{kl} & \cdots & pm_{1i}^{kl} & \cdots & pm_{1N}^{kl} \\ \vdots & & \vdots & & \vdots \\ pm_{j1}^{kl} & \cdots & pm_{ji}^{kl} & \cdots & pm_{jN}^{kl} \\ \vdots & & \vdots & & \vdots \\ pm_{1M}^{kl} & \cdots & pm_{Mi}^{kl} & \cdots & pm_{MN}^{kl} \end{pmatrix}} \times RVSM\_1_j^{k|k}$$

$$\left(RVSM\_2_{i,:}^{l \rightarrow k|k}\right)^T = \left(RVSM\_2_i^{k|k}\right) \times PM^{kl} = \left(RVSM\_2_i^{k|k}\right) \times$$

$$\begin{array}{c} OS_1^l \\ \vdots \\ OS_j^l \\ \vdots \\ OS_M^l \end{array} \overset{\begin{array}{ccccc} OS_1^k & \cdots & OS_i^k & \cdots & OS_N^k \end{array}}{\begin{pmatrix} pm_{11}^{kl} & \cdots & pm_{1i}^{kl} & \cdots & pm_{1N}^{kl} \\ \vdots & & \vdots & & \vdots \\ pm_{j1}^{kl} & \cdots & pm_{ji}^{kl} & \cdots & pm_{jN}^{kl} \\ \vdots & & \vdots & & \vdots \\ pm_{1M}^{kl} & \cdots & pm_{Mi}^{kl} & \cdots & pm_{MN}^{kl} \end{pmatrix}}$$

FIG. 6

KNOWLEDGEABLE MACHINES AND APPLICATIONS

CROSS-REFERENCED TO RELATED APPLICATIONS

The present application is a continuation in part of and claims the benefits of the U.S. patent application Ser. No. 15/589,914, filed on May 8, 2017, entitled "ONTOLOGICAL SUBJECTS OF A UNIVERSE AND KNOWLEDGE REPRESENTATIONS THEREOF" and the U.S. patent application Ser. No. 15/805,629, filed on Nov. 7, 2017, entitled "ASSOCIATION STRENGTHS AND VALUE SIGNIFICANCES OF ONTOLOGICAL SUBJECTS OF NETWORK AND COMPOSITIONS" which are all herein incorporated by reference in their entirety for all purposes.

FIELD OF INVENTION

This invention generally relates to information processing, ontological subject processing, knowledge processing and discovery, knowledge retrieval, artificial intelligence, information theory, natural language processing and the applications.

BACKGROUND OF THE INVENTION

With the recent advent of artificial intelligence and the resulting applications therefrom, systems with broader intelligent capabilities am desired.

SUMMARY OF THE INVENTION

A knowledgeable machines/systems can speed and increase the accuracy of the processes research, knowledge discovery, investigations, decision making, and construction of intelligent systems in general. To achieve and arrive at such systems, it is important to identify the role of concepts, entities, any force, and their relations in one or more system of knowledge.

By the system of knowledge we mean a body of knowledge in any field, narrow or wide. For instance a system of knowledge can be defined about the process of stem cell differentiation. In this example there are many unknowns that are desired to be known. So consider someone has collected many or all textual compositions about this subject. Apparently the collections contains many useful information about the subject that are important but can easily be overlooked by a human due to the limitations of processing capability and memory capacity of individuals' brains.

Moreover any system, simple or complicated, can be identified and explained by its constituent parts and the relation between the parts. Additionally, any system or body of knowledge can also be represented by network/s or graph/s that shows the connection and relations of the individual parts of the system. The more accurate and detailed the identification of the parts and their relations the better the system is defined and designed and ultimately the better the corresponding tangible systems will function.

Most of the information about any type of existing or new systems can be found in the body of many textual compositions. Nevertheless, these vast bodies of knowledge are unstructured, dispersed, and unclear for non expert in the field.

Therefore it is desirable to have method, systems, and apparatuses that can identify any system or body of knowledge by identifying the most valuable and significant, or conceived to be important at the time, parts in that system along with various types of their relationship. In other words, it is highly desirable to find out the "value significances" and relations or associations of parts and partitions of a system or body of knowledge.

Such a method will speed up the research process and knowledge discovery, and design cycles by guiding the users to know the substantiality of each part in the system. Consequently dealing with all parts of the system based on the value significance priority or any other predetermined criteria can become a systematic process and more yielding to automation.

Application of such methods and systems would be many and various. For example lets say after or before a conference, with many expert participants and many presented papers, one wants to compare the submitted contributing papers, draw some conclusions, and/or get the direction for future research or find the more important subjects to focus on, he or she could use the system, employing the disclosed methods, to find out the value significance of each concept along with their most important associations and interrelations. This is not an easy task for those who do not have many years of experience and a wide breadth of knowledge.

Or consider a market research analyst who is assigned to find out the real value of an enterprise by researching the various sources of information. Or rank an enterprise among its competitors by identifying the strength and weakness of the enterprise constituent parts or partitions.

Many other consecutive applications such as searching engines, summarization, distillation, etc. can be performed, enhanced, and benefit from having an estimation of the value significance of the partitions of the body of knowledge.

In the patent application Ser. No. 12/547,879 entitled "System and Method of Ontological Subject Mapping for knowledge Processing Applications" filed on Aug. 26 2009 by the same applicant, a method and system was disclosed to transform the information of compositions into representative graphs called "Ontological Subject Maps (OSM)". The map is not only useful for graphical representation of the body of knowledge of the input but also can be used to evaluate the value significances of the OSs (OS stands for Ontological Subjects such as words used in the textual composition) in the graph as explained in the patent application Ser. No. 12/547,879. The value significance of the lower order OSs can be evaluated satisfactorily well pronounced and be used for desirable applications. However, the algorithm and the method demand a considerable processing power when the desired number of OSs becomes large.

Also in the patent application Ser. No. 12/755,415 filed on Apr. 7 2010 by the same applicant, the concept of "Semantic Coverage Extent Number (OSEN)" was introduced as one of the significance measures of the parts and the partitions of a composition. The significance ranking method was based first by transforming the information of an input composition into numerical matrixes called "Participation Matrices (PMs)" from which, for example, the similarities of Ontological Subjects (OSs or partitions of the composition) can be estimated. It was shown that transforming the information of an input composition into participation matrices is very instrumental in evaluating the semantic importance or value significance of the partitions of the composition. The method makes the calculation straightforward and very effective while making the usage of memories and processing power much more efficient.

However proposing other fundamental measures of significances, or more process efficient, or other measures of significances with high contrast or higher semantic clarity can be helpful. The different measures can be used in different circumstance and complexities depend on the demanded quality of semantic clarity and relevancy of results, processing power, storage medium, and the applications.

In this disclosure various "Value Significance Measures (VSMs)" are introduced which are regarded as the intrinsic and signs of significance of an ontological subject within the composition that the OS has been appeared. These significance measures further is interpreted as the semantic importance, economical value, market value or market price, influence and importance of a feature or functional significance in a complex systems including man-made or biological systems, all types of multimedia compositions and their representation be it electrical signal representation or otherwise. In particular, the VSMs introduced here take into account the information of participation patterns of OSs of the composition into each other or with each other in a network of ontological subjects such as connected group of people, networks or graph of related concepts, semantics, or physical systems and so on.

The method transforms the information of compositions of ontological subject into matrices and the graphs or networks coresponding to the proposed matrices. Since the OS can refer to any and all the things in the universe, the resultant graph can be applied for and to any graphs of entities such as social networks, a network of players and products and concepts in a particular industry, genomics, compositions of genetic codes, or any particular area of knowledge and science etc. In similar manner any composition of Ontological subjects can be viewed as a social network or vice versa which is important to evaluate the value of each member or any sub-group member of the network in order to analysis and process other features of interest such as influence, economical value, likelihood of new discovery, knowledge discovery, new composition generation, summarization, distillation, search engines, keyword identification, and the like.

We use texts as our available and vast sources of information that are available on the internet or corporate databases. Using the textual contents we then can build various "participation matrices" and many graphs for all type of ontological subjects and orders and start processing the information in an effective way utilizing the ever increasing processing power and decreasing cost of storage of modern computers and computer systems and networks.

Using the concepts and definitions introduced in the in the patent application Ser. No. 12/755,415 filed on Apr. 7 2010, entitled "System And Method For A Unified Semantic Ranking Of Compositions Of Ontological Subjects And The Applications Thereof" which is incorporated herein as reference and cited before; one can consider the textual compositions as compositions of Ontological Subjects. As it will follow in the definition section in this disclosure the Ontological Subjects, OSs for short, are strings of character that refer to any entity, object or concept, of interest. Therefore in this disclosure the proposed problem of assigning value to any knowable entity of interest in a system of knowledge reduces to assigning a quantitative value to OSs of a composition or collection of compositions that form a system of knowledge.

Furthermore according to the definitions, sets of ontological subjects (OSs) are ordered based on their length and function. For instance, for ontological subjects of textual nature, one may characterizes letters and characters as zeroth order OS, words as the first order, sentences as the second order, paragraphs as the third order, pages or chapters as the forth order, documents as the fifth order, corpuses as the sixth order OS and so on. Equally and in a similar manner one can order the genetic codes in different orders of ontological subjects.

Although for the sake of clarification and ease of explanation we focus on the ontological subjects of textual nature and mostly for natural language texts for their importance, one can easily extend the teachings of the method and the associated system to other forms of ontological subject of different nature for the corresponding applications. For instance, in genomics applications the method can be readily and effectively used for fast DNA analysis, ranking and determining the valuable or interesting partitions of the genome, discovering dominant genes, sketching gene spectrum, as well as other genetic engineering applications such as fast genomic summarization, fast genomics identification and fast genetic engineering and the like. Moreover, for other equally important applications the method and system can be extended and used. For example, in signal processing applications the method and the associated system/s may be employed for variety of applications such as voice and video recognition, voice and video/image comparison, feature extraction, picture/image recognition such as face or scene recognition and the like.

Accordingly, we regard any textual composition as a network of OSs that have connections to other OSs that can also be represented by a graph and the corresponded adjacency matrices for numerical processing of the resulting graphs or the networks of the OSs of the composition.

In this disclosure the evaluation of the "Value Significance Measures (VSM)" of OSs of different length, i.e. order, is done by breaking a high order OS, e. g. a text composition, into its lower order constituent OSs. Thereafter, constructing at least one Participation Matrix (PM), by indicating the participation of a number of OSs, having lower order, into a number of OSs having usually a higher order. So if one indicates the rows of the PM with the lower order constituent OSs, then the column of the PM, i.e. a vector having preferably at least one non-zero entry, represents the higher order OSs.

The Participations Matrices offer a number of important advantages which includes versatility, ease and efficiency of storage usage and speeding the numerical processes for natural language or in general Ontological Subject processing applications as is demonstrated in this invention. For instance having evaluated the VSM of lower order OSs, which would be a vector, make it easy to evaluate the VSM of higher order OSs (a higher order OS of the composition is in fact a partition of the composition, or a subsystem of the system of knowledge) only by a matrix×vector multiplication.

For example, in one exemplary embodiment of the method, the PM is used to obtain the co-occurrences of each pair of OS in the partitions of the composition. The self-occurrences (the diagonal of the Co-Occurrence Matrix (COM)) is in fact the Frequency of Occurrence (FO) of each OS and can be regarded as one of the "Value Significance Measures" (VSMs) of a lower OS in the composition.

In another important embodiment, using the PMs we proceed to introduce and define an "Association Strength Matrix (ASM)". The association strength is defined as function of co-occurrence of each two OSs divided by the ratio of their probability of occurrences in the composition. The association strength is not symmetric and is shown to be an effective concept and method to identify the value of each OSs in the composition by taking into account the actual patterns of participation of the OSs in the partitions of the composition. The ASM can be represented graphically by an asymmetric and directed graph and network of OSs.

Having obtained the Association Strength Matrix (ASM) the method and algorithm is provided to obtain another important Value Significance Measure which is called the "Association Significance Number (ASN)" of each OS. The ASN is obtained by summing the ASM over one of the dimension and basically shows the cumulative association bonding strength of other OSs to each particular OS. The ASN is less noisy than the FO and take into account the usage or participation patterns of the OSs in the composition.

Additionally using the ASM we introduce the concept of information contribution and particularly the "Differential Conditional Entropy Measure (DCEM)" as an indication of informational contribution of each OSs by considering the difference between the conditional entropy of each $OS_i$ given the rest of participant OSs of the composition and the conditional entropy of the rest of participant OSs given the ith OS. Several other Value Significance Measures (VSMs) have intermediately introduced and their effectiveness are compared by way of exemplary implementations of the method and the algorithms. These measures can yield better clarity that take into account the usage of patterns of participation of the OSs in the composition.

In these preferred embodiments the VSMs of lower order OSs are first evaluated from which the VSMs for higher order OSs can be conveniently calculated. The VSM of a lower order OS is an indication of significance of the role of that OS in the system or body of knowledge that is being investigated. These embodiments are particularly important and useful for those applications that the knowledge of importance of the lower order OSs is crucial such as the applications in the genetics engineering in which the impact and importance of individual parts of the DNA is important for synthesizing or engineering a new gene or knowledge of individual genes are important to study the whole genome.

In accordance with another aspect of the invention the Participation Matrix is used again to obtain Association Strength Matrix (ASM) and conditional occurrence probabilities (COP) to consequently build the Ontological Subject Map (OSM) or graph. The OSM can be built from the information of ASM and employing the method and the algorithm that was introduced and explained in the patent application Ser. No. 12/547,879 entitled "System and Method of Ontological Subject Mapping for knowledge Processing Applications" filed on Aug. 26 2009 by the same applicant. The map is not only useful for graphical representation or the context of the body of knowledge of an input composition, but also can be used to evaluate the value significances of the OSs in the graph as explained in the patent application Ser. No. 12/547,879. Using the ASM, introduced in this application, can also result in better justified Ontological Subject Map (OSM) and the resultant calculated OSs significance value.

Having obtained the VSMs of the lower order OSs one can readily evaluate the VSMs for higher order OSs utilizing the PMs. The VSM of higher order OSs in fact show the importance and significance of the role of that partition in the system of knowledge that is being investigated.

The VSMs then can be employed in many applications. Therefore, in essence using the participation information of a set of lower order OSs into a set of the same or higher order OSs, one has a unified method and process of evaluating the value significance of Ontological Subject of different orders used in a system of knowledge. Depends on the desired application one can use the applicable and desirable embodiments for the intended application such as web page ranking, document clustering, single and multi-document summarization/distillation, question answering, graphical representation of the compositions, context extraction and representation, knowledge discovery, novelty detection, composing new compositions, engineering new compositions, composition comparison, as well as other areas such as genetic analysis and synthesize, signal processing, economics, marketing and the like.

Accordingly, using the teachings of the current disclosure and incorporated references, (for example the incorporated reference the U.S. patent application Ser. No. 13/608,333 filed on Sep. 10, 2012, entitled "METHODS AND SYSTEMS FOR INVESTIGATION OF COMPOSITIONS OF ONTOLOGICAL SUBJECTS") we become able to construct knowledgeable machines/systems that can assist a client (e.g. another system, machine, or a human client) to achieve various objectives such as man-machine conversations, knowledge discovery, robotics, question answering, visualization of body of data or knowledge, instructing one or more artificial limbs or beings, and the like.

In another aspect the invention provides systems comprising computer hardware, software, internet infrastructure, and other customary appliances of an E-business and cloud computing and services to perform and execute the said method in providing a variety of services for a client/user's desired applications utilizing the knowledgeable systems and machines.

BRIEF DESCRIPTION OF THE DRAWINGS

FIG. 1a, shows the internet as one composition (the largest) trying to describe our universe, and FIG. 1b, shows that any other composition can also be viewed as an attempt to describe a smaller universe, i.e. its own universe.

FIG. 3c more clearly shows the effectiveness and differences for different VSM measures applied on an exemplary sample textual body of data.

FIG. 5a: is a flow diagram of constructing OSMs of a composition in the context of universe 1 and universe; and FIG. 5b: is another flow diagram of constructing OSMs of a composition in the context of universe 1 and universe 2, wherein more associated OS has been added to the OSs of the input composition.

FIG. 6: shows one exemplary instance of implementing the formulations and algorithm/s illustrating one way of using the "participation matrix" (PM) and the "association strength matrix" (ASM) to calculate two different types of the associations strength of the OSs of order 2 to the OSs of the order 1, according to one embodiment of the present invention. This figure is to demonstrate the use of various VSM vectors (filters) in the calculations.

DETAILED DESCRIPTION

Figure 1A:
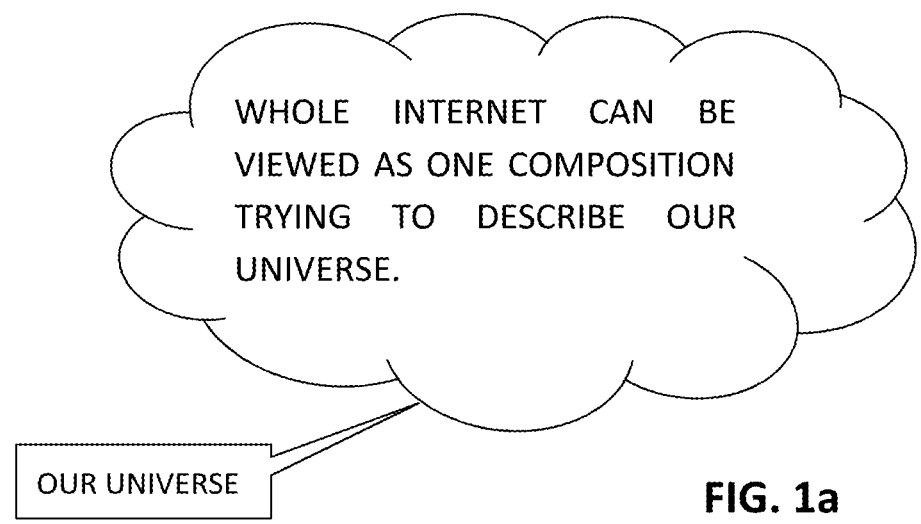
FIGS. 1a and 1b: illustrate the concept of viewing compositions as attempts to describe their own universes.
Figure 1B:
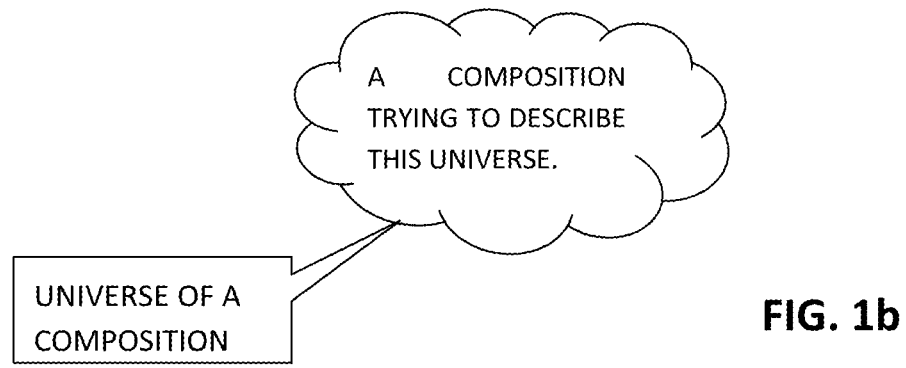

A system of knowledge, here, means a composition or a body of knowledge or a body of data (as will be referred from time to time) in any field, narrow or wide, composed of data symbols such as alphabetical/numerical characters, any array of data, binary or otherwise, or any string of characters/data etc.

As defined along this disclosure, the constituent parts of the bodies of knowledge are called "Ontological subjects" (OSs). The ontological subjects further are grouped into different sets assigned or labeled with orders as will be explained in the definition of section of this disclosure.

An example of a body of knowledge according to the given definitions is a picture or a video signal. A picture or a video frame consists of colored pixels that have participated in a picture to form and convey the information about the picture. Apparently some colored pixels of the picture are more significant in that picture. Moreover their combination or the way or the pattern that they participate together in any small parts or segments of that picture are also important in the way the pixels are conveying the information about the picture to an observer's eyes or a camera.

Yet example of a composition or a body of knowledge could be a string of genetic codes, a DNA string, or a DNA strand, and the like.

Moreover any system, simple or complicated, can be identified and explained by its constituent parts and the relation between the parts. Additionally, any system or body of knowledge can also be represented by network/s or graph/s that shows the connection and relations of the individual parts of the system. The more accurate and detailed the identification of the parts and their relations the better the system is defined and designed and ultimately the better the corresponding tangible systems will function. Most of the information about any type of existing or new systems can be found in the body of many textual compositions. Nevertheless, these vast bodies of knowledge are unstructured, dispersed, and unclear for non-expert in the field.

The present invention is to build knowledgeable system and machines by investigation such bodies of knowledge for various practical purposes. Moreover as will be explained we consider a body of knowledge as a composition of ontological subjects of different orders and the system of knowledge is viewed as the navigation trajectories of one or more of ontological subjects (possibly of different order) in a state space. Knowing or finding out how and/or when and/or why a ontological subjects of particular order is moved from one point (a set of ontological subjects of particular order can form a state space and a point in a state space/s is a ontological subjects of body of data having a predefined order) to another point, enables us to build machines that can navigate thrugh such space reliably and rationally.

The purpose of the investigation is to model and gain as much information and knowledge about an unknown system comprised of ontological subjects while at least one source of the information about such a systemis a given composition of ontological subjects wherein the composition is readable by a computer. Therefore, some information about such an unknown system is supposedly embedded in a body of knowledge or system of knowledge or generally in the given composition. The investigator, hence, will have to be able to capture or produce as much knowledge about the system from the information in the given composition.

Consequently, according to the present disclosure, the investigation is performed according to at least one important aspect in the investigation of bodies of knowledge (i.e. compositions).

The "important aspects of the investigation", can, for example, be one or more of the following objectives:

1. identifying and recognizing the most significant constitutes parts of the bodies of knowledge according to at least one "significance aspect", 2. identifying the associated constituent parts of the bodies of knowledge, and 3. building ontological subjects maps (OSM) which is regarded as the knowledge graph corresponding to the universe of the body of knowledge, and 4. identifying and/or finding (through discovery and/or reasoning) the informative constituent parts and informative combinations of the constituent part of the composition by, for example, finding or composing the expressions that show a relationship between two or more of constituent parts of the bodies of knowledge; and 5. building a knowledgeable system which can navigate through state space in response to an input/query and composing one or more responses in the desired form.

Each of these "important aspect" or stages (1, 2, 3, 4, and 5 in the above) of the investigation, of course, can further be break down to two or more stages or steps or be combined together to perform a desirable investigation goal or to define the "investigation important aspect".

Therefore depends on the goal of the investigation the "investigation important aspect" can be defined and performed in more detailed processes. The present invention gives a number of such investigation goals and the methods of achieving the desired outcome. Moreover, the present invention provides a variety of tools and investigation methods that enables a user to deal with the task of investigations of compositions of ontological subjects for any kind of goals and any types of the composition.

The "significance aspects", based on which the significances of the OSs of compositions are defined and calculated, are various that can be looked at. For instance one "significance aspect" could be an intrinsic significance of an OS which shows the overall or intrinsic significance of an OS in a body of knowledge. Another significance aspect can be considered to be a significant aspect in relation or relative to one or more of the OSs of the body of knowledge.

Yet another significance aspect is considered to be an intrinsic novelty value of a OS in a body of knowledge or a composition. And yet another significance aspect is defined as a relative or relational novelty value of a OS related to one or more of the OSs of the body of knowledge or a composition.

Many other desirable significance aspects might be defined by different people depends on the application and the goal of the investigation of a composition or body of knowledge. Also any combinations of such significance aspects can be regarded as a significance aspect.

Accordingly a "significance aspect" is the orientation that one can use to reason on how to put a significance value on a ontological subjects of a composition or a body of knowledge.

In other words, a significance aspect is a qualitative quality that can polarize or differentiate the ontological subjects and be used to define value significance measures and consequently suggest or construct various value functions or significance weighting functions on the ontological subjects of a composition or a body of knowledge.

These functions, individually or in combination, therefore can be employed and utilized to spot and/or filter out one or more ontological subjects of a composition or a body of knowledge for different purposes and applications or generally for investigation of bodies of knowledge.

For instance, in accordance with one aspect of the present disclosure for investigation of the compositions of ontological subjects, a general form of evaluating "value significances" of the ontological subjects of a composition or a body of knowledge or a network is given along with a number of exemplified such value significances and their applications.

Furthermore exemplary algorithms and systems are given to be used for providing the respective data and/or such application/s as one or more services to the computer program agents as well as human users.

As will be explained in next section, having constructed one or more data structures (e.g. arrays of data) indicative of relations of constituent part, it will become necessary and desirable to spot the significant part and/or separate the parts that their significance is defined in relation to a target part. Thereby relational value significances are defined here. The relational value significances are instrumental in clustering a collection of compositions or clustering partitions of a composition in regards to one or more of a target OS or the parts of the system of knowledge.

Such a method will speed up the research process and knowledge discovery, and design cycles by guiding the users to know the substantiality of each part in the system. Consequently dealing with all parts of the system based on the value significance priority or any other predetermined criteria can become a systematic process and more yielding to automation.

Applications of such methods and systems would be many and various. For example let's say after or before a conference, with many expert participants and many presented papers, one wants to compare the submitted contributing papers, draw some conclusions, and/or get the direction for future research or find the more important subjects to focus on, he or she could use the system, employing the disclosed methods, to find out the value significance of each concept along with their most important associations and interrelations. This is not an easy task for the individuals who do not have many years of experience and a wide breadth of knowledge in the respective domain of knowledge.

Or consider a market research analyst who is assigned to find out the real value of an enterprise by researching the various sources of information. Or rank an enterprise among its competitors by identifying the strength and weakness of the enterprise constituent parts or partitions.

Many other consecutive applications such as searching engines, summarization, distillation, etc. can be performed, enhanced, and benefit from having an estimation of the value significance of the partitions of the body of knowledge and a thorough investigation method of such compositions.

A particular case of interest in this disclosure is system of knowledge composed of various types of data and symbols which is gathered by an artisan to use as training or learning material to build autonomous machines of high utility such as autonomous moving robots (e.g. a self-driving car). As described in the next section such system of knowledge or body of data is gathered. for instance through recording all types of sensory data, control data, environmental data, visual data command data, conversation, and natural language text or speeches and all types of such conceivable and desired forms of data that are present or relevant during the course of data recording and gathering. For instance one may desire to gather all such data from a car which is driven by one or more human drivers and collect the data, as exemplified, during a 1000 hours derive in various situations, context, environments, etc.

Obviously such body of data can be gathered from many different derivers and cars and, as a result, a really humongous body of data can be gathered.

The current disclosure teaches how one can use these immense data to enable a moving robots, such as a car, derive autonomously by knowing the knowledge of the world and universe and can move from one state to another state along the time (i.e. navigating through its state space to become able to navigate in the physical space-time as we expect from human driven car, or a human).

Basically all such systems of knowledge or data, therefore, can be viewed as sequences of state descriptions (technically a state vector in a multidimensional space which is almost always a Hilbert space) regardless of type and form of the actual data.

Moreover in modern real life we have to deal with mixtures of different types of data (textual, numerical, visual, etc.) all in one body of data or as we prefer one body of knowledge. Formulating and conceiving effective and useful solution to utilize such complex data both in types and nature and in terms of volume become very tedious and not easy to implement or comprehend by an artisan.

In practice name-spacing and naming computer readable objects has a great impact on the complexity of a software artifact which consequently impact the complexity of the hardware that is coupled with or utilizes such software. Any unnecessary complexity contribute to lower the reliability and stability of the realized system.

For instance one may prefer to refer to all of these data as a "data" or "dataset/s" but we found that these commonly used terms because of their history and legacy quickly can make people confused about the meaning of the data and its instances. As an example, one may have difficulty to realize that a textual string is also a type of data or specifications of a feature of a data space is also a data. Things can get confusing for an artisan especially in the field of computer related industry and products and technology because the term data has been used for many things interchangeably and wherein sometimes they have clear definitions and sometimes they do not. Many terms (e.g. the word "term" itself) have been defined along the history which their interpretation only become clear in a narrow context of specialized domain knowledge.

The current disclosure on the other hand, in its preferred embodiments, is about identifying knowledge, gain knowledge and process knowledge through investigation of large bodies of data and not merely interested in processing data for processing data.

Therefore, we realized that (like any other new or novel fields of OSience and technology) we have to act as own lexicographer and define our terminology and invent our own name-spacing in order to enable an artisan to practice the teachings of this disclosure.

Accordingly the definitions, here, are not intended to be philosophical nor abstract but to unify the methods and formulations for the practical and tangible, applications, systems, operations, and data storages carrying instrumental data about certain subject or areas of importance to human life.

Now in order to describe the disclosure in details we first define a number of terms that are used frequently throughout this description. For instance, the information bearing symbols are called "Ontological subjects" and are defined herein below, along with others terms, in the definitions sections.

I—Definitions

1. ONTOLOGICAL SUBJECTS: symbol or signal referring to a thing (tangible or otherwise) worthy of knowing about. Therefore Ontological subjects (OS) means generally any string of characters, but more specifically, characters, letters, numbers (e.g. integer, real or complex, Boolean, binary, etc.), words, binary codes, bits, mathematical functions, sound signal tracks, video signal tracks, electrical signals, chemical molecules such as DNAs and their parts, or any combinations of them, and more specifically all such string combinations that indicates or refer to an entity, concept, quantity, and the incidences of such entities, concepts, and quantities. In this disclosure Ontological subjects/s and the abbreviation OS or OSs are used interchangeably.

2. ORDERED ONTOLOGICAL SUBJECTSS: Ontological subjects (or OSs) can be divided into sets with different orders depends on their length, attribute, and function. Basically the order is assigned to a group or a set of ontological subjects usually having at least one common predefined attribute, property, attribute, or characteristic. Usually the orders in this disclosure are denoted with alpha numerical characters such as 0, 1, 2, etc. or with alphanumerical characters as superscripts of an ontological subjects (e.g. an OS of order one is denoted by $OS^1$, and an OS of order two is denoted by $OS^2$ and the like) etc. or any other combination of characters so as to distinguish one group or set of ontological subjects, having at least one common predefined characteristic, with another set or group of ontological subjects having another at least one common characteristic. This order/s will also be reflected in denoting/corresponding the data objects or the mathematical objects in the formulations of the present invention to distinguish these data objects in relation to their corresponding ontological subjects set or its order, as will be used and introduced throughout this disclosure. For instance, for ontological subjects of textual nature, one may characterize or label letters as zeroth order OS, words or multiple word phrases as the first order, sentences or multiple word phrases as the second order, paragraphs as the third order, pages or chapters as the fourth order, documents as the fifth order, corpuses as the sixth order OS and so on. As seen the order can be assigned to a group or set of ontological subjects usually based on at least one common predefined characteristic of the members of the set. So a higher order OS is a combination of, or a set of, lower order OSs or lower order OSs are members of a higher order OS. Equally one can order the genetic codes in different orders of ontological subjects. For instance, the 4 basis of a DNA molecules as the zeroth order OS, the base pairs as the first order, sets of pieces of DNA as the second order, genes as the third order, chromosomes as the fourth order, genomes as the fifth order, sets of similar genomes as the sixth order, sets of sets of genomes as the seventh order and so on. Yet the same can be defined for information bearing signals such as analogue and digital signals representing audio or video information. For instance for digital signals representing a signal, bits (electrical One and Zero) can be defined as zeroth order OS, the bytes as first order, any sets of bytes as third order, and sets of sets of bytes, e.g. a frame, as fourth order OS and so on. Yet in another instance for a picture or a video frame, the pixels with different color can be regarded as first order OS (the RGB values of a pixel can be regarded as zeroth order OSs), a set whose members contain two or more number of pixels (e.g. a segment of a picture) can be regarded as OSs of second order, a set whose members composed of two or more such segments as third order OS, a set whose members contain or composed of two or more such third order OSs as fourth order OS, a whole frame as fifth order OS, and a number of frames (like a certain period of duration of a movie such as a clip) as sixth order and so on. Therefore definitions of orders for ontological subjects are arbitrary set of initial definitions that one can stick to in order to make sense of the methods and mathematical formulations presented herein and being able to interpret the consequent results or outcomes in more sensible and familiar language. Each ontological subjects therefore can be denoted with its order and its index in the set or the list of ontological subjects of same order. For instance $OS_i^k$ refers to ith member or ith ontological subjects of the set of ontological subjects of order k.

More importantly Ontological Subjects can be stored, processed, manipulated, and transported by transferring, transforming, and using matter or energy (equivalent to matter) and hence the OS processing is an instance of physical transformation of materials and energy.

3. STATE: a ontological subjects composed of one or more lower order ontological subjects. Usually the state refers to the higher order ontological subjects in a given set/s of ontological subjects. Therefor state can be defined and/or selected from one or more ontological subjects. For instance a state of a system of knowledge (e.g. a body of data) maybe defined as a set of lower order ontological subjects of the system of knowledge with highest number of members (i.e., the largest set of OSs of the system.)

4. STATE TRANSITION: state transition refers to one or more changes (e.g. replacement of a lower order OS with another lower order OS of a higher order OS, deleting a OS, adding a OS, and any combination of these operations) in a constituent lower order ontological subjects of a of higher order ontological subjects.

5. COMPOSITION: is an OS composed of constituent ontological subjects of lower or the same order, particularly text documents written in natural language documents, genetic codes, encryption codes, a body of data, numerical values, and strings of numerical values, data files, voice files, video files, and any mixture thereof. A collection, or a set, of compositions is also a composition. Therefore a composition is in fact a Ontological subjects of particular order which can be broken down to lower order constituent Ontological subjects. One preferred exemplary composition in this description, for the ease of explanation, is a set of data objects containing ontological subjects, for example a webpage, papers, documents, books, a set of webpages, sets of PDF articles, multimedia files, or even simply words and phrases. Moreover, compositions and bodies of knowledge are basically the same and are used interchangeably in this disclosure. A composition is also an state according the definitions above. Compositions are distinctly defined here for assisting the description in more familiar language than a technical language using only the defined OSs notations.

6. PARTITIONS OF A COMPOSITION: a partition of a composition, in general, is a part or whole, i.e. a subset, of a composition or a collection of compositions. Therefore, a partition is also a Ontological subjects having the same or lower order than the composition as an OS. More specifically in the case of textual compositions, parts or partitions of a composition can be chosen to be characters, words, phrases, any predefined length number of words, sentences, paragraphs, chapters, webpage, documents, etc. A partition of a composition is also any string of symbols representing any form of information bearing signals such as audio or videos, texts, DNA molecules, genetic letters, genes, a state of a system in a moment of time, and any combinations thereof. However one preferred exemplary definition of a partition of a composition in this disclosure is a component of the state of a system, a state of a system (e.g. a vector in the state space of a system), or a number of states of the system under investigation or while running, and the like. Moreover partitions of a collection of compositions can include one or more of the individual compositions. Partitions are also distinctly defined here for assisting the description in more familiar language than a technical language using only the general OSs definitions.

7. SIGNIFICANCE MEASURE: assigning a quantity, a number, a feature, or a metric for a OS from a set of OSs so as to assist to distinguishing or selecting one or more of the OSs from the set. More conveniently and in most cases the significance measure is a type of numerical quantity assigned to a partition of a composition. Therefore significance measures are functions of OSs and one or more of other related mathematical objects, wherein a mathematical object can, for instance, be a mathematical object containing information of participations of OSs in each other, whose values are used in the decisions about the constituent OSs of a composition. For instance, "Relational, and/or associational, and/or novel significances" are one form or a type of the general "significance measures" concept and are defined according to one or more aspects of interest and/or in relation to one or more OSs of the composition.

8. FILTRATION/SUMMARIZATION: is a process of selecting one or more OS from one or more sets of OSs according to predefined criteria with or without the help of value significance and ranking metric/s. The selection or filtering of one or more OS from a set of OSs is usually done for the purposes of representation of a body of data by a summary as an indicative of that body in respect to one or more aspect of interest. Specifically, therefore, in this disclosure searching through a set of partitions or compositions, and showing the search results according to the predetermined criteria is considered a form of filtration/summarization. In this view finding an answer to a query, e.g. question answering, or finding a composition related or similar to an input composition etc. is also a form of searching through a set of partitions and therefore are a form of summarization or filtration according to the given definitions here.

9. UNIVERSES OF COMPOSITIONS AND STATE OF UNIVERSE: Universe: in this disclosure "universe" is frequently used and have few intended interpretation: when "universe x" (x is a number or letter or word or combination thereof) is used, it mean the universe of one or more compositions, that is called x, and contains none, one or more ontological subjects. By "real universe" or "our universe" we mean our real life universe including everything in it (physical and its notions and/or so called abstract and its notions) which is the largest universe intended and exist. Furthermore, "universal" refers to the real universe. Also we might use the term "state of universe" that is referring to the largest ontological subjects of the composition corresponded to the universe under investigation/navigation.

10. THE USAGE OF QUOTATION MARKS " ": throughout the disclosure several compound names of concepts, variable, functions and mathematical objects and their abbreviations (such as "participation matrix", or PM for short, "Co-Occurrence Matrix", or COM for short, "value significance measure", or VSM for short, and the like) will be introduced, either in singular or plural forms, that once or more is being placed between the quotation marks (" ") for identifying them as one object (or a regular expression that is used in this disclosure frequently) and must not be interpreted as being a direct quote from the literatures outside this disclosure.

Furthermore, in the following description, numerous specific details are set forth in order to provide a thorough understanding of the present embodiments. It will be apparent, however, to ones having ordinary skill in the art that some of the specific detail need not be employed to practice the present embodiments. In other instances, well-known materials or methods have not been described in detail in order to avoid obscuring the present embodiments.

1. Reference throughout this specification to "one embodiment", "an embodiment", "one example" or "an example" means that a particular feature, structure or characteristic described in connection with the embodiment or example is included in at least one embodiment of the present embodiments. Thus, appearances of the phrases "in one embodiment", "in an embodiment", "for instance", "one example" or "an example" in various places throughout this specification are not necessarily all referring to the same embodiment or example. Furthermore, the particular features, structures or characteristics may be combined in any suitable combinations and/or sub-combinations in one or more embodiments or examples. In addition, it is appreciated that the figures provided herewith are for explanation purposes to persons ordinarily skilled in the art and that the drawings are not necessarily drawn to OSale.

2. Embodiments in accordance with the present embodiments may be implemented as an apparatus, method, or computer program product. Accordingly, the present embodiments may take the form of an entirely hardware embodiment, an entirely software embodiment (including firmware, resident software, micro-code, etc.), or an embodiment combining software and hardware aspects that may all generally be referred to herein as a "module" or "system." Furthermore, the present embodiments may take the form of a computer program product embodied in any tangible medium of expression having computer-usable program code embodied in the medium.

3. Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a solid state based storage devices (e.g. SSD, MVNe, etc.), a portable compact disc read-only memory (CDROM), an optical storage device, and a magnetic storage device. Computer program code for carrying out operations of the present embodiments may be written in any combination of one or more programming languages.

4. Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then OSaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

5. The flowchart and block diagrams in the flow diagrams illustrate the architecture, functionality, and operation of possible implementations of systems, methods, and computer program products according to various embodiments of the present embodiments. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

6. As used herein, the terms "comprises," "comprising," "includes," "including," "has," "having," or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

7. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

8. Additionally, any examples or illustrations given herein are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these examples or illustrations are utilized will encompass other embodiments which may or may not be given therewith or elsewhere in the specification and all such embodiments are intended to be included within the OSope of that term or terms. Language designating such no limiting examples and illustrations includes, but is not limited to: "for example," "for instance," "e.g.," and "in one embodiment."

9. The subject matter of the detailed description herein may be implemented, for instances, as computer-controlled apparatuses and machines, a computer process, a computing and data processing systems comprising one or more data processing or computing devices, or as an article of manufacture such as computer-readable storage medium.

Now the invention is disclosed in details in reference to the accompanying Figures and exemplary cases and embodiments in the following subsections.

II—Description

In this disclosure we argue that any collection or forms of data or a system of knowledge can be viewed as movement of a system through a state space. Further it is argued that ontological subjects of any given real life body of data are interrelated whose type and specificity of the relations can be learned from the given body of data.

One goal of investigation of a body of data is to learn and extract the knowledge therein in order to utilize that knowledge to build or construct knowledgeable systems capable of, for instance, autonomously make decision, navigate through physical spaces or state spaces, and/or converse and communicate intelligibly with other agents or human.

This section of present invention discloses a systematic, machine implemented, process efficient and scalable method/s of building, making, and operating knowledgeable machines for variety of tasks and, in a particular example, space (e.g. 4D space or state space) navigators and the corresponding autonomous moving systems with cognition/knowledge of real world.

II-I Partcipation Matrix Building for a Composition

Assuming we have an input composition of ontological subjects, e.g. an input text, the "Participation Matrix" (PM) is a matrix indicating the participation of each ontological subject in each partitions of the composition. In other words in terms of our definitions, PM indicate the participation of one or more lower order OS into one or more OS of higher or the same order. PM is the most important array of data in this disclosure that contains the raw information from which many other important functions, information, features, and desirable parameters and data objects can be extracted. Without intending any limitation on the value of PM entries, in one exemplary embodiments of the current disclosure the PM is a binary matrix having entries of one or zero and is built for a composition or a set of compositions as the following:

1. break the composition to desired numbers of partitions. For example, for a text document we can break the documents into chapters, pages, paragraphs, lines, and/or sentences, words etc.,
2. identify the desired form, number, and order/s of the ontological subject/s of the composition by appropriate methods such as parsing a text documents into its constituent words and/or phrases, sentences, paragraphs etc.,
3. select a desired N number of OSs of order k and a desired M number of OSs of order l (these OSs are usually the partitions of the composition from the step 1) existing in the composition, according to certain predetermined criteria, and;
4. construct a binary N×M matrix in which the ith raw ($R_i$) is a binary vector, with dimension M, indicating the presence of the ith OS of order k, (often extracted from the composition under investigation), in the OSs of order l, (often extracted from the same or another composition under investigation), by having the value of one, and not present by having the value of zero.

We call this binary matrix the Participation Matrix of the order kl ($PM^{kl}$) which can be shown as:

$$PM^{kl} = \begin{array}{c} \\ OS_1^k \\ \vdots \\ OS_N^k \end{array} \begin{array}{c} OS_1^l \ldots OS_M^l \\ \begin{pmatrix} pm_{11}^{kl} & \cdots & pm_{1M}^{kl} \\ \vdots & \ddots & \vdots \\ pm_{N1}^{kl} & \cdots & pm_{NM}^{kl} \end{pmatrix} \end{array} \quad (1)$$

where $OS_q^l$ is the qth OS of the lth order (q=1 ... M), $OS_p^k$ is the pth OS of the kth order (p=1 ... N), usually extracted from the composition, and $PM_{pq}^{kl}=1$ if $OS_p^k$ have participated, i.e. is a member, in the $OS_q^l$ and 0 otherwise.

The participating matrix of order lk, i.e. $PM^{lk}$, can also be defined which is simply the transpose of $PM^{kl}$ whose elements are given by:

$$PM_{pq}^{lk} = PM_{qp}^{kl} \quad (2).$$

Accordingly without limiting the scope of invention, the description is given by exemplary embodiments using only the general participation matrix of the order kl, i.e the $PM^{kl}$.

Furthermore PM carries much other useful information. For example using binary PMs, one can obtain a participation matrix in which the entries are the number of time that a particular OS (e.g. a word) is being repeated in another partitions of particular interest (e.g. in a document) one can readily do so by, for instance, the following:

$$PM\_R^{15} = PM^{12} \times PM^{25} \quad (3)$$

wherein the $PM\_R^{15}$ stands for participation matrix of OSs of order 1 (e.g. words) into OSs of order 5 (e.g. the documents) in which the nonzero entries shows the number of time that a word has been appeared in that document (for simplicity possible repetition of a word in an OS of order 2, e.g. sentences, is not accounted for here). Another applicable example is using PM data to obtain the "frequency of occurrences" of state components in a given composition by:

$$FO_i^{kll} = \Sigma_j pm_{ij}^{kl} \quad (4)$$

wherein the $FO_i^{kll}$ is the frequency of occurrence of OSs of order k, i.e. $SC_i^k$, in the OSs of order l, i.e. the $SC^l$. The latter two examples are given to demonstrate on how one can conveniently use the PM and the disclosed method/s to obtain many other desired data or information.

More importantly, from $PM^{kl}$ one can arrive at the "Co-Occurrence Matrix" $COM^{k|l}$ for OSs of the same order as follow:

$$COM^{k|l} = PM^{kl} * (PM^{kl})^T \qquad (5)$$

where the "T" and "*" show the matrix transposition and multiplication operation respectively. The COM is a N×N square matrix. This is the co-occurrences of the state components of order k in the partitions (state components of order l) within the composition and is (as will be stated in next sections) one indication of the association of OSs of order k evaluated from their pattern of participations in the OSs of order l of the composition. The co-occurrence number is shown by $com_{ij}^{k|l}$ which is an element/entery of the "Co-Occurrence Matrix (COM)" and (in the case of binary PMs) essentially showing that how many times $SC_i^k$ and $OS_j^k$ has participated jointly into the selected OSs of the order l of the composition. Furthermore, COM can also be made binary, if desired, in which case only shows the existence or non-existence of a co-occurrence between any two $OS^k$.

The importance of the "co-occurrence matrix" as defined in this disclosure is that it carries or contain the information of relationship and associations of the OSs of the composition which is further utilized in some embodiments of the present invention. Moreover, the frequency of occurrences and the co-occurrences is defined in view of event/s of interest. In other words the observation of participation of state components of certain order in state comments of higher order (the events). For example for investigation and knowledge extraction from textual body of data the co-occurrences of OSs of order one (e.g. words) is their participation, for instance, in composing sentences, i.e. the event of interest, here, is observation of a sentence.

It should be noticed that the co-occurrences of state components can also be obtained by looking at, for instance, co-occurrences of a pair of state components within certain (i.e. predefined) proximities in the composition (e.g. counting the number of times that a pair of state components have co-occurred within certain or predefined distances from each other in the composition. Similarly there are other ways to count the frequency of occurrences of a state components (i.e. the $FO_i^{k|l}$). However the preferred embodiment is an efficient way of calculating these quantities or objects and should not be construed as the only way for implementing the teachings of the present invention. The repeated co-occurrences of a pair of state components within certain proximities is an indication of some sort of association (e.g. a logical relationship) between the pair or else it would have made no sense to appear together in one or more partitions of the composition (i.e. in state components of higher order).

Those skilled in the art can store the information of the PMs, and also other mathematical/data objects of the present invention, in equivalent forms without using the notion of a matrix. For example each raw of the PM can be stored in a dictionary, or the PM be stored in a list or lists in list, or a hash table, or a SQL database, binary files, compressed data files, or any other convenient objects of any computer programming languages such as Python, C, Per, Java, R, GO, etc. Such practical implementation strategies can be devised by various people in different ways. Moreover, in said one exemplary embodiment the PM entries (especially for showing the participation of lowest orders OSs of the composition into each other, e.g. a $PM^{12}$) are binary for ease of manipulation and computational efficiency.

However, in some applications it might be desired to have non-binary entries so that to account for partial or multiple participation of lower order state components into state components of higher orders, or to show or to preserve the information about the location of occurrence/participation of a lower order OS into a higher order OSs, or to account for a number of occurrences of a lower OS in a higher OS etc., or any other desirable way of mapping/converting or conserving some or all of the information of a composition into one or more participation matrices. In light of the present disclosure such cases can also be readily dealt with, by those skilled in the art, by slight mathematical modifications of the disclosed methods herein without departing from the sprit and OSope of the present invention.

Having constructed one or more of the participation matrix/es, denoted generally with $PM^{kl}$, we now launch to explain the methods of defining and evaluating the "value significances" of the state components of the compositions for various measures of significance. One of the advantages and benefits of transforming the information of a composition into participation matrices is that once we attribute something to the OSs of particular order then we can evaluate the merit of OSs of another order in regards to that attribute using the PMs. For instance, if we find words of particular importance in a textual composition then we can readily find the most important sentences of the composition wherein the most important sentences contain the most important words in regards to that particular significance/importance measure or aspect. Moreover, as will be shown, the calculations become straightforward, language independent and computationally very efficient making the method practical, accurate to the extent of information content of the composition, and scalable in investigating large volumes of data or large bodies of knowledge.

Those skilled in the art can store the information of the PMs, and also other mathematical objects of the present invention, in equivalent forms without using the notion of a matrix. For example each raw/column of the PM can be stored in a dictionary, or the PM be stored in a list or lists in list, or a hash table, a set, a counter, or a SQL database, or any other convenient objects of any computer programming languages such as Python, C, Per, Java, etc. Such practical implementation strategies can be devised by various people in different ways. Moreover, in the preferred exemplary embodiments the PM entries are binary for ease of manipulation and computational efficiency.

However, in some applications it might be desired to have non-binary entries so that to account for partial participation of lower order ontological subjects into higher orders, or to show or preserve the information about the location of occurrence/participation of a lower order OS into a higher order OSs, or to account for a number of occurrences of a lower OS in a higher OS etc., or any other desirable way of mapping/converting or conserving some or all of the information of a composition into a participation matrix. In light of the present disclosure such cases can also be readily dealt with, by those skilled in the art, by slight mathematical modifications of the disclosed methods herein.

Furthermore, as pointed out before, those skilled in the art can store, process or represent the information of the data objects of the present application (e.g. list of ontological subjects of various order, list of subject matters, participation matrix/ex, association strength matrix/ex, and various types of associational, relational, novel, matrices, co-occurrence matrix, participation matrices, and other data objects introduced herein) or other data objects as introduced and disclosed in the incorporated references (e.g. association value spectrums, ontological subject map, ontological subject index, list of authors, and the like and/or the functions and their values, association values, counts, co-occurrences of ontological subjects, vectors or matrix, list or otherwise, and the like etc.) of the present invention in/with different or equivalent data structures, data arrays or forms without any particular restriction.

For example the PMs, and the derivative data objects such as ASMs, COPs, OSM or co-occurrences of the ontological subjects etc. can be represented by a matrix, sparse matrix, table, database rows, dictionaries and the like which can be stored in various forms of data structures. For instance each layer of the a PM, COM, ASM, are different types of VSMs and the like or the ontological subject index, or knowledge database/s can be represented and/or stored in one or more data structures such as one or more dictionaries, one or more cell arrays, one or more row/columns of an SQL database, one or more filing systems, one or more lists or lists in lists, hash tables, tuples, string format, zip format, sequences, sets, counters, or any combined form of one or more data structure, or any other convenient objects of any computer programming languages such as Python, C, Per, Java., JavaScript etc. Such practical implementation strategies can be devised by various people in different ways.

The detailed description, herein, therefore describes exemplary way(s) of implementing the methods and the system of the present invention, employing the disclosed concepts. They should not be interpreted as the only way of formulating the disclosed concepts, algorithms, and the introducing mathematical or computer implementable objects, measures, parameters, and variables into the corresponding physical apparatuses and systems comprising data/information processing devices and/or units, storage device and/or computer readable storage media, data input/output devices and/or units, and/or data communication/network devices and/or units, etc.

The processing units or data processing devices (e.g. CPUs, GPUs, ASICs, Quantum computing apparatuses, etc.) must be able to handle various collections of data. Therefore the computing units to implement the system have compound processing speed equivalent of one thousand million or larger than one thousand million instructions per second and a collective memory, or storage devices (e.g. RAM), that is able to store large enough chunks of data to enable the system to carry out the task and decrease the processing time significantly compared to a single generic personal computer available at the time of the present disclosure."

The data/information processing or the computing system that is used to implement the method/s, system/s, and teachings of the present invention comprises storage devices with more than 1 (one) Giga Byte of RAM capacity and one or more processing device or units (i.e. data processing or computing devices, e.g. the silicon based microprocessor, quantum computers etc.) that can operate with clock speeds of higher than 1 (one) Giga Hertz or with compound processing speeds of equivalent of one thousand million or larger than one thousand million instructions per second (e.g. an Intel Pentium 3, Dual core, i3, i7, i9 series, and Xeon series processors or equivalents or similar from other vendors, or equivalent processing power from other processing devices such as quantum computers utilizing quantum computing devices and units) are used to perform and execute the method once they have been programmed by computer readable instruction/codes/languages or signals and instructed by the executable instructions. Additionally, for instance according to another embodiment of the invention, the computing or executing system includes or has processing device/s such as graphical processing units for visual computations that are for instance, capable of rendering and demonstrating the graphs/maps of the present invention on a display (e.g. LED displays and TV, projectors, LCD, touch OSreen mobile and tablets displays, laser projectors, gesture detecting monitors/displays, 3D hologram, and the like from various vendors, such as Apple, Samsung, Sony, or the like etc.) with good quality (e.g. using a NVidia graphical processing units).

Also the methods, teachings and the application programs of the presents invention (e.g. FIGS. 6-14 of this disclosure or similar/related systems from the incorporated references) can be implement by shared resources such as virtualized machines and servers (e.g. VMware virtual machines, Amazon Elastic Beanstalk, e.g. Amazon EC2 and storages, e.g. Amazon S3, and the like etc. Alternatively specialized processing and storage units (e.g. Application Specific Integrated Circuits ASICs, field programmable gate arrays (FPGAs) and the like) can be made and used in the computing system to enhance the performance and the speed and security of the computing system of performing the methods and application of the present invention.

Moreover several of such computing systems can be run under a cluster, network, cloud, mesh or grid configuration connected to each other by communication ports and data transfers apparatuses such as switches, data servers, load balancers, gateways, modems, internet ports, databases servers, graphical processing units, storage area networks (SANs) and the like etc. The data communication network to implement the system and method of the present invention carries, transmit, receive, or transport data at the rate of 10 million bits or larger than 10 million bits per second;"

Furthermore the terms "storage device, "storage", "memory", and "computer-readable storage medium/media" refers to all types of no-transitory computer readable media such as magnetic cassettes, flash memories cards, digital video discs, random access memories (RAMSs), Bernoulli cartridges, optical memories, read only memories (ROMs), Solid state discs, and the like, with the sole exception being a transitory propagating signal."

The detailed description, herein, therefore uses a straightforward mathematical notions and formulas to describe exemplary ways of implementing the methods and should not be interpreted as the only way of formulating the concepts, algorithms, and the introduced measures and applications. Therefore the preferred or exemplary mathematical formulation here should not be regarded as a limitation or constitute restrictions for the OSope and sprit of the invention which is to investigate the bodies of knowledge and compositions with systematic detailed accuracy and computational efficiency and thereby providing effective tools in knowledge discovery, Scoring/ranking, filtering or modification of partitions of a body of knowledge, string processing, information processing, signal processing and the like.

II-II Value Significance Measuers

This section begins to concentrate on value significance evaluation of a predefined order SCs by several exemplary embodiments of the preferred methods to evaluate the value of an SC of the predetermined order, within a same order set of SCs of the composition, for the desired measure of significance.

Using these mathematical objects various measures of value significances of SCs in a body of knowledge or a composition (called "value significance measure") can be calculated for evaluating the value significances of SCs of different orders of the compositions or different partitions of a composition. Furthermore, these various measures (usually have intrinsic significances) are grouped in different types and number to distinguish the variety and functionalities of these measures.

The first type of a "value significance measure" is defined as a function of "Frequency of Occurrences" of $SC_i^k$ is called here $FO_i^{k|l}$ and can be given by:

$$vsm\_1_i^{k|l}=f_1(FO_i^{k|l}), i=1,2,\ldots N \quad (6)$$

wherein $FO_i^{k|l}$ is obtained by counting the occurrences of SCs of the particular order, e.g. counting the appearances of particular word in the text or counting its total occurrences in the partitions, or more conveniently be obtained from the $COM^{k|l}$ (the elements on the main diagonal of the $COM^{k|l}$) or by using Eq. 4, or any other way of counting the occurrences of $SC_i^k$ in the desired partitions of the composition.

Moreover the $f_1$ in Eq. 6 is a predefined function such that $f_1(x)$ might be a liner function (e.g. ax+b), a power/polynomial of x function (e.g. $x^3$ or $x+x^{0.53}+x^5$), a logarithmic function (e.g. 1/log 2(x)), or 1/x function, etc.

Accordingly, a $vsm\_1\_1_i^{k|l}$, (stands for number one of type one "value significance measure") for instance, can be defined as:

$$vsm\_1\_1_i^{k|l}=c \cdot FO_i^{k|l} \quad (7)$$

wherein c is a constant or a pre-assigned vector. The $vsm\_1\_1_i^{k|l}$ of Eq. 7 gives a high value to the state components of order $k, SC^k$, that have most frequently occurred in state components of order $l, SC^l$, In another situation or some applications if, for a desired aspect, less frequent SCs are of more significance one may use the following $vsm\_1\_2_i^{k|l}$ (number 2 of type 1 vsm)

$$vsm\_1\_2_i^{k|l} = \frac{c}{(FO_i^{k|l})}, i=1,2,\ldots N \quad (8)$$

Furthermore, another type of $vsm\_x_i^{k|l}$ is defined as a function of the "Independent Occurrence Probability" (IOP) in the partitions such as:

$$vsm\_2_i^{k|l}=f_2(iop_i^{k|l}), i=1\ldots N \quad (9)$$

wherein the independent occurrence probability $(iop_i^{k|l})$ may conveniently, assuming a single occurrence of an $OS^k$ in a partition $OS^l$, be given by:

$$(iop_i^{k|l}) = \frac{FO_i^{k|l}}{M}, i=1\ldots N \quad (10\text{-}1)$$

or one may consider the following:

$$(iop_i^{k|l}) = \frac{FO_i^{k|l}}{\sum_i FO_i^{k|l}}, \quad (10\text{-}2)$$

be a more appropriate measure of "independent probability of occurrence wherein summation is over frequency of occurrences of all $SC^k$ in the composition, and $f_2$ in Eq. 9 is a predefined function. For instance a $vsm\_2\_1_i^{k|l}$ (i.e. the number 1 type 2 vsm) can be defined as:

$$vsm2\_1_i^{k|l}=-\log_2(iop_i^{k|l}), i=1\ldots N \quad (11)$$

This measure gives a high value to those SCs of order k of the composition (e.g. the words when k=1) conveying the most amount of information as a result of their occurrence in the composition. Extreme values of this measure can point to either novelty or noise.

Still, another type of $vsm\_x_i^{k|l}$ is defined as a function of the "co-occurrence of an $SC^k$ with others as:

$$vsm\_3_i^{k|l}=f_3(com_{ij}^{k|l}), i=1\ldots N \quad (12)$$

wherein the $com_{ij}^{k|l}$ is the co-occurrences of $SC_i^k$ and $SC_j^k$ and $f_3$ is a predetermined function. For instance a $vsm\_3_i^{k|l}$ can be defined as:

$$vsm\_3\_1_i^{k|l}=f_3(com_{ij}^{k|l})=\Sigma_j com_{ij}^{k|l}, i=1\ldots N \quad (13).$$

This measure gives a high value to those frequent SCs of order k that have co-occurred with many other SCs of order k in the partitions of order l.

This measure (Eq. 13) once combined with other measures can yet provide other measures. For instance when it is being divided by the $vsm\_1\_1_i^{k|l}$ of Eq. 7, (e.g. being divided by $FO_i^{k|l}$), the resultant measure can indicates the diversity of occurrence of that SC. Therefore, this particular combined measure usually gives a high value to the generic words (since generic words can occur with many other words). Once the generic words excluded from the list of SCs of the order k then this measures can quickly identifies the main subject matter of a composition so that it can be used to label a composition or for classification, categorization, clustering, etc.

Accordingly, more $vsm\_x_i^{k|l}$ can be defined using the one or more of the other $vsm_i^{k|l}$ or the variables. For instance one can define a $vsm\_x_i^{k|l}$ of type 4 (x=4) as function of $vsm\_1\_2_i^{k|l}$ given by Eq. 8 and $com_{ij}^{k|l}$ as the following:

$$vsm\_4\_1_j^{k|l}=f_4(vsm\_1\_2_i^{k|l}, com_{ij}^{k|l})=\Sigma_i (com_{ij}^{k|l} \cdot vsm\_1\_2_i^{k|l})=(1/FO_i^{k|l})^T \times COM,$$
$$i,j=1\ldots N \quad (14)$$

wherein "T" stands for matrix or vector transposition operation and wherein we substitute the $vsm\_1\_2_i^{k|l}$ from Eq. 8 into Eq. 12 or 14. This measure also points to the diversity of the participations of the respective SC especially when COM is made digital.

For mathematical accuracy it is noticed that in our notation the index "i" refers to the row number and the index "j" refers to the column number therefore the matrices with only the subscript of "i" usually are the column vectors and the matrices with only the subscript of "j" usually are row vectors.

In a similar fashion there could be defined, synthesized, and be calculated various $vsm\_x_i^{k|l}$ (x=1, 2, 3, ...) vectors for $SC_i^k$ that are indicatives of one or more significances aspect/s of an $SC_i^k$ in the composition or the BOK. These groups of $vsm\_x_i^{k|l}$ generally refer to the intrinsic value significance of an SC in the BOK.

These "value significance measures" ($vsm\_x_i^k$) are more indicative of intrinsic importance or significances of lower order constituent part that can be use to separate one or more of the these SCs for variety of applications such as labeling, categorization, clustering, building maps, conceptual maps, state component maps, or finding other significant parts or partitions of the composition or r instance the $vsm\_x_i^{k|l}$ can readily be employed to score a set of document or to select the most import parts or partitions of a composition by providing the tools and objects to weigh the significances of parts or partitions of a BOK.

Accordingly, from the $vsm\_x_i^k$ vectors one can readily proceed to calculate the vsm_x of other SC of different order (i.e. an order l) utilizing the participation matrices $PM^{kl}$ by a multiplication operation by:

$$\text{vsm\_x}_j^{l|kl}=(\text{vsm\_x}_i^k)^T \times \text{pm}_{ij}^{kl} \quad j=1,2,\ldots M \text{ and } i=1,2,\ldots N \quad (15)$$

wherein $\text{vsm\_x}_j^{l|kl}$ is the type x value significance of SCs of order l obtained from the data of the $PM^{kl}$. An instance meaning of SC of order l for a textual composition or a BOK is a sentence (e.g. l=2), a paragraph (e.g. l=3) or a document (l=5). The $\text{vsm\_x}_j^{l|kl}$ thereafter can be utilized for scoring, ranking, filtering, and/or be used by other functions and applications based on their assigned value significances.

Generally, many other "value significant measures" can be constructed or synthesized as functions of other "value significance measures" to obtain a desired new value significance measure.

Therefore, from the disclosure here, it becomes apparent as how various filtering functions can be synthesized utilizing the participation matrix information of different orders and other derivative mathematical objects. The method is thereby easily implemented and is process efficient.

An immediate application of the theory and the associated methods, systems, and applications are instrumental in processing of natural languages compositions and building intelligent systems capable of moving, behaving, and interacting with humans in an intelligent manner.

II-III the Association Strength

This section look into another important attributes of the ontological subjects of a composition that is instrumental and desirable in investigating the composition of ontological subjects.

According to the theoretical discoveries, methods, systems, and applications of the present invention, the concept and evaluation methods of "association strengths" between the ontological subjects of a composition or a BOK play an important role in investigating, analyzing and modification of compositions of ontological subjects. For instance, in the U.S. patent application Ser. No. 12/179,363 entitled "ASSISTED KNOWLEDGE DISCOVERY AND PUBLICATION SYSTEM AND METHOD", filed on Jul. 24-2008, which is incorporated in this application, the applicant has introduced the concept of association value functions for ontological subjects of a composition. Accordingly an ontological subject was represented by a spectrum like function whose variables (e.g. the horizontal axis of the graphical representation of the spectrum) were corresponded to ontological subjects and the value of the function was called association value function. The association value function was introduced to show the strength of association of (e.g. relatedness, connections, bond, closeness, causal, etc.) between an ontological subjects with other ontological subjects based on count of their co-occurrences within certain proximities, and the significances (e.g. popularity or occurrence counts, or other measures of value significances as defined in this disclosure and/or in the incorporated references herein) of the associated ontological subjects.

Accordingly, the "association strength measures" are introduced and disclosed here. The "association strength measures" play important role/s in many of the proposed applications and also in calculating and evaluating the different types of "value significance evaluation" of OSs of the compositions. The values of an "association strength measure" can be shown as entries of a matrix called herein the "Association Strength Matrix ($ASM^{kl}$)"

The entries of $ASM^{kl}$ is defined in such a way to show the concept and rational of association strength according to one exemplary general embodiment of the present invention as the following:

$$asm_{i \to j}^{k|l} = f(com_{ij}^{k|l}, \text{vsm\_x}_i^k, \text{vsm\_y}_j^k) \ldots i,j=1 \ldots N, x, y = 1, 2, \ldots \quad (16)$$

where $$asm_{i \to j}^{k|l}$$

is the "association strength" of $OS_i^k$ to $OS_j^k$ of the composition and $f$ is a predetermined or a predefined function, $com_{ij}^{k|l}$ are the individual entries of the $COM^{k|l}$ showing the co-occurrence of the $OS_i^k$ and $OS_j^k$ in the partitions or $OS^l$, and the $\text{vsm\_x}_i^k$ and $\text{vsm\_y}_j^k$ are the values of one of the "value significance measures" of type x and type y of the $OS_i^k$ and $OS_j^k$ respectively, wherein the occurrence of $OS^k$ is happening in the partitions that are OSs of order l. In many cases the $\text{vsm\_x}_i^k$ and/or the $\text{vsm\_y}_j^k$ are from the same type of "value significance measure" and usually are calculated from the participation data of the $OS^k$ in the OSs of order l, i.e. the PMs, but generally they can be of different types and possibly calculated from PMs of different bodies of data.

Accordingly having selected the desired form of the function $f$ and introducing the exemplary quantities from Eq. 6, and/or 9 and/or Eq. 12 into Eq. 16 the value of the corresponding "association strength measure" can be computed.

Figure 2A:
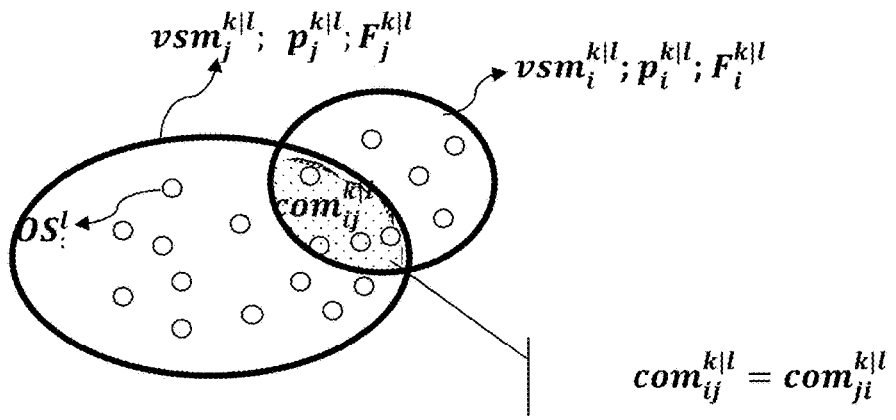
FIG. 2a: shows one exemplary illustration of the concept of association strength of a pair of OSs based on their co-occurrence and their probability of occurrences in the partitions of a composition.
Figure 2B:
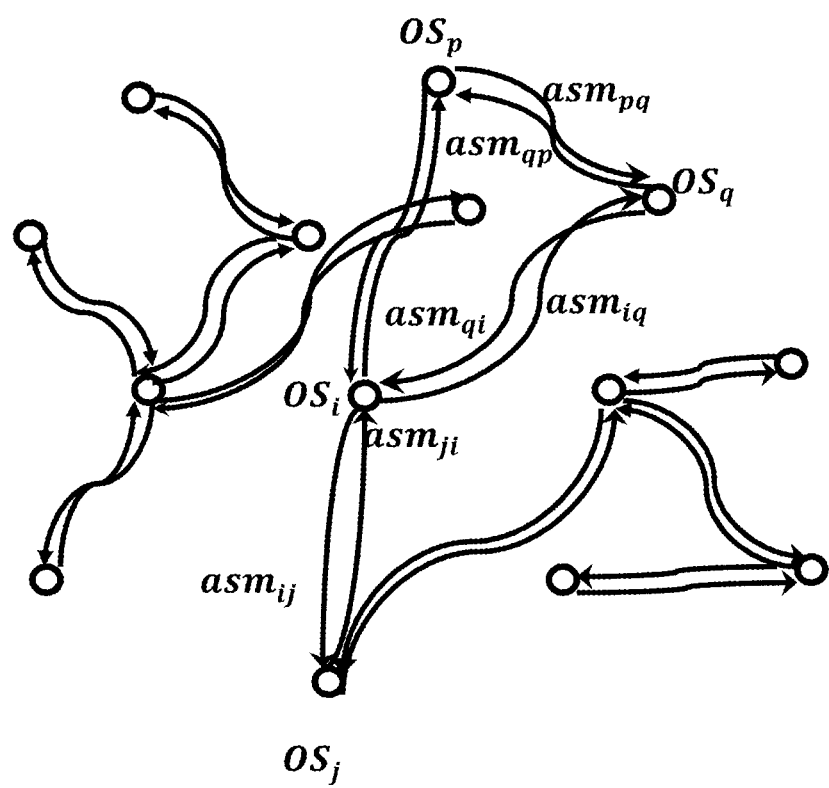
FIG. 2b: shows one exemplary embodiment of a directed asymmetric network or graph corresponding to an association strength matrix.

Referring to FIG. 2 here, it shows one definition for association of two or more OSs of a composition to each other and shows how to evaluate the strength of the association between each two OSs of composition. In FIG. 2 the "association strength" of each two OSs has been defined as a function of their co-occurrence in the composition or the partitions of the composition, and the value significances of each one of them.

FIG. 2, moreover shows the concept and rational of this definition for association strength according to this disclosure. The larger and thicker elliptical shapes are indicative of the value significances, e.g. probability of occurrences, of $OS_i^k$ and $OS_j^k$ in the composition that were driven from the data of $PM^{kl}$ and wherein the small circles inside the area is representing the $OS^l$ s of the composition. The overlap area shows the common ontological subjects of order l, $OS^l$, between the $OS_i^k$ and $OS_j^k$ in which they have co-occurred, i.e. those partitions of the composition that includes both $OS_i^k$ and $OS_j^k$. The co-occurrence number is shown by $com_{ij}^{k|l}$, which is an element of the "Co-Occurrence Matrix (COM)" introduced before (Eq. 5).

The various $asm_{i \to j}^{k|l}$ can be grouped into types and number in order to distinguish them from other measures in a similar fashion in labeling and naming the VSMs in the previous subsection. Consequently few exemplary types of "association strength measures", $$asm_{i \to j}^{k|l},$$

are given below:

$$\text{asm}\_1\_1_{i \to j}^{k|l} = \text{com}_{ij}^{k|l} \quad \ldots \quad i, j = 1 \ldots N \tag{17}$$

$$\text{asm}\_2\_1_{i \to j}^{k|l} = \text{com}_{ij}^{k|l} / \text{vsm}\_x_i^{k|l} \quad \ldots \quad i, j = 1 \ldots N, x, y = 1, 2, \ldots \tag{18-1}$$

$$\text{asm}\_2\_2_{i \to j}^{k|l} = \text{com}_{ij}^{k|l} / \text{vsm}\_x_j^{k|l} \quad \ldots \quad i, j = 1 \ldots N, x, y = 1, 2, \ldots \tag{18-2}$$

$$\text{asm}\_3\_1_{i \to j}^{k|l} = \frac{\text{vsm}\_y_j^{k|l}}{\text{vsm}\_x_i^{k|l}} \cdot \text{com}_{ij}^{k|l} \quad \ldots \quad i, j = 1 \ldots N, x, y = 1, 2, \ldots \tag{19-1}$$

$$\text{asm}\_3\_2_{i \to j}^{k|l} = \frac{\text{vsm}\_y_i^{k|l}}{\text{vsm}\_x_j^{k|l}} \cdot \text{com}_{ij}^{k|l} \quad \ldots \quad i, j = 1 \ldots N, x, y = 1, 2, \ldots \tag{19-2}$$

It is important to notice that the association strength defined by Eq. 16, is not usually symmetric and generally $$\text{asm}_{j \to i}^{k|l} \neq \text{asm}_{i \to j}^{k|l}.$$

Therefore, one important aspect of the Eq. 16 to be pointed out here is that associations of OSs of the compositions are not necessarily symmetric and in fact an asymmetric "association strength measure" is more rational and better reflects the actual relationship between the OSs of the composition.

To further illustrate on the actuality of the "association strength measures" consider that $\text{vsn}\_x_i^{k|l} = \text{iop}_i^{k|l}$ and $\text{vsm}\_x_j^{k|l} = \text{iop}_j^{k|l}$ wherein the L $\text{iop}_i^{k|l}$ and $\text{iop}_j^{k|l}$ are the "independent occurrence probability" of $OS_i^k$ and $OS_j^k$ in the partitions respectively, wherein the occurrence is happening in the partitions that are OSs of order l.

Consequently, for instance, from the associations strength of Eq. 19-1, we define another exemplary "association strength measure", labeled as $$\text{asm}\_3\_1\_1_{i \to j}^{k|l},$$

(it reads as number 1 of type 3_1 "association strength measure", to make it distinguishable from other measures) as:

$$\text{asm}\_3\_1\_1_{i \to j}^{k|l} = c \frac{\text{com}_{ij}^{k|l}}{\left(\text{iop}_i^{k|l} / \text{iop}_j^{k|l}\right)} = c \frac{\text{com}_{ij}^{k|l} \cdot \text{iop}_j^{k|l}}{\text{iop}_i^{k|l}}, i, j = 1 \ldots N \tag{20-1}$$

and similarly using Eq. 19-2 we arrive at:

$$\text{asm}\_3\_2\_1_{i \to j}^{k|l} = c \frac{\text{com}_{ij}^{k|l}}{\left(\text{iop}_j^{k|l} / \text{iop}_i^{k|l}\right)} = c \frac{\text{com}_{ij}^{k|l} \cdot \text{iop}_i^{k|l}}{\text{iop}_j^{k|l}}, i, j = 1 \ldots N \tag{20-2}$$

where c is a predetermined constant, or a pre-assigned value vector, or a predefined function of other variables in Eqs. 20-1 and 20-2, $\text{com}_{ij}^{k|l}$ are the individual entries of the $COM^{k|l}$ showing the co-occurrence of the $OS_i^k$ and $OS_j^k$ in the partitions of order l, and the $\text{iop}_i^{k|l}$ and $\text{iop}_j^{k|l}$ are the "independent occurrence probability" of $OS_i^k$ and $OS_j^k$ in the partitions respectively, wherein the occurrence is happening in the partitions that are OSs of order l. In a particular case, it can be seen that in Eq. 20-1, the un-normalized "association strength measure" of each OS with itself is proportional to its frequency of occurrence (or self-occurrence). Generally $\text{iop}_i^{k|l}$ and $\text{iop}_j^{k|l}$ are functions of frequency of occurrences of ontological subjects of order k, which depend on the definition of such frequency of occurrences for each particular aspect (or event) of interest.

II-III-I the Association Strength, Conditional Probability of Occurances, and Informational Value of Ontological Subjects of a Body of Knolwdege It was mentioned that the association strength defined by Eq. 16 or more particularly by Eq. 20-1 or 20-2, are not symmetric and generally $\text{asm}_{ji}^{k|l} \neq \text{asm}_{ij}^{k|l}$. One important aspect of the Eq. 20 which is pointed out is that associations of OSs of the compositions that have co-occurred in the partitions are not necessarily symmetric and in fact it is argued that asymmetric association strength is more rational and better reflects the actual relationships of OSs of the composition.

To illustrate further in this matter, Eq. 20-1 basically says that if a less popular OS co-occurred with a highly popular OS then the association of less poplar OS to the highly popular OS is much stronger than the association of a highly popular OS having the same co-occurrences with the less popular OS. That make sense, since the popular OSs obviously have many associations and are less strongly bounded to anyone of them so by observing a highly popular OS one cannot gain much upfront information about the occurrence of less popular OSs. However observing occurrence of a less popular OS having strong association to a popular OS can tip the information about the occurrence of the popular OS in the same partition, e.g. a sentence, of the composition.

A very important, useful, and quick use of association strength measures, e.g. Eq. 20-1, is to find the real associates of a word, e.g. a concept or an entity, from their pattern of usage in the partitions of textual compositions. Knowing the associates of words, e.g. finding out the associated entities to a particular entity of interest, has many applications in the knowledge discovery and information retrieval. In particular, one application is to quickly get a glance at the context of that concept or entity or the whole composition under investigation.

In accordance to another aspect of the invention, one can recall from graph theories that each matrix can be regarded as an adjacency matrix of a graph or a network. Consequently, FIG. 3 shows a graph or a network of OSs of the composition whose adjacency matrix is the Association Strength Matrix (ASM). As seen the graph corresponding to the ASM can be shown as a directed and asymmetric graph or network of OSs. Therefore having the ASM one can represent the information of the ASM graphically. On the other hand by having a graph one can transform the information of the graph into an ASM type matrix and use the method and algorithm of this application to evaluate various value significance measures for the nodes of the graph or network. Various other graphs can be depicted and generated for each of the different matrixes introduced herein. FIG. 3 further demonstrate that how any composition of ontological subjects can be transformed (using the disclosed methods and algorithms) to a graph or network similar to the one shown in FIG. 3 showing the strength of the bounding between the nodes of the graph.

Using the association strength concept one can also quickly find out about the context of the compositions or visualize the context by making the corresponding graphs of associations as shown in FIG. 3. Furthermore, the association strengths become instrumental for identifying the real associates of any OS within the composition. Once the composition is large or consist of very many documents one can identify the real associations of any state component of the corresponding universe. Such a real association is useful when one wants to research about a subject so that she/he can be guided through the associations to gain more prospects and knowledge about a subject matter very efficiently. Therefore a user or a client can be efficiently guided in their research trajectory to gain substantial knowledge as fast as possible. For instance a search engine or a knowledge discovery system can provide its clients with the most relevant information once it has identified the real associations of the client's query, thereby increasing the relevancy of search results very considerably.

As another example, a service provider providing knowledge discovery assistance to its clients can look into the subjects having high associations strength with the subject matter of the client's interest, to give guidance as what other concepts, entities, objects etc. should she/he look into to have deeper understanding of a subject of interest or to collect further compositions and documents to extend the body of knowledge related to one or more subject matters of her/his/it's interest. FIGS. 4, 5 shows a block diagram of one process flow to obtain such data objects to be used for the aforementioned applications such as building ontological subject maps (OSMs)

FIG. 5 therefore shows the block diagram of one basic exemplary embodiment in which it demonstrates a method of using the association strengths matrix (ASM) to build an "Ontological Subject Map (OSM)" or a graph. The map is not only useful for graphical representation and navigation of an input body of knowledge but also can be used to evaluate the value significances of the SCs in the graph. Utilization of the ASM introduced in this application can result in better justified Ontological Subject Map (OSM) and the resultant calculated significance value of the OSs.

The association strength matrix could be regarded as the adjacency matrix of any graphs such as social graphs or any network of anything. For instance the graphs can be built representing the relations between the concepts and entities or any other desired set of SCs in a special area of science, market, industry or any "body of knowledge". Thereby the method becomes instrumental at identifying the value significance of any entity or concept in that body of knowledge and consequently be employed for building an automatic ontology. The VSM_1, 2, . . . $x^{k|l}$ and other mathematical objects can be very instrumental in knowledge discovery and research trajectories prioritizations and ontology building by indicating not only the important concepts, entities, parts, or partitions of the body of knowledge but also by showing their most important associations.

Figure 5A:
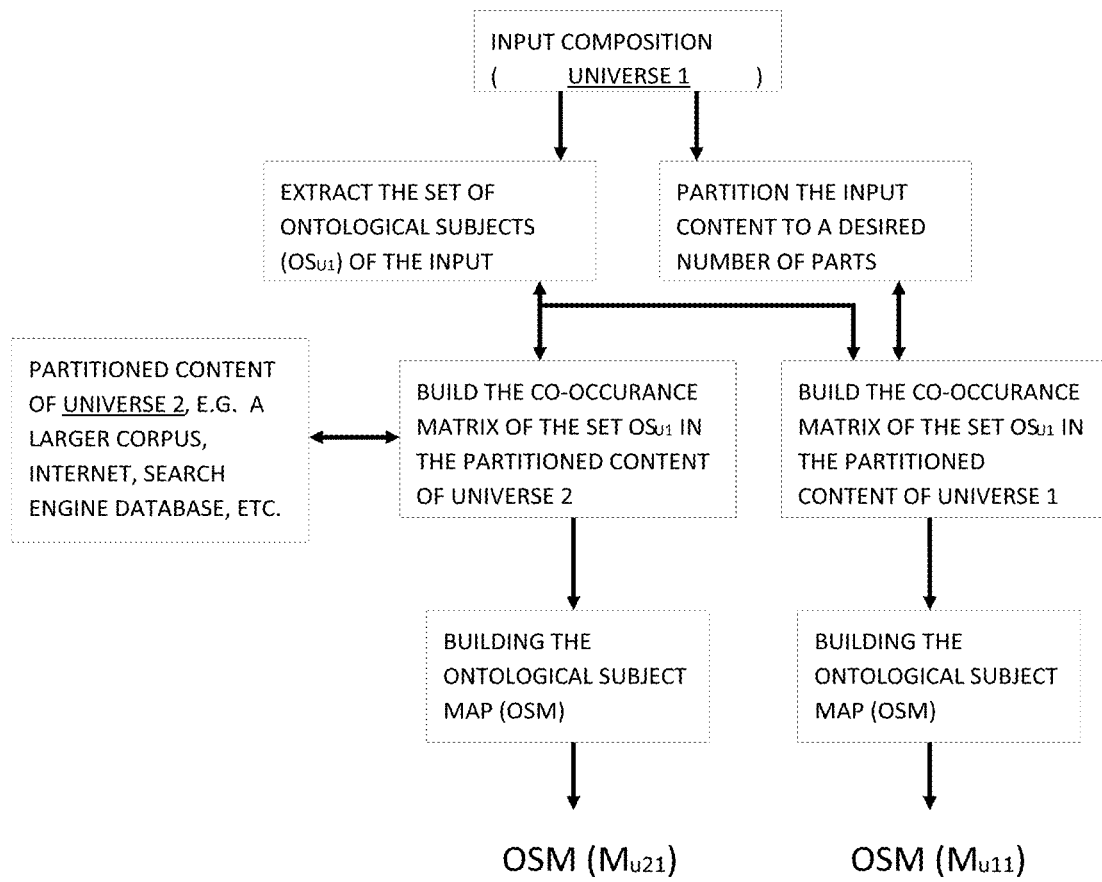
FIGS. 5a and 5b: shows block diagrams of the methods and the algorithms of building the Ontological Subject Maps (OSM) from the Association Strength Matrix (ASM) which is built for and from an input composition.
Figure 5B:
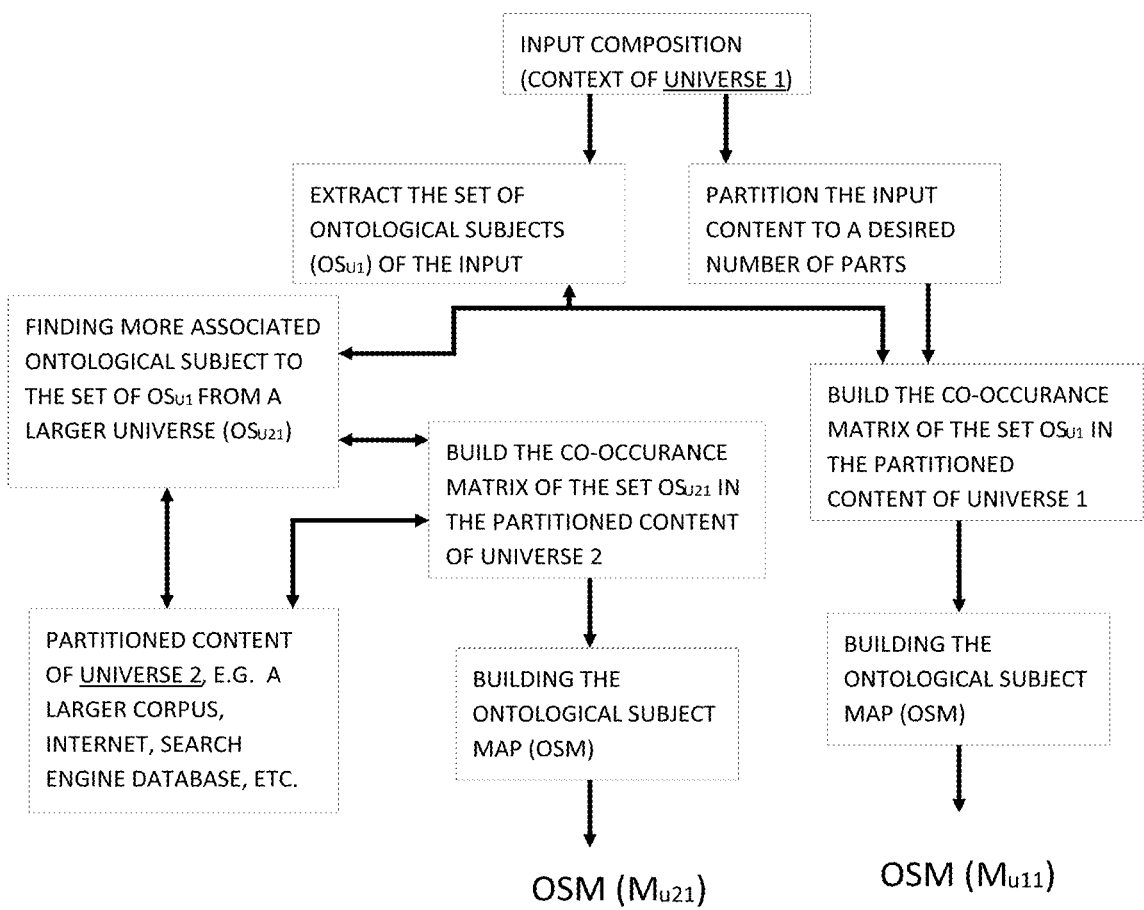
Figure 5C:
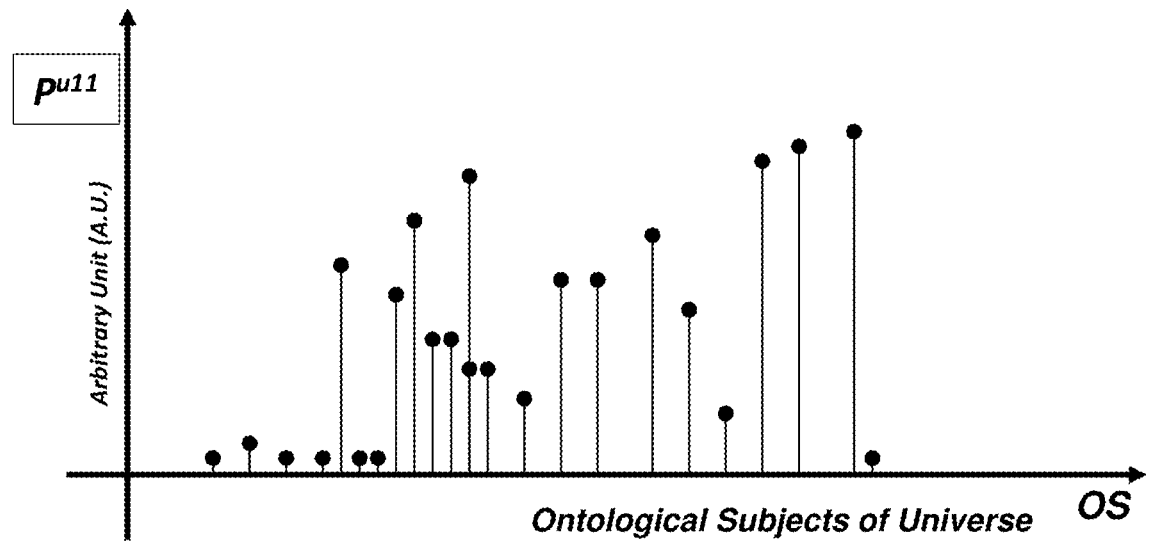
FIGS. 5c and 5d: spectral illustration of two OSMs, one derived from the content and context of universe 1 and another from the content and contexts of universe 2.
Figure 5D:
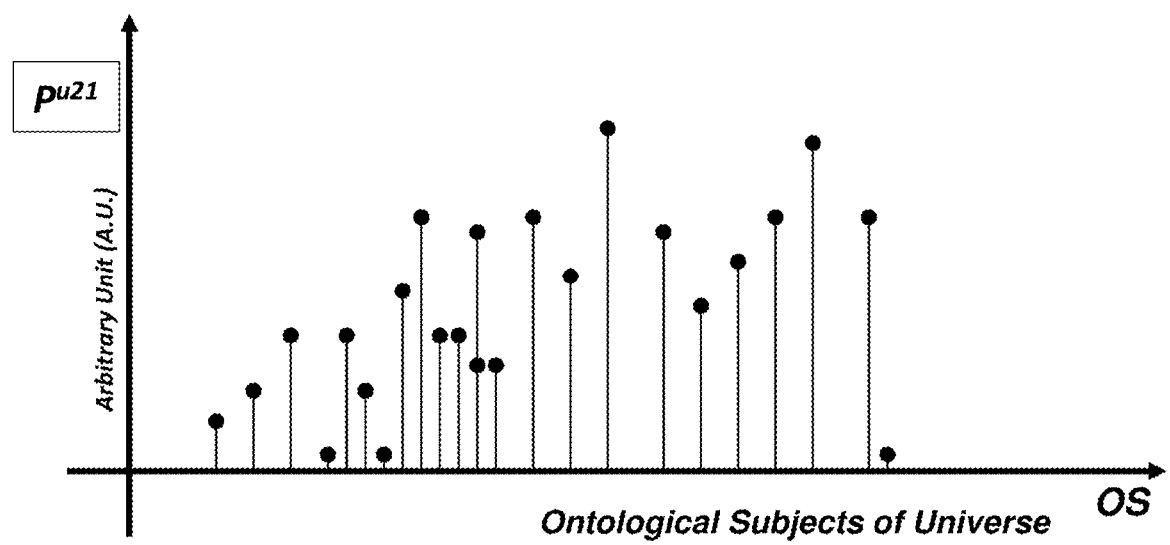
Figure 5E:
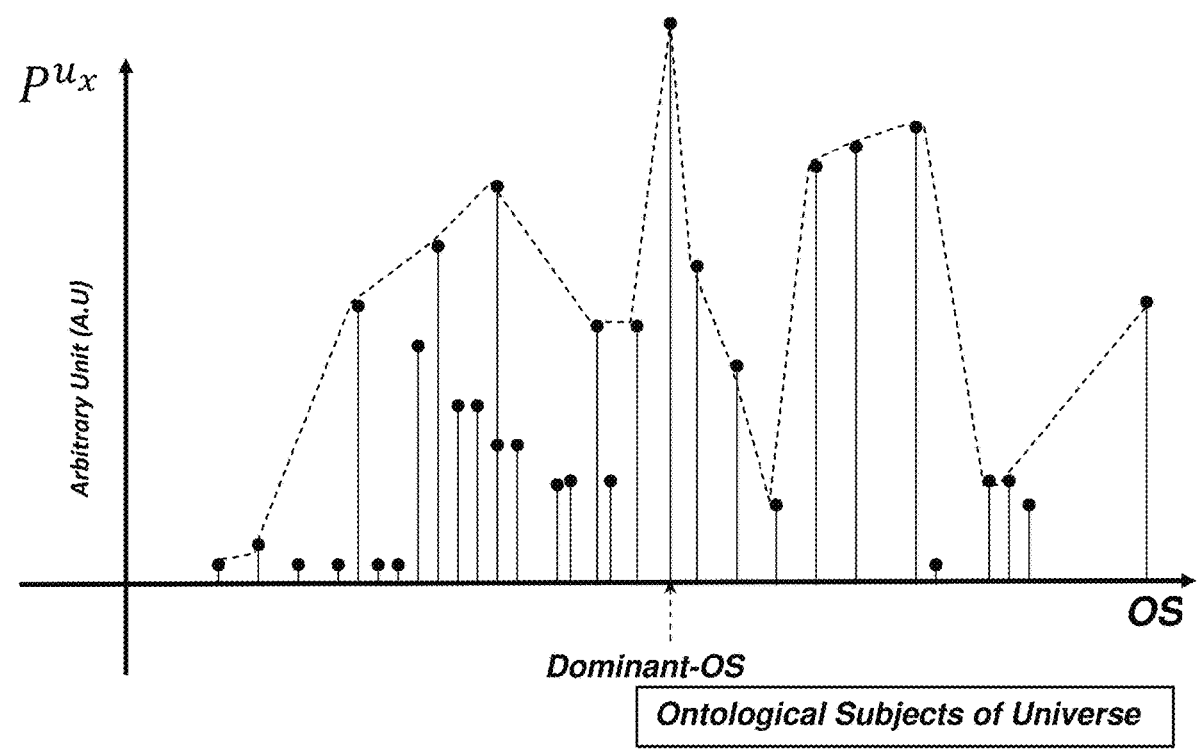
FIG. 5e: an illustration of Ontological Subject spectrum of a universe x wherein the dominant OSs have been identified and the resulting spectral envelope is used as the summary or as the characteristic signature of the composition x.

Referring to FIG. 5c, 5d, 5e now, they show one graphical representation of the concept of the different values of different "value significance measures". As seen values of different types of value significance measures (labeled as XY_VSM wherein XY is used to show the different types of VSM/s) can be shown as a vector in a multidimensional space. Though XY_VSM/s in general are matrices that might also carry the relational value significances but still any row or column (as shown in FIG. 5b) of them can be shown as discrete vectors in a multidimensional space. These discreet vectors can also be treated as discrete signals in which they can be further be used for investigation of the compositions. Some types of XY_VSM, that are intrinsic, are vectors (e.g. FIG. 5c) for which they can readily be used to weigh other SCs or the partitions of the composition. Also shown in FIG. 5d are some of the vectors that might be "special conveyer vectors" labeled with "significance conveyer vectors" in the FIG. 5d and are usually predefined or predetermined that can be used for filtering out and/or dampening or amplifying and/or shaping/synthesizing the VSMs of one or more of the predetermined SCs of the composition. FIG. 5d demonstrate that special conveyer vectors or VSM have basically the same characteristics as other XY-VSM except the values might have been set in advance.

FIG. 6 shows one way of demonstrating (e.g. schematically) how two exemplary value significance vectors can be extracted from an exemplary "association strength matrix" (asm) which in this instance are also shown to be used to evaluate the associations of OSs of order l (e.g. sentences) to particular OS of order k (e.g. a word or keyword or phrase). Generally FIG. 6 is for further clarification and instantiation of the actual meaning and their use and the way to manipulate and use, deal, and calculate the variables and data or mathematical objects that were introduced in the previous sections. However, the disclosed processes and methods with the given formulations should be enough for those of ordinary skilled in the art to enable them to implement, execute, and apply the teachings of the present invention.

An application of the instance demonstration of FIG. 6 is that an OS of order l, can be selected by the investigator based on its strength of association to one or more OSs of the order k. The calculation and the selection method of OSs of order l can find an important application in document retrieval, question answering, computer conversation, in which a suitable answer or output is being south from a knowledge repository (e.g. a given composition) in response to the input query or composition. As an example, for showing how to utilize the disclosed method/s, an input statement or a query is parsed to its constituent OSs of order k and from the association strength matrix (which might be constructed from and for said knowledge repository) then the mostly related partitions of the stored composition (i.e. the knowledge repository) is retrieved in response of an input query which is a conversational statement or a question. For instance, the mostly related partition of the knowledge repository can be the partition (OS of order l) that has scored the highest average or cumulative association to the constituent OSs of the input query. The mostly related partition of the knowledge repository might have scored the highest, for example, after multiplication of the association strength vectors of the OSs of the input query in the association strength matrix that have been built from the knowledge repository.

FIG. 6a, 6b, 6c shows spectral representation of association strengths of ontological subjects. As seen the association strength of an OS with other OSs can be represented with a row or column vector and further it can be depicted or regarded as a spectral signature corresponded to each OS. Each OS of the body of knowledge therefore will have a spectrum of association value with other OSs of the body of data and depends on the choice of type of the "association strength measure" can have a different depiction.

Figure 7:
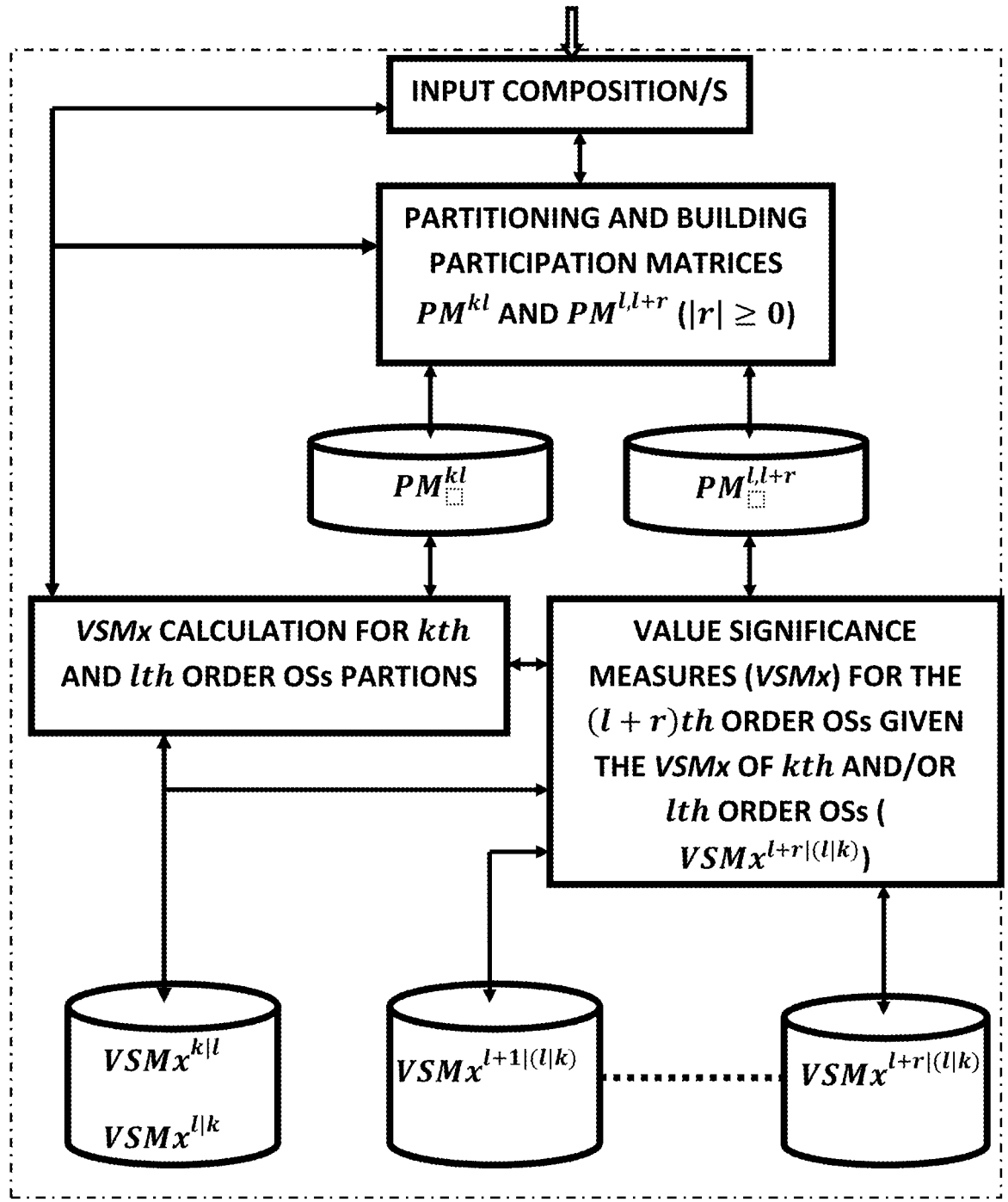
FIG. 7: is an schematic view of the system and method of building at least two participation matrixes and calculating VSM for lth order partition, $OS^l$, to calculate the "Value Significance Measures" (VSM) of other partitions of the compositions, $OS^{l+r}$, and storing them for further use by the application servers according to one embodiment of the present invention.
Figure 8:
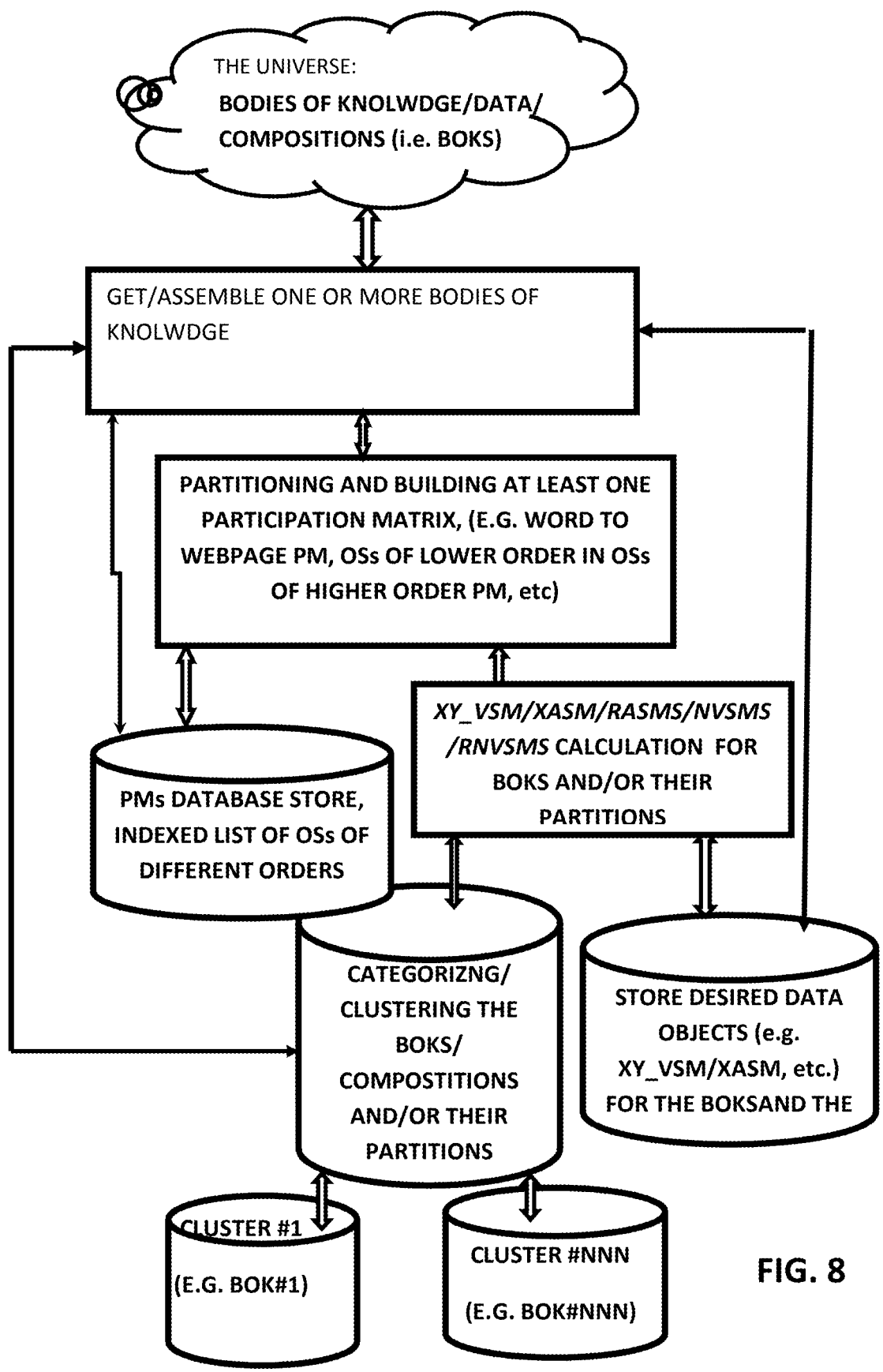
FIG. 8: a block diagram of an exemplary application and the associated system for ranking, filtering, storing, indexing, clustering the crawled webpages from the internet using various associations strengths (ASMs), conditional occurrence probabilities (COP) and "Value Significance Measures" (VSM) according to one embodiment of the present invention.
Figure 9:
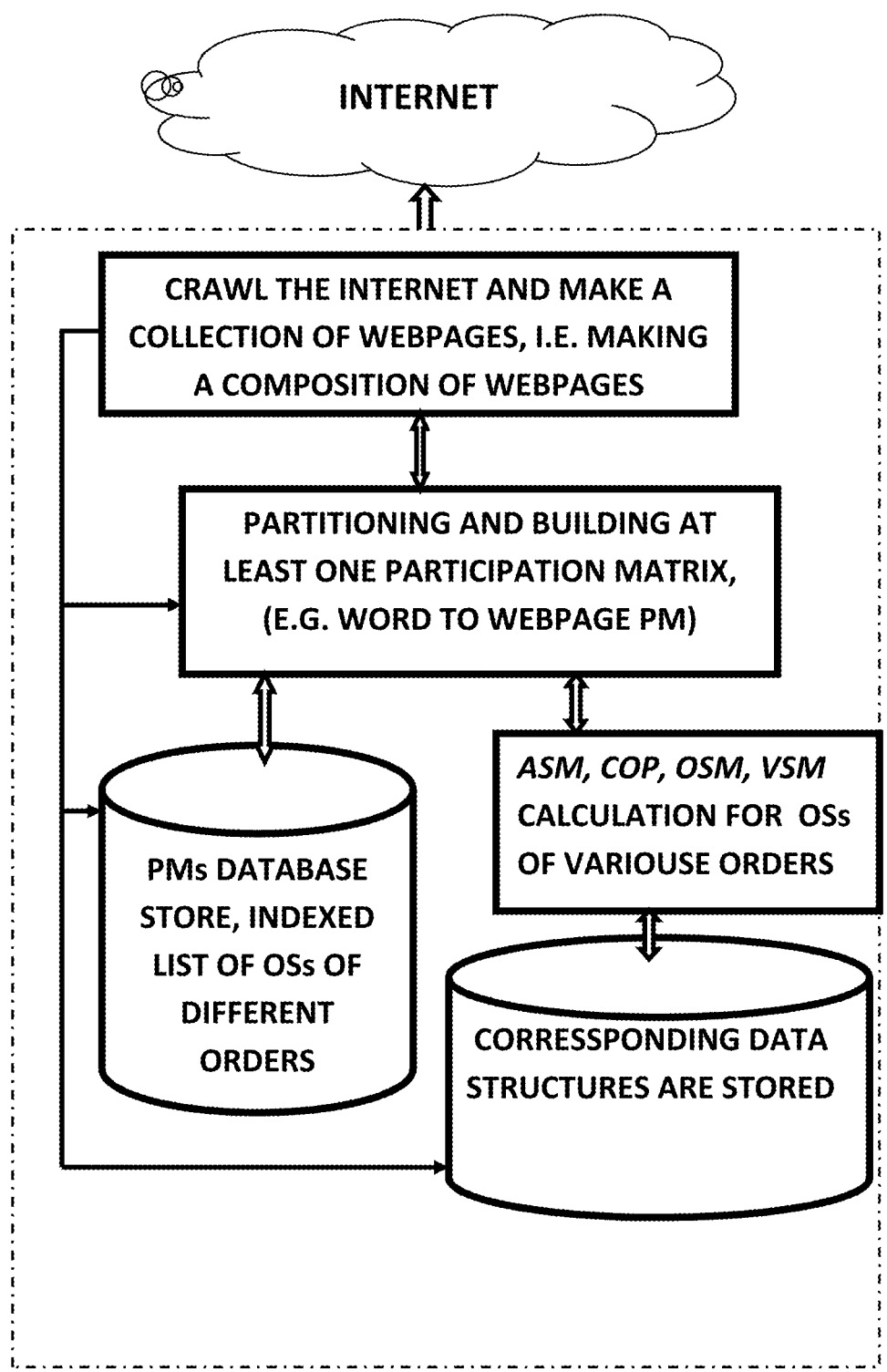
FIG. 9: a block diagram of an exemplary application and the associated system for ranking and storing the crawled webpages from the internet using Value Significance Measures (SVM).

Furthermore the asm vector can also be regarded as relative value significance of a OS in relation to another OS as shown in FIG. 7. FIGS. 8, 9 and 10 further shows further applications of such data objects (e.g. VSMs, ASMs, and other data objects of this disclosure) in investigation of bodies of data or bodies of knowledge.

According to another aspect of the invention, we also put a value of significance on each OS based on the amount of information that they contribute to the composition and also by the amount of information that composition is giving about the OSs.

To evaluate the information contribution of each OS we use the information about the association strength as being related to the probability of co-occurrence of each two OSs in the partitions of the composition. The probability of occurrence $OS_i^k$ after knowing the occurrence of $OS_j^k$ in a partition, e.g. $OS^l$, is considered to be proportional to the association strength of $OS_j^k$ to $OS_i^k$, i.e. the $$asm_{j\to i}^{k|l}.$$

Therefore we define yet another function named "Conditional Occurrence Probability ($COP^{k|l}$)" here as being proportional to $$asm_{j\to i}^{k|l}.$$

Hence to have entries of $COP^{k|l}$ as the following:

$$cop^{k|l}(i \mid j) = p^{k|l}(OS_i^k \mid OS_j^k) \propto asm_{j\to i}^{k|l}. \quad (20\text{-}3)$$

Considering that $\Sigma_j \; iop_j^{k|l} \cdot cop^{k|l}(i|j) = iop_i^{k|l}$ (total conditional probabilities of occurrences of $OS_i^k$ in a partition is equal to independent occurrence probability of $OS_i^k$ in that partition) we arrive at:

$$cop^{k|l}(i \mid j) = \frac{iop_i^{k|l} \cdot asm_{ji}^{k|l}}{\sum_q iop_q^{k|l} \cdot asm_{qi}^{k|l}} \quad (20\text{-}4)$$

In the matrix form let's call the corresponding matrix, with entries of $cop^{k|l}(i|j)$ as $COPM^{k|l}(OS_i^k|OS_j^k)$. The matrix $COPM^{k|l}$ can be made to a row stochastic (assuming the i showing the index of rows) but sparse (having many zero entries) and in terms of graph theories jargon it could be corresponded to an incomplete graph or a network. However if for mathematical and/or computational reasons it becomes necessary, it can be made to become a matrix that corresponds to a complete graph (every node in the graph is connected directly to all other nodes) by subtracting an small amount from the non-zero elements and distribute it into the zero elements so that processing of the matrix for further purposes can be performed without mathematical difficulties (no division by zero etc.). Also to note is that, since an ASM maybe constructed to represents any type of relationship or association between OSs of a given universe, a COPM or COP is generally an association strength measure by itself and when desired or appropriate can be used as an ASM data object.

II-III-II OSM from ASM

In the incorporated reference U.S. patent application Ser. No. 15,589,914, the concept of building Ontological Subject Maps (OSM) as a knowledge graph was extensively introduced and it is shown as how build such OSM graphs or data structures from one or more Association Strength Matrices.

Figure 4A:
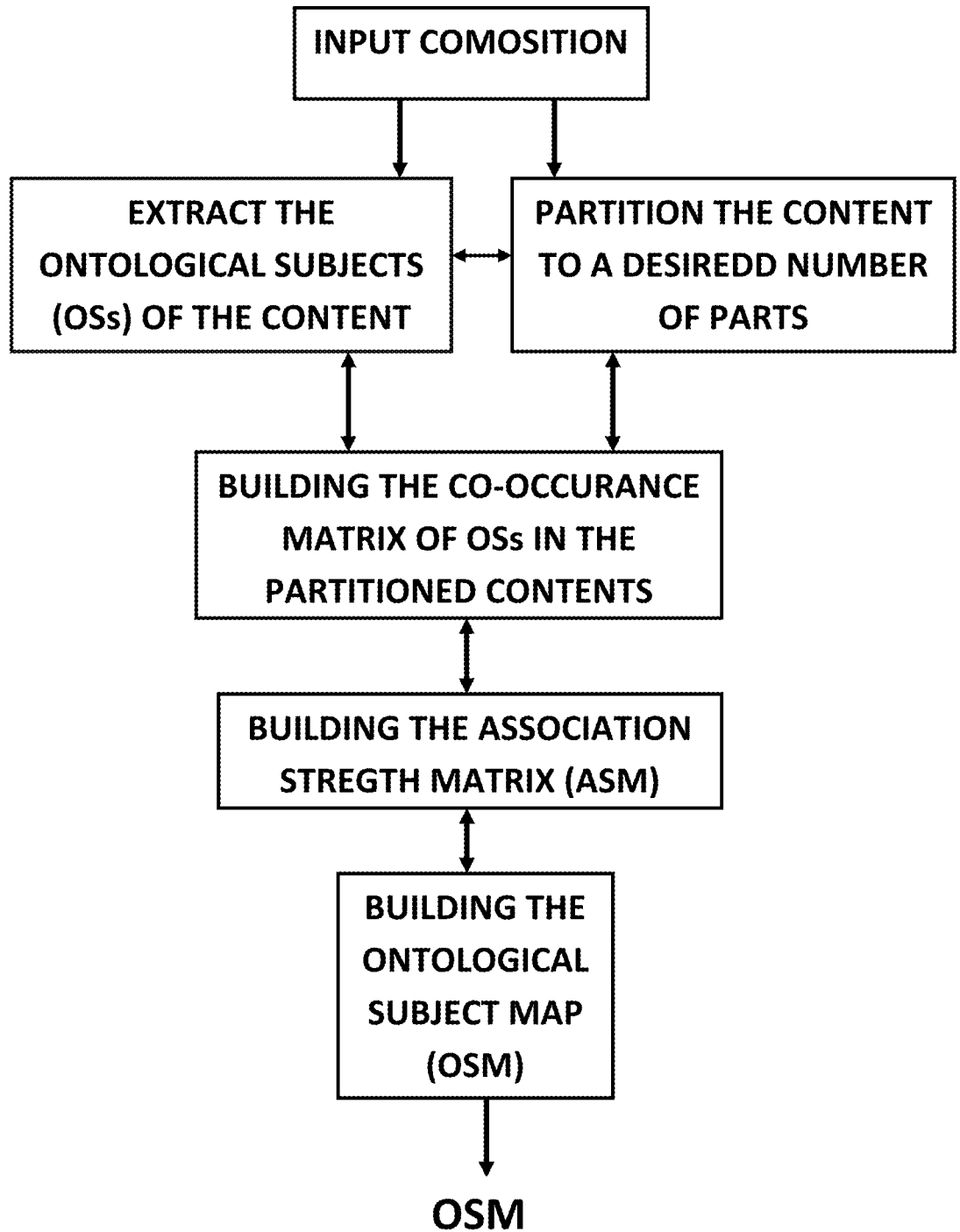
FIG. 4a: is a flowchart of building an Ontological Subject Map (OSM) from an input composition by building and using data structures of co-occurrences and association value/strength (various types of association strength such as direct, or indirect or novel association strengths) of ontological subjects of the composition.
Figure 4B:
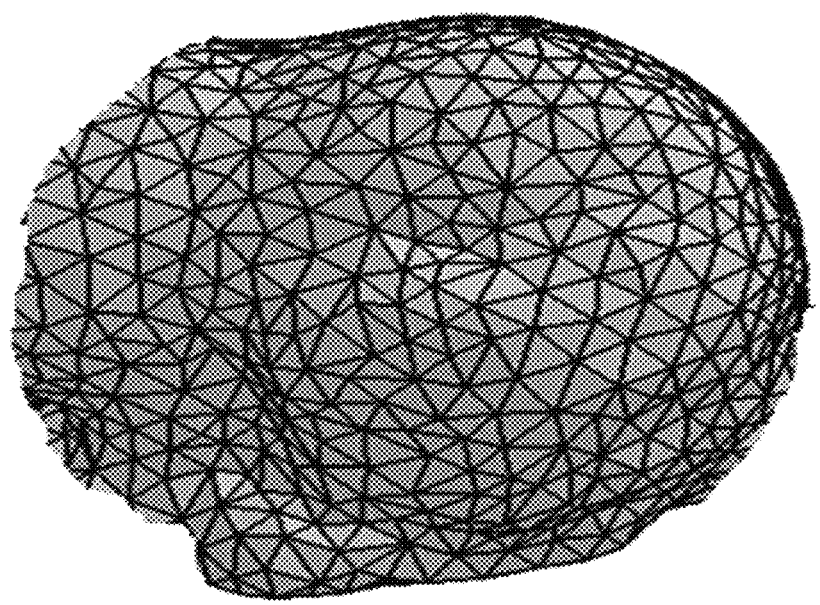
FIG. 4b: generally shows the free-form 3D shape (e.g. a 3D mesh) of a graphical representation of OSM of a composition. Different composition can give different 3D body shapes.

FIG. 4a therefore shows the block diagram of one basic exemplary embodiment in which it demonstrates a method of using the association strengths matrix (ASM) to build an Ontological Subject Map (OSM) or a graph. The map is not only useful for graphical representation and navigation of an input body of knowledge but also can be used to evaluate the value significances of the OSs in the graph as explained in the patent application Ser. No. 12/547,879 entitled "System and Method of Ontological Subject Mapping for knowledge Processing Applications" filed on Aug. 26 2009 by the same applicant. Utilization of the ASM introduced in this application can result in better justified Ontological Subject Map (OSM) and the resultant calculated significance value of the OSs.

Figure 4C:
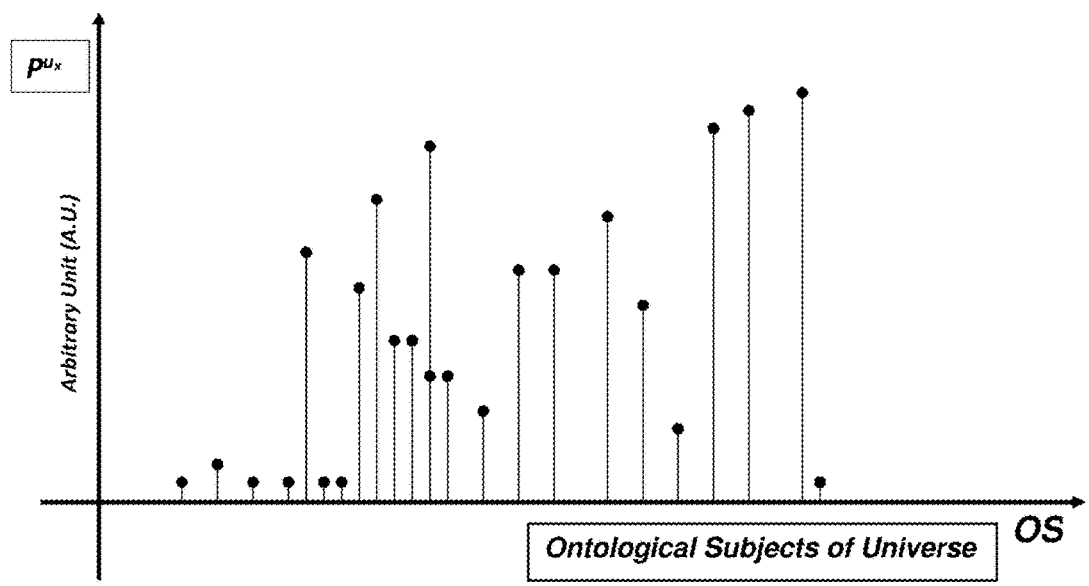
FIGS. 4c, and 4d: is an exemplary representation of Ontological Subject (OS) spectrum of a universe x versus its constituent OSs.
Figure 4D:
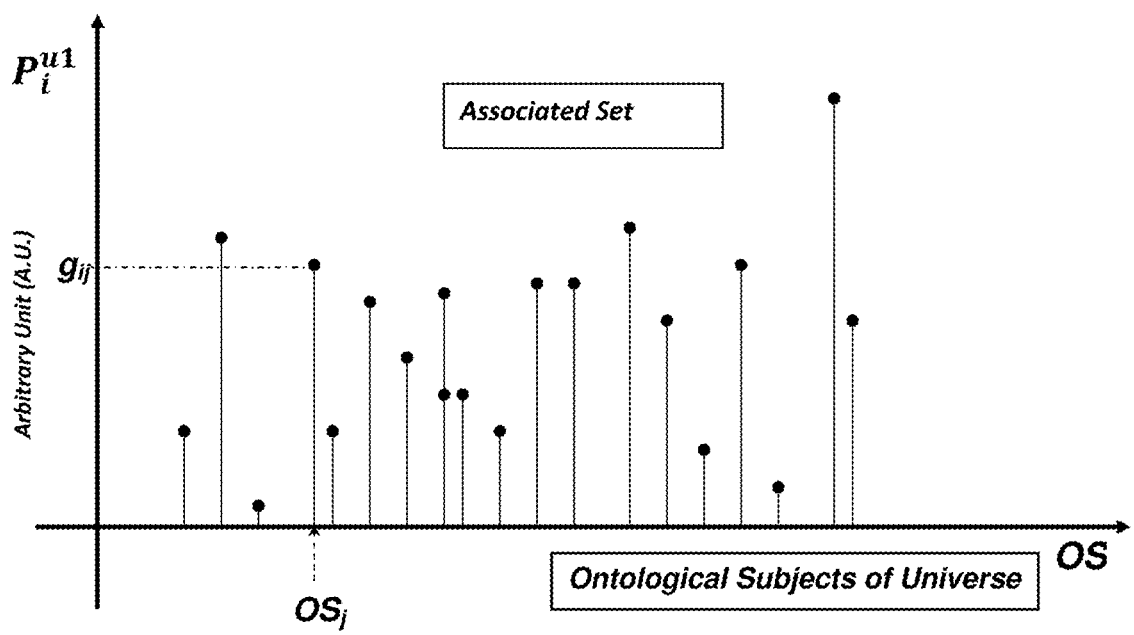

Referring to FIG. 4c now, the stationary OS value significance vector is shown as a discrete spectrum for an exemplary universe of a composition called $u_x$. FIG. 6 shows the value significance spectrum of the ith ontological subject of an exemplary universe called u1, i.e. $P_i^{u1}$. As seen in FIG. 4d, the value significance measure value of an individual ontological subject can be expanded versus the value significance values of its associated set of OSs. As mentioned before the associated set is in fact the adjacency list of each OS in the OSM (or an ASM) and their amplitude or associated power are the nonzero elements of the ith row of the matrix M or G.

II-III-II-I: an Examplary Uses of OSMs for Comparison and Merit Measurement

One of the motives and application of the method and system of the invention is to use the method and system to compare compositions against each other and/or a larger composition and/or a collection of compositions. In doing so, two approaches may be employed alternatively or both at the same time.

One, or the first, approach, which is in fact a special case of the other approach, is to extract the ontological subject set of a first composition, e.g. called $OS_{u1}$, and build the co-occurrence matrix in u1 for that set, and uses the same set to build the co-occurrence matrix in the partitioned compositions of universe 2, u2.

FIG. 5a shows one embodiment of implementing the OSM for two universes to be used for comparison, ranking, merit valuation and other applications. In FIG. 5a the ontological subject set of first composition, $OS_{u1}$, is extracted and used for constructing the co-occurrence matrix C from the u1, while we also construct co-occurrence of the same set, in the universe 2, u2, and consequently build the corresponding OSM for u1 and u2, i.e. $OSM_{u11}$ and $OSM_{u21}$ in FIG. 5a.

The universe 2 could be simply another composition or could be a larger universe with more partitioned compositions, such as a collection of compositions, a corpus, or a collection of related compositions obtained from the internet using search engines, etc. In one important case the universe 2 is the repository of the whole internet which in that case the universe 2 is close to our real universe.

Commercial or in house search engine databases can be used to get the co-occurrences counts of each two OSs from the internet. When using internet and search engine, building a co-occurrence matrix could involve simply the "Boolean AND" search for each two OSs and looking at the hit counts. When the number of partitions or the compositions found in the internet, containing both OSs, is large enough, which is usually the case, the hit number is a good approximation of co-occurrence of each two OS in our universe. However for a more certainty in constructing co-occurrence matrix one may chose to download a plurality of composition form the internet and construct the co-occurrence matrix of OS, in that collection of compositions which form the universe 2, u2. Using the teachings of the present invention we can then build two OSMs for the ontological subjects derived from u1. One of the OSM is build from the composition of u1 and another is build from composition of another universe say u2. The resulting OSMs denoted as $OSM_{u11}$ and $OSM_{u21}$ respectively as shown in FIG. 5a.

As mentioned and showed above, the teachings of this disclosure is applied for instance to the case of psychiatry. In this instance, a composition is gathered and assembled from patient seeking psychotherapy help. Usually a patient counselling or seeking advice from a psychiatrist is suffering from unknown mental, memories, expiries of life, thoughts, feelings, and the like. The Therapist can record one or more of psychotherapy sessions, (e.g. the conversation, interview, information gathered, etc) and then, for instance, transfer or converts the recorded content (e.g. by using speech to text convertors) into text, i.e. making a textual composition). One or more of the systems and methods described here, is used to build a graphical representation of the thoughts, knowledge or basically modelling the personality of the patent and enables the psychotherapist/psychiatrist to be explore and see the deficiencies of his/her patient and give an advices accordingly. The process however can be fully automatic if the psychiatrist is also a machine or at least assisting the human psychiatric in exploring the remedies to his/patent and give the best advice to both the doctor and the patent. In this case the body of knowledge gathered from the patient as a composition to be examined and compared/consulted with a reference body of knowledge (i.e a reverence body of knowledge can be very large corpuses of patient bodies of knowledge or vast literature or a body of knowledge comprising the data and information about average or mentally healthy people etc.)

The other approach is to expand the number of OSs beyond the set of $OS_{u1}$ FIG. 8 shows that in this embodiment the extracted set of OS from u1, i.e. $OS_{u1}$, is used to construct $OSM_{u11}$, while by retrieving or obtaining more compositions containing one or more members of $OS_{u1}$, more associated OSs is extracted from those compositions and a desired number of total OS is selected, which is denoted by $OS_{u21}$ in FIG. 5b. We then build the co-occurrence matrix C for the extended set of $OS_{u21}$ in the universe 2 and build the corresponding OSM as denoted in FIG. 8 by $OSM_{u21}$.

To find more compositions containing one or more members of $OS_{u1}$ we can use internet and search engine, or we can search in a premade database of composition such as large corpuses or collections of diverse compositions. Also, for instance, to find more associated OS for $OS_{u1}$ and expand the spectrum, we can use the strongest OSs in universe 1, derived from $OSM_{u11}$, and then search in the internet to get more related compositions from which more associated ontological subjects can be extracted.

Usually one of the universes (often the larger one) is used as the reference universe. The larger universe refers to a universe which has a higher number of ontological subjects, i.e. more knowable objects or subjects. The dimension of the OSM or the resulting matrix M or G is determined by the number of OSs from the larger universe. Hence the matrixes M and G for $OSM_{u11}$ and $OSM_{u21}$, and their corresponding stationary vector $P^{u11}$ and $P^{u21}$ will have the same dimension.

FIGS. 5c, and 5d, show the spectrums of stationary power vectors versus their constituent ontological subjects derived from universe 1 and 2. For example FIG. 5c shows the OS spectrum of $OS_{u1}$ derived from content of universe 1, $P^{u11}$, and FIG. 5c shows the OS spectrum of $OS_{u1}$ derived from the contents of universe 2, $P^{u21}$. It is seen that, the first approach is, in fact, a special case of the second approach in which the set of $OS_{u21}$ is the same as set of $OS_{u1}$. Therefore FIGS. 5ca and 5d can be used to represent both approaches.

The co-occurrence matrix of the universe with lesser number of OS, will have zero co-occurrence for those OS that do not exist in that universe. For comparison application, the OS axis covers (e.g. have the same dimension as) the larger universe OS members. In one particular, but important case, the OS axis could be universal and containing the largest possible number of OS (all the OSs that have existed or known to the present time).

Referring to FIGS. 5c and 5d again, as seen the stationary power spectrums obtained from the content of universe 1 and universe 2 can be different. Apparently the corresponding matrixes, e.g. C, M, and G can also be essentially different. The differences convey important information about the validity, authoritativeness, novelty and generally the merits of a composition in larger contexts.

FIG. 5e shows that a composition can also be identified with its dominant OSs using the resulting envelop spectrum by filtering out less powerful OS components. Those OSs components with less power than a predetermined threshold value might be treated as noises in some applications. Discrete Fourier transformation techniques may be employed for the OS power spectrum for variety of processing such as filtering and summarization as well as novelty detection, knowledge discovery etc.

Now consider that we want to analyze and asses a composition of universe 1 ($u_1$) in the context of a reference universe 2 ($u_2$). That is to use the ontological subjects of $u_1$ to construct the co-occurrence matrix in both universes. We can, then, build the OSM for each of the universes and construct the matrix M or G and consequently the power vector P for each universe. We now introduce few exemplary measures of merit for a composition of u1, in the context of a reference universe 2, u2. For example one measure of merit or merit parameter can be defined as:

$$mp_1 = \frac{P^{u11} \cdot P^{u21}}{\|P^{u11}\| \cdot \|P^{u21}\|} \quad (21\text{-}1)$$

where $mp_1$ is the merit parameter 1, and $\|\|$ in the norm of a vector. This merit measure is in fact a measure of correctness and substance of the composition of u1 in the context of reference u2. This measure can be readily used for ranking contents, e.g. ranking the contents of web pages or ranking documents in a collection of documents, etc. As seen by those skilled in the art one of the advantages of the power spectrum notion of compositions is the ability to use the well known method of spectral analysis and signal processing in dealing with text compositions or generally content analysis.

The association value matrix A and/or the adjacency matrix M and/or the power matrix G also convey interesting and important information about the content of composition of u1. For instance, another useful set of data related to measures of merit of a composition in the context of the reference universe u2, are obtained by the differential power matrix which is defined as:

$$G^d = [G_{u1} - G_{u2}]. \quad (21\text{-}2)$$

wherein $G^d$ is the differential value/power matrix which contains interesting and valuable information about authoritativeness, novelty and/or substance of a composition compared with a reference universe of u1.

The matrix $G^d$ can be represented visually by using desirable tools and methods. When the matrix $G^d$ is represented visually, interesting features of the composition of u1 in the context of u2 can be seen. For example when there is a perfect match then the $G^d=0$ and no bump or intensity difference in the mesh or plot can be seen. However, when $G^d \neq 0$ the mesh or plot can show the location and intensity of differences visually, and guide a user to look into these areas for further analysis and investigation. Therefore $G^d$ can point to novelty, new knowledge, or flaws in the composition.

When the reference universe is large enough, the reference universe can be viewed as the contemporary collective knowledge of people as whole or a large group of people expert in a domain of knowledge. For instance, the sum of all rows or columns of the differential matrix, $G^d$, is an indication of magnitude of general deviation of a composition from the status quo knowledge or collective understanding of the present time about a subject. Alternatively a sum over a row or a column of the differential matrix, $G^d$, is a measure of local differences and deviation of power and emphasis of each OS, used in the composition, from the collective wisdom or collective knowledge of people about that OS.

Depends on the application, more sophisticated or detailed analysis can be introduced or used without departing from the scope and spirit of the invention. For example one may define another measure of merit or merit parameter as follow:

$$mp_2 = \frac{\sum_j \sum_i \left(m_{i,j}^{u11}\sqrt{p_i^{u11}} - m_{i,j}^{u21}\sqrt{p_i^{u21}}\right)^2}{\|P^{u11}\| \cdot \|P^{u21}\|} \quad (21\text{-}3)$$

where $mp_2$ is the second exemplary merit parameter, $P^{u11}$ and $P^{u21}$ are the value/power vector of the universe 1 and 2 respectively, $p_i^{u11}$ and $p_i^{u21}$ are the power of $OS_i$ derived from $OSM_{u11}$ and $OSM_{u21}$ respectively, and $mu_{i,j}^{u11}$ and $m_{i,j}^{u21}$ are the elements of the matrix M corresponding to $OSM_{u11}$ and $OSM_{u21}$ respectively. Here $mp_2 \geq 0$ and may be a more accurate measure of similarity and substance than $mp_1$.

II-III-III Other Value Evaluation of the Ontologica Subjects

In accordance with another aspect of the invention, the second measure of significance is defined in terms of the "cumulative association strength" of each OS. This measure can carry the important information about the usage pattern and co-occurrence patterns of an OS with others. So the second value significance measure $VSM2_i^k$ for an $OS_i^k$ is defined versus the cumulative association strength that here is called "Association Significance Number ($ASN_i^k$)", will be:

$$VSM2_i^{k|l}=ASN_i^{k|l}=\Sigma_j asm_{ji}^{k|l} i,j=1 \ldots N \quad (22)$$

The $VSM2_i^k$ is much less noisy than $VSM1_i^k$ and fairly simple to calculate. It must be noticed that $ASN_i^k$ is an indication of how strong other OSs are associated with $OS_i^k$ and not how strong $OS_i^k$ is associated with others. Alternatively it would be important to know a total quantity for association strength of an $OS_i^k$ to others which is $\Sigma_j asm_{ij}^{k|l}$ (the difference here with Eq. 21 is in the ij instead of ji in the summation). This quantity is also an important measure which shows overall association strength of $OS_i^k$ with others. The difference of $\Sigma_j asm_{ji}^{k|l} - \Sigma_j asm_{ij}^{k|l}$ is also an important indication of the significance of the $OS_i^k$ in the composition. The latter quantity or number shows the net amount of importance of and OS in terms of association strengths exchanges or forces. This quantity can be visualized by a three dimensional graph representing the quantity $\Sigma_j asm_{ji}^{k|l} - \Sigma_j asm_{ij}^{k|l}$. A positive number would indicate that other OSs are pushing the $OS_i^k$ up and negative will show that other OSs have to pull the $OS_i^k$ up in the three dimensional graph. Those skilled in the art can yet envision other measures of importance and parameters for investigation of importance of an OS in the composition using the concept of association strengths.

As an example of other measures of importance, and in accordance with another aspect of the invention and as yet another measure of value significance we notice that it would be helpful and important if one can know the amount of information that an OS is contributing to the composition and vice versa. To elaborate further on this value significance measure we notice that it is important if one can know that how much information the rest of the composition would have gained if an OS has occurred in the composition, and how much information would be lost when on OS is removed from the composition. Or saying it in another way, how much the composition is giving information about the particular OS and how much that particular OS add to the information of the composition. The concept of conditional entropy is proposed and is applicable here to be used for evaluation of such important value measure. Therefore, we can use the defined conditional occurrence probabilities (COP) to define and calculate "Conditional Entropy Measures (CEMs)" as another value significance measure.

Accordingly, yet a slightly more complicated but useful measure of significance could be sought based on the information contribution of each $OS_i^k$ or the conditional entropy of $OS_i^k$ given the rest of $OS^k$ s of the composition are known. The third measure of value significance therefore is defined as:

$$VSM3_i^{k|l}=CEM1_i^{k|l}=H_i^{k|l}=H_j(OS_i^k|OS_j^k)=-\Sigma_j iop_j^{k|l} \cdot cop^{k|l}(i|j) \log_2(cop^{k|l}(i|j)) \log_2(cop^{k|l}(i|j)), i, j=1 \ldots N \quad (23)$$

wherein $H_j$ stands for Shannon-defined type entropy that operates on j index only. In Eq. 23 any other basis for logarithm can also be used and $CEM1_i^{k|l}$ stands for first type "Conditional Entropy Measure" and $H1_i^{k|l}$ is to distinguish the first type entropy according to the formulations given here (as opposed to the second type entropy which is given shortly). This is the average conditional entropy of $OS_i^k$ over the M partitions given that $OS_j^{k|l}$ kit has also participated in the partition. That is every time $OS_i^k$ occurs in any partition we gain H bits of information.

And in accordance with yet another aspect of the invention another value significance measure is defined as:

$$VSM4_i^{k|l}=CEM2_i^{k|l}=H2_i^{k|l}=H_j(OS_j^k|OS_i^k)=-iop_i^{k|l} \Sigma_j cop^{k|l}(j|i) \log_2(cop^{k|l}(j|i)), i,j=1 \ldots N \quad (24)$$

where $H_j$ stands for Shannon-defined type entropy that operates on j index only again, and wherein $CEM2_i^{k|l}$ stands for the second type "Conditional Entropy Measure" and $H2_i^{k|l}$ is to distinguish the second type entropy according to the formulations given here. That is the amount of information we gain any time an $OS^k$ other than $OS_i^k$ occurs in a partition knowing first that $OS_i^k$ has participated in the partition.

And in accordance with another aspect of the invention yet another important measure is defined by:

$$VSM5_i^{k|l} = DCEM_i^{k|l} = CEM1_i^{k|l} - CEM2_i^{k|l} = -VSM3_i^{k|l} - VSM4_i^{k|l}, i=1\ldots N \quad (25)$$

where $DCEM_i^{k|l}$ stands for "Differential Conditional Entropy Measure" of $OS_i^k$. The $DCEM_i^{k|l}$ and is a vector having N element as is the case for other VSMs. The $VSM5_i^{k|l}$ is an important measure showing the net amount of entropy or information that each OS is contributing to or receiving from the composition. Though the total sum of $DCEM_i^{k|l}$ over the index i, is zero but a negative value of $VSM5_i^{k|l}$ (i.e. $DCEM_i^{k|l}$) is an indication that the composition is about those OSs with negative $VSM5^{k|l}$. The $VSM5^{k|l}$ is much less nosier than the other value significance measures but is in a very good agreement (but not exactly matched) with $VSM2^{k|l}$, i.e. the association significance number ($ASN^{k|l}$). This is important because calculating ASN is less process intensive yet yields a very good result in accordance with the all important $DCEM^{k|l}$.

Also important is that either of $CEM1^{k|l}$ or $CEM2^{k|l}$ can be also used (multiplying either one by $FO_i^{k|l}$) for measuring or evaluating the real information of the composition in terms of bits (wherein bit is a unit of information according to he Information Theory) which could be considered as yet another measure of value significance for the whole composition or the partitions therein. For instance, this measure can be used to evaluate the merits of a document among many other similar or any collection of documents. The information value of the OSs or the partitions (by addition the individual information of the its constituent OSs) is a very good and familiar measure of merit and therefore can be another good quantity as an indication of value significance.

Those skilled in the art can use the teachings, concepts, methods and formulations of value significance evaluation of ontological subjects and the partitions of the composition with various other alterations and for many applications. We now lunch into describing a number of exemplary embodiments of implementing the methods and the exemplary related systems of performing the methods and some exemplary applications in real life situations.

Figure 3A:
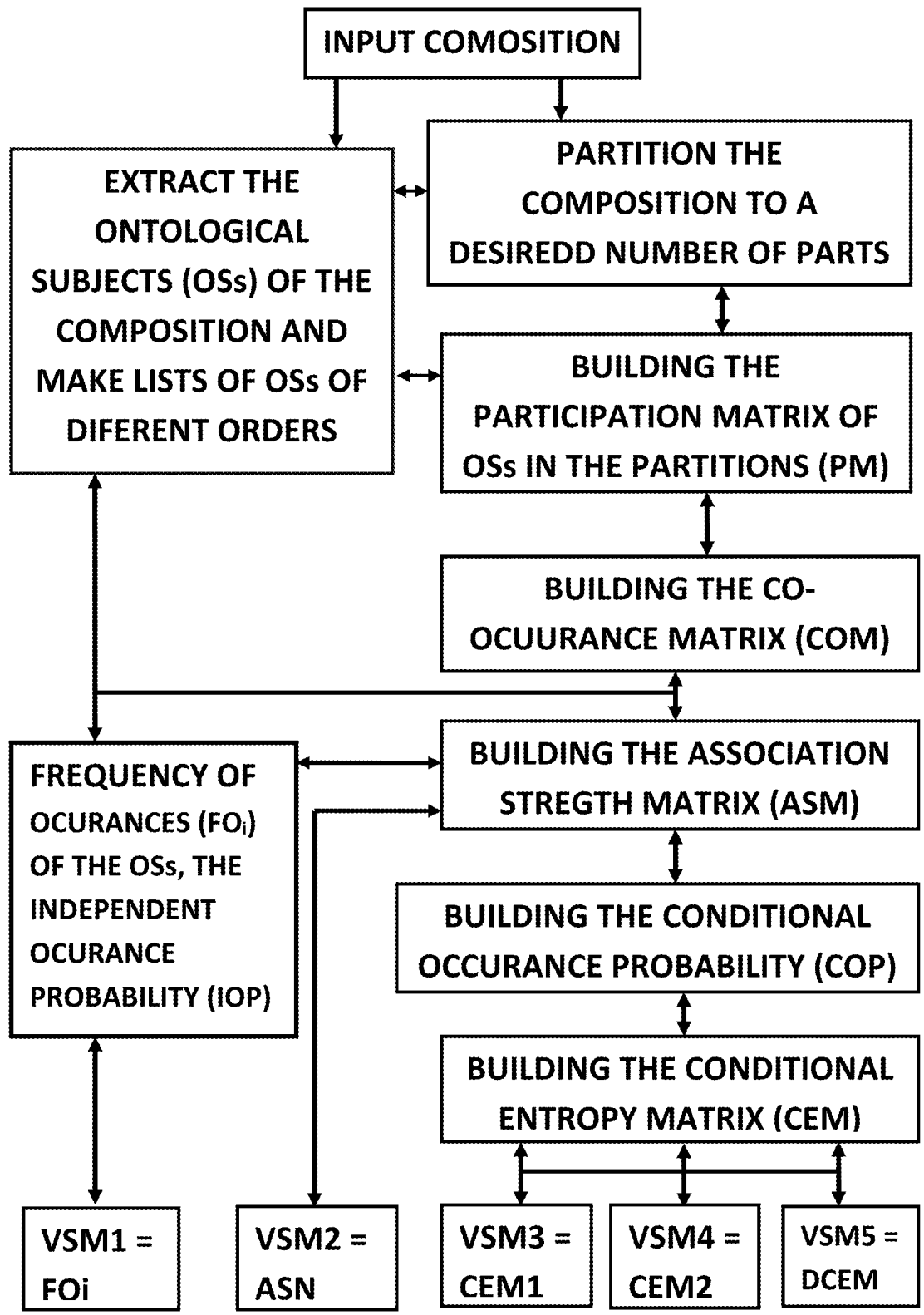
FIG. 3a: shows a block diagram of one preferred embodiment of the method and the algorithm for calculating a number of exemplary "Value Significance Measures" of the of ontological subjects.

Referring to FIG. 3a now, it shows the block diagram of one basic algorithm of calculating a number of "Value Significance Measures" of the Ontological Subjects of an input composition according to the teachings of the invention. As seen the input composition is partitioned to a number of desirable partitions and the lower order OSs of partitions are also extracted and indexed in various lists of OSs of different orders. In the preferred embodiment of the method the partitions would be textual semantics units of different lengths such as paragraphs, or sentences and chapters. Again in an exemplary embodiment we may consider words and some special characters and symbols as OS order 1, the sentences as OS order 2, the paragraphs as order 3, the sections as OS order 4, and individual documents as OSs of order 5. The input composition can be a single man-made article, a number of documents, or a huge corpus etc. There is no limit on the length of the composition. In an extreme case the input composition might be the whole internet repositories.

Looking at FIG. 3a again, it further shows the steps in detail for performing the methods and the algorithms. After partitioning and extracting the OSs of desired orders, the participation matrix or matrices of desired dimensions and orders are built from which the co-occurrence matrix/s (COM) is built. The Frequency of Occurrence (FO) can be obtained by counting the OSs while extracting them from the composition or can be obtained from the Co-Occurrence Matrix as indicated in Eq. 5, and hence obtaining the Independent Occurrence Probability (IOP) of each OS of the desired order using Eq. 6. The first value significance measure (VSM1) can then be calculated according to Eq. 9. Having obtained the IOP and COM consequently the "Association Strength Matrix (ASM)" is calculated, (according to Eq. 4, and 6) from which the second "Value Significance Measure (VSM2)" is obtained using Eq. 21. Having ASM, thereafter the "Conditional Occurrence Probability" (COP) for each desirable pairs of OSs are calculated as the entries of the COP matrix (according to Eq. 8). From the Conditional Occurrence Probability the various combinations of Conditional Entropy Measures, i.e. CEM1, CEM2, DCEM are calculated according to Eq. 23, 24, and 25.

It is noted that obviously one can select only the desirable OSs of any order in building one or more of the matrix objects of the invention. Moreover, one does not need necessarily to calculate all of the VSMs that have been included in the general algorithm of FIG. 3. FIG. 3a is for showing one basic exemplary embodiment to illustrate the relations and the method and algorithm of calculating or evaluating a number of distinct VSMs that were disclosed in the description.

Figure 3B:
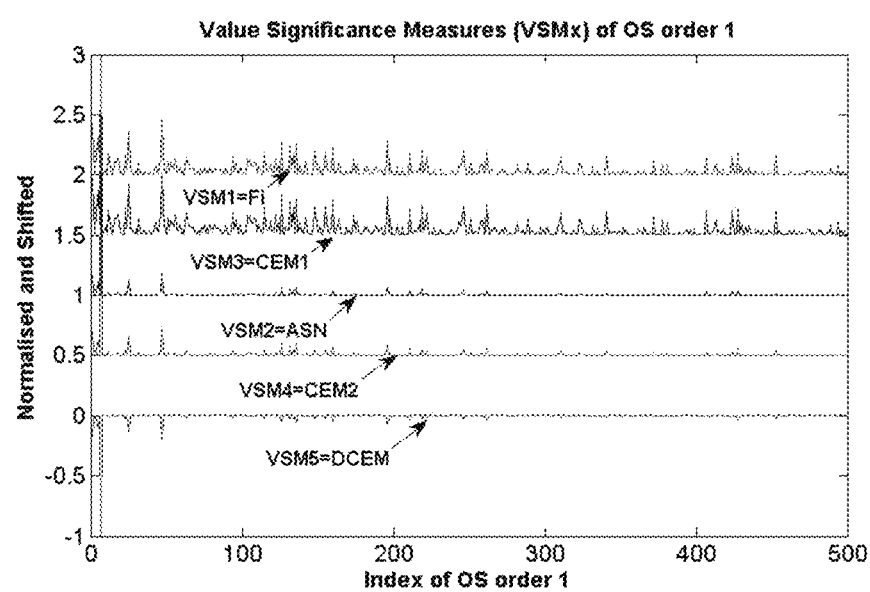
FIGS. 3b and 3c shows depictions of exemplary graphs of the various resultant normalized VSMs for first order OSs participated in an exemplary composition.
Figure 3C:
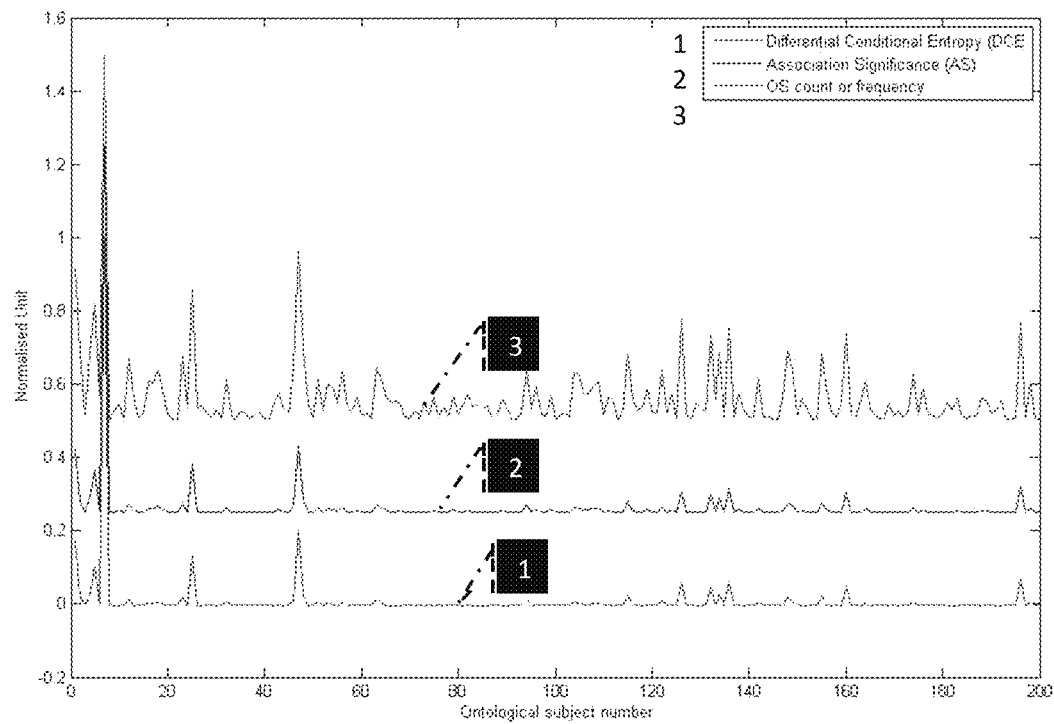
Figure 3D:
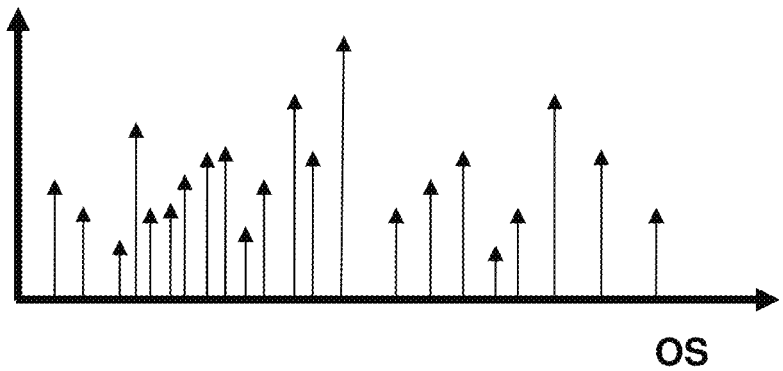
FIGS. 3d, 3e, 3f, show the exemplary values and one way of representing the values of the different conveyers of the different types of the "value significance measures".
Figure 3E:
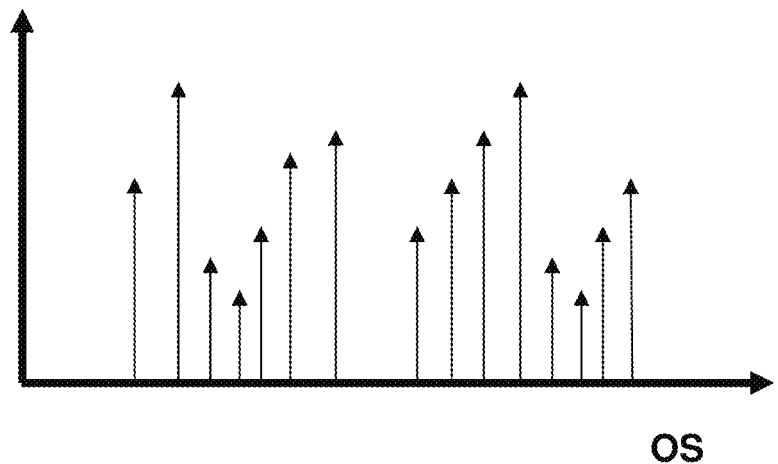
Figure 3F:
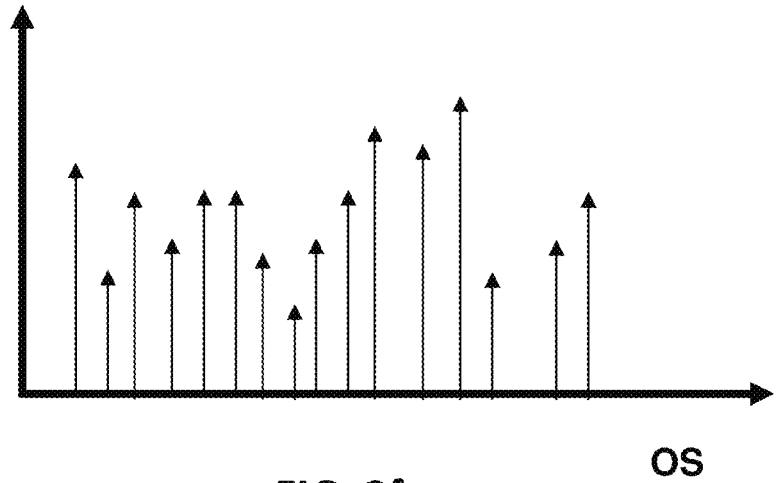

FIGS. 3b and 3c, compares these different measures of significance for an exemplary textual input composition. The VSMs have been evaluated for a short text, actually a research paper, as an example to illustrate the normalized various measures of value significances disclosed in this invention. The OSs of the first order are the words and the second order OSs are the sentences of the text. These data have been calculated from the $PM^{12}$ of the exemplary text. This is only to demonstrate the calculation and implementation of the method and algorithm and an exemplary illustrating figure for representing the VSMx (x is 1, 2, 3, . . . etc). The results for large bodies of knowledge and corpuses must be more well pronounced and having more meaningful interpretations. The resulting similar figures for different compositions can be substantially different from the depicted exemplary figures presented here. Furthermore, more figures and curves can be made which could be substantially different and/or show various other functions, values, and other desired parameters.

As seen in FIG. 3b the $VSM1_i^{1|2}$ and $VSM3_i^{1|2}$, for the exemplary composition, have very good resemblance and are highly similar and correlated showing that the CEM1 almost resembles the FO and IOP while the $VSM2_i^{1|2}$ and $VSM4_i^{1|2}$ also resemble each other very well but a lot less noisy than $VSM1_i^{1|2}$ and $VSM3_i^{1|2}$. The $VSM5_i^{1|2}$ (DCEM) also is very similar to $VSM2_i^{1|2}$ and $VSM4_i^{1|2}$ but the correlation is negative (close to $-1$).

It should be emphasized that the results depicted in FIGS. 4a and b, observations, and the interpretations are for a very particular input composition and should not be viewed as general behaviors of the functions and objects that are introduced in this invention. They are only depicted here to show exemplary illustrating ways of investigating the results and the computations of the functions and mathematical objects of the invention. The method and the formulation however is general and is applicable to any size and type of composition as long as the computation expenditure allows.

The interesting and important observation is that the $VSM3_i^{1|2}$, i.e. Conditional Entropy Measure of type 1 (Eq.

23), has followed the Frequency of Occurrence (FO) or equivalently the Independent Occurrence Probability $iop_i^{1|2}$ (Eq. 7). That means the behavior of the entropy of $OS_i^1$ knowing the rest of the composition (Eq. 11) is almost independent of the interrelationships of the OSs in this composition. So knowing the rest of the composition does not affect the general form of the CEM1 from the independent occurring entropy. i.e the $-iop_i^{k|l} \log_2 iop_i^{k|l}$ which will be quite similar to the IOP or FO.

However, the $VSM4_i^1$, i.e. Conditional Entropy Measure of type 2 (Eq. 23), has only followed the Association Strength Number (ASN) and although much less noisy but follow the OSs with high Independent Occurrence Probability $iop_i^{1|2}$ (Eq. 7). That means the behavior of the entropy of the rest of composition knowing the $OS_i^1$ depends on the ASN and strength of the $OS_i^1$ association (Eq. 10 or 12) and is in favor of the highly popular OSs. So knowing the highly popular OSs contribute greatly to the Conditional Entropy Measure of type 2 (Eq. 23).

More importantly is the behavior of DCEM, the sum of DCEM is zero but it has negative values for highly popular (large FO) OSs. That means for those popular OSs who have many real associates the net entropy or information contribution is negative while for the less popular is positive. An interpretation could be given that all OSs of the composition are there to describe and give information about the popular OSs who have real (strong enough) associations. It implies that not all the popular OSs are important if they do not have real bounded associates. The real bounding is the reflection of the usage and the patterns of OSs together in the composition. In other words those OSs having a high value significance are usually the popular ones but the reverse is not always true.

Another explanation is that most popular OSs have many associates or have co-occurred with many other OSs. Those many other associates have been used in the composition to describe the most popular OSs. In other words a natural composition (good intentioned composed composition) is mostly about some of the most popular OSs of the composition. So it is not only the Frequency of Occurrence that count here but the pattern of their usage and the strength of their association (which is asymmetric). In conclusion the negative DCEM means other OSs are giving away information about those OSs with negative DCEM. This feature can be useful for keyword extraction or tagging or classification of documents beside that it shows the importance and significance of the OS having negative DCEM.

Those OSs with the negative DCEM or high ASN can be used for classification of compositions. However investigation of the differences in the various VSMs can also reveal the hidden relationships and their significance as well. For example if an OS has gained a better normalized rank in $VSM5_i^1$ compared to $VSM1_i^1$ then that can point to an important novelty or an important substance matter. Therefore those experts in the art can yet envision other measures of significance employing one or more of these VSMs without departing from scope, concepts and the purpose of this invention.

It also should be emphasized again that the results depicted in FIGS. 3b and 3c, observations, and the interpretations are for a very particular input composition. They are only depicted here to show exemplary illustrating ways of investigating and representing the results and the computations of the functions and mathematical objects of the invention.

It is also evident that at this stage and in accordance with the method and using one or more of the participation matrix and/or the consequent matrices one can still evaluate the significance of the OSs by building a graph and calculating the centrality power of each node in the graph by solving the resultant eigen-value equation of adjacency matrix of the graph as explained in patent application Ser. No. 12/547,879 and the patent application Ser. No. 12/755,415.

FIG. 4a therefore shows the block diagram of one basic exemplary embodiment in which it demonstrates a method of using the association strengths matrix (ASM) to build an Ontological Subject Map (OSM) or a graph. The map is not only useful for graphical representation and navigation of an input body of knowledge but also can be used to evaluate the value significances of the OSs in the graph as explained in the patent application Ser. No. 12/547,879 entitled "System and Method of Ontological Subject Mapping for knowledge Processing Applications" filed on Aug. 26 2009 by the same applicant. Utilization of the ASM introduced in this application can result in better justified Ontological Subject Map (OSM) and the resultant calculated significance value of the OSs.

However, according to the exemplary results of FIGS. 4a and b, one might prefer value significance measures of $VSM2^{k|l}$, i.e. the $ASN^{k|l}$, and the $VSM5^{k|l}$, i.e. $DCEM^{k|l}$, which yield sharper measures of an OS value in the composition with reasonable processing complexity.

The association matrix could be regarded as the adjacency matrix of any graphs such as social graphs or any network of any thing. For instance the graphs can be built representing the relations between the concepts and entities or any other desired set of OSs in a special area of science, market, industry or any "body of knowledge". Thereby the method becomes instrumental at identifying the value significance of any entity or concept in that body of knowledge and consequently be employed for building an automatic ontology. The VSM1, 2, . . . $5^{k|l}$ and other mathematical objects can be very instrumental in knowledge discovery and research trajectories prioritizations and ontology building by indicating not only the important concepts, entities, parts, or partitions of the body of knowledge but also by showing their most important associations.

Various other value significance measures using one or more functions, matrices and variables can still be proposed without departing from the scope, sprit, and the concepts introduced in this invention. For instance sum of the elements of the Co-Occurrence Matrix (COM) over the row/column can also be considered as yet another VSM.

Nevertheless, one might prefer to use VSM of VSM2, VSM4, or VSM5, for her/his application, which takes into account the usage and pattern of usage of OSs to each other in the form of the defined exemplary association strength as shown in FIG. 2a.

The VSM has many useful and important applications, for instance the words of a composition with high normalized VSM can be used as the automatic extraction of the keyword and relatedness for that composition. In this way a plurality of compositions and document can be automatically and much more accurately be indexed under the keywords in a database. Another obvious application is in search engines, webpage retrieval, and many more applications such as marketing, knowledge discovery, target advertisement, market analysis, market value analysis of economical enterprises and entities, market research related areas such as market share valuation of products, market volume of the products, credit checking, risk management and analysis, automatic content composing or generation, summarization, distillation, question answering, and many more.

In the next section the value significances of the lower order OSs, e.g. words, are used to evaluate the value significances of larger parts of the composition e.g. paragraphs, sentences, or documents of a collection of documents.

II-III-V Value Evaluation of the Higher Order Ontologica Subjects

The value significance of higher order OSs, e.g. order l in here, can be evaluated either by direct value significance evaluation similar to the lower order OSs, or can be derived from value significance of the participating lower orders into higher order. Conveniently one can use the VSMx$_i^{k|l}$ (x=1, 2 ... 5) and the participation matrix PM$^{k|l}$ to arrive at the VSMx$_q^{l|k}$ of higher order OSs or the partition of the composition as the followings:

$$\text{VSMx}_p^{l|k} = \Sigma_p \text{VSMx}_p^{k|l} \text{pm}_{pq}^{kl} \quad (26).$$

Eq. (26) can also be written in its matrix form to get the whole vector of value significance measure of OSs of order l|k (l given k). i.e. VSMx$^{l|k}$, as a function of the participation matrix PM$^{kl}$ and the vector VSMx$^k$.

Moreover other methods of value significance such as the ones introduced in the patent application Ser. No. 12/755,415 can be employed. Again the most convenient one could be:

$$\text{VSM1}^{l|k} = (\text{PM}^{kl})'*\text{VSM1}^{k|l} = (\text{PM}_{kl})'*\text{FO}^{kl} \quad (27)$$

which can be shown to be a special case of Semantic Coverage Extent Number (OSEN) introduced in the provisional patent Ser. No. 12/755,415, when the similarity matrix (see the Ser. No. 12/755,415 application) is simply SM$^{l|k}$=(PM$^{kl}$)' *PM$^{kl}$ and OSEN$_i^{l|k}$=$\Sigma_j$sm$_{ij}^{l|k}$.

Depends on the application, the size of the composition, available processing power and the needed accuracy, one can select to use one or more of the Value Significance Measures (VSMs) for the desired applications.

In one embodiment the VSM4$_i^k$ (i.e. CEM2$_i^k$) is used for better clarity and sharpness.

Looking more closely at FIG. 3b, reveals that the VSM1$_i^{2|1}$ and VSM3$_i^{2|1}$ are quite similar (highly correlated) while VSM2$_i^{2|1}$, VSM4$_i^{2|1}$, and VSM5$_i^{2|1}$ are also quite similar but less noisy with better pronounced peaks than VSM1$_i^2$.

Nevertheless, for fast and quick, or coarse, value significance evaluation of the higher order calculation one can conveniently use Eq. 27. However, for better results perhaps it can safely be stated that VSM2$_i^2$ (Association Significance Number ASN, or using COPs) is a good compromise in terms of the quality and calculation complexity.

Considering that one motivation for calculating the VSMx$^{l|k}$, e.g. VSMx$_i^{2|1}$, is to select the most merit-full partitions from the composition for the desired application, e.g. as a distilled representatives of the body of knowledge of the input composition. Hence VSMx are more useful when they are normalized. Therefore slight change in the normalized values of VSMx$_i^{k|\ldots or\ l}$ ... can change the outcome of the applications that uses these values quite considerably.

Also important is that either of CEM1$^{k|l}$ or CEM2$^{k|l}$ can be also used (after multiplying either one by FO$_i^{k|l}$) for measuring and evaluating the real information of the composition in terms of bits which could be considered as yet another measure of value significance for the whole composition or the partitions therein.

It should be emphasized here also that the results depicted in FIG. 3a, 3c, observations, and the interpretations are for a very particular input composition and should not be viewed as general behaviors of the functions and objects that are introduced in this invention. They are only depicted here to show exemplary illustrating ways of investigating the results and the computations of the functions and mathematical objects of the invention.

Again depends on the application and the system capability performing the method and the algorithm one can chose the suitable VSM for that particular application.

In regards to VSM evaluation of higher order OSs in general, yet more conveniently, (also for faster computation), after evaluating the value significance measures of OSs of order l, from the participation information contained in PM$^{kl}$, one can proceed to evaluate the Value Significance Measures (VSMx) of OSs of other orders, say OSs of the order l+r and |r|≥0, from the VSMx of the OSs of the order l as the following:

$$\text{VSMx}(\text{OS}^{l+r}|\text{VSMx}^{l|k}) = \text{VSMx}^{l+r|(l|k)} = \text{VSMx}^{l|k} \cdot \text{PM}^{l,l+r} \quad (28).$$

FIG. 7, shows the block diagram of the algorithm and the system of calculating value significances for different orders of OSs using VSMx values of other OSs. In this figure at least two participation matrices are built, say one for participation of kth order into lth order, i.e. PM$^{kl}$, and another lth order to (l+r)th order, i.e. PM$^{l(l+r)}$, consequently the VSMx of the lth order OSs is calculated from PM$^{kl}$ which is denoted by VSMx$^{l|k}$ according to our notations in this invention. Having calculated VSMx$^{l|k}$ and using the participation matrix of PM$^{l(l+r)}$ one can proceed to calculate the Value Significance Measures of the (l+r)th order from the Eq. 28. Also shown in the FIG. 7 are databases that store and make it ready for information retrieval of VSM values of OSs of different orders when needed by other parts of the application and/or services. This embodiment is particularly useful for classifying and ranking the documents, webpages, and longer partitions.

Referring to FIG. 8 now it shows an exemplary system, process and application of the present invention. FIG. 8 shows an instance of clustering and ranking, and sorting of a number of webpages fetched from the internet for example, by crawling the internet. This is to demonstrate the process of indexing and consequently easily and efficiently finding the relevant information related to a keyword or a subject matter. This is the familiar but very important application and example of the present invention to be used in search engines. As seen after crawling a number of webpage or documents from the internet (or from any other repository in fact) the pages/documents/compositions are investigated so that the associations of the desired part or partitions of such collections are calculated to other desired OSs of the collection of the compositions. Now, in such a exemplary search engine, once a client enter a query or a keyword, it would be straightforward to find the most relevant document, page, or composition to the input query, i.e. or a target OS.

Referring to FIG. 9 now, it is to demonstrate another important exemplary application. FIG. 9 employs the method and the system for ranking and retrieval of document and webpages for using as a search engine. In this embodiment the crawlers will crawl the web and gather as many webpages as it can or need from the internet. The whole collection can be regarded as a composition (can be called e.g. the internet composition) which will be broken to the constituent webpages and the constituent words, or phrases, or sentences etc. of the webpages. Then construct at least one PM for the collection of the webpages and/or its partitions. In the preferred embodiment using this method the lower order OSs are the words and phrases and the higher order OSs are the sentences, paragraphs and the webpage itself. Calculating the VSM for each webpage then can rank all the webpages based on their real intrinsic value and substance.

As seen in FIG. 9, the system crawl the internet and make a collection of webpages, then proceed with partitioning, parsing and building the participation matrix/matrices of constituent lower order OSs participation to higher order OSs of the internet composition. Then calculate and other data objects such as ASMs or Cops (conditional occurrence probabilities)

All the information such as the composition, partitions, and all the other components and data objects may be stored in computer readable storages for use by the knowledgeable engine. Particularly the at least one participation matrix is advantageously stored since it contain the most important information.

Figure 10A:
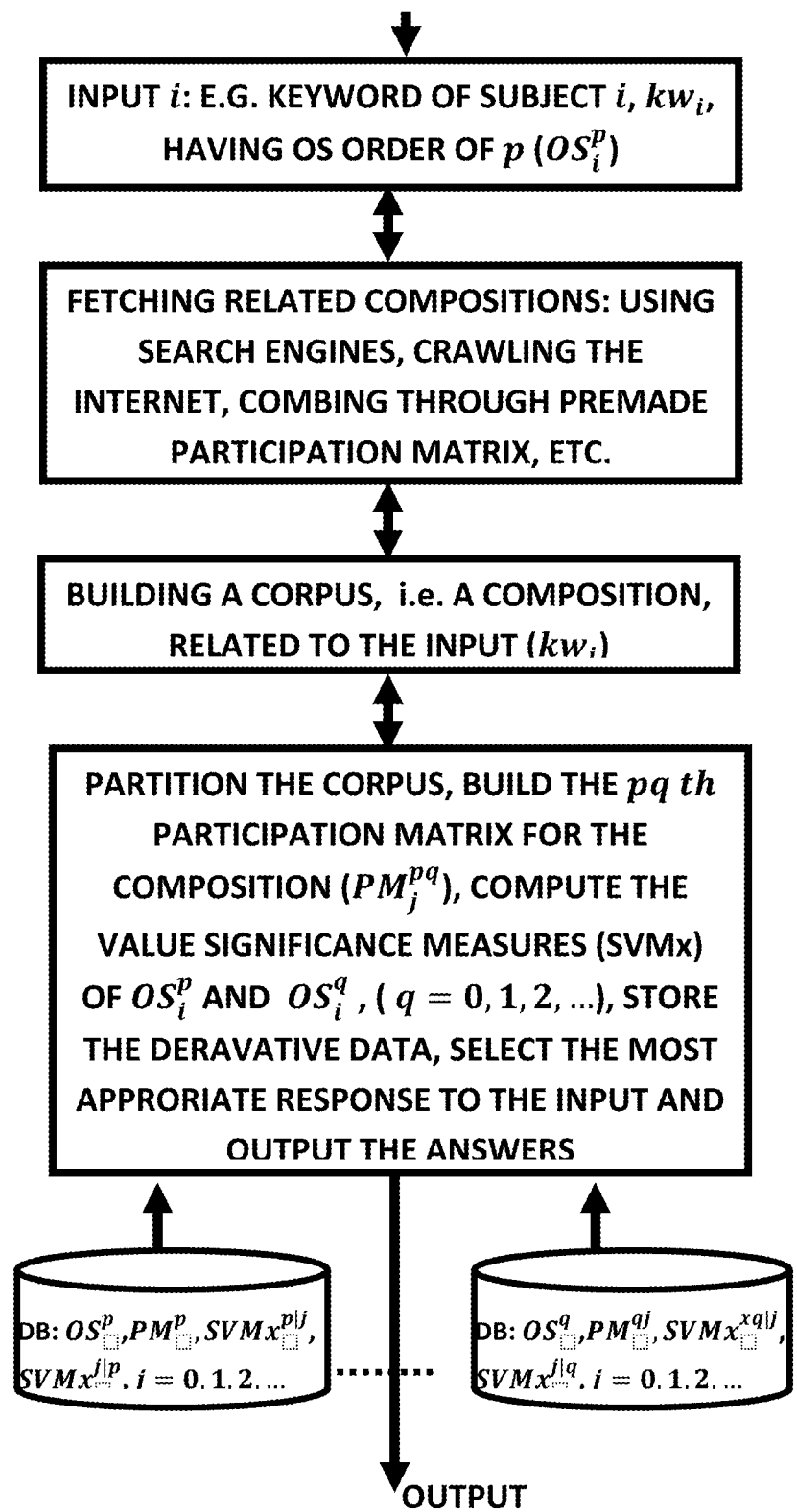
FIG. 10a: shows the block diagram of an exemplary query/answer system which computes and store Value Significance Measures of Ontological subjects of different orders along with all other desired data.

Referring to FIG. 10a now, the figure shows an exemplary block diagram of a system of question answering (having the executable computer code for implementation of the algorithm of FIG. 10 of the incorporated reference the co-pending U.S. patent application Ser. No. 15/805,629) to providing one set of answer to a given query. The output in FIG. 10a is at least one of the outputs of said FIG. 10 of U.S. patent application Ser. No. 15/805,629. A keyword is entered to the system and the system fetch the related compositions of different levels for the input keyword having an OS order of p ($OS_i^p$), make a composition for that keyword, or the key OS, using the composition the system proceed with proceed with calculating all the desired parameters such as VSMx of the partitions or OSs of different orders, and depend upon the predesigned service, provide the appropriate outputs as the response to the query or keyword. Meanwhile the system can store the information in the databases as shown in FIG. 10a to be used for later use. The system can be devised to automatically perform the same for whole lists of keywords, or key OSs offline to make premade databases to be used later by other application programs and/or services.

Figure 10B:
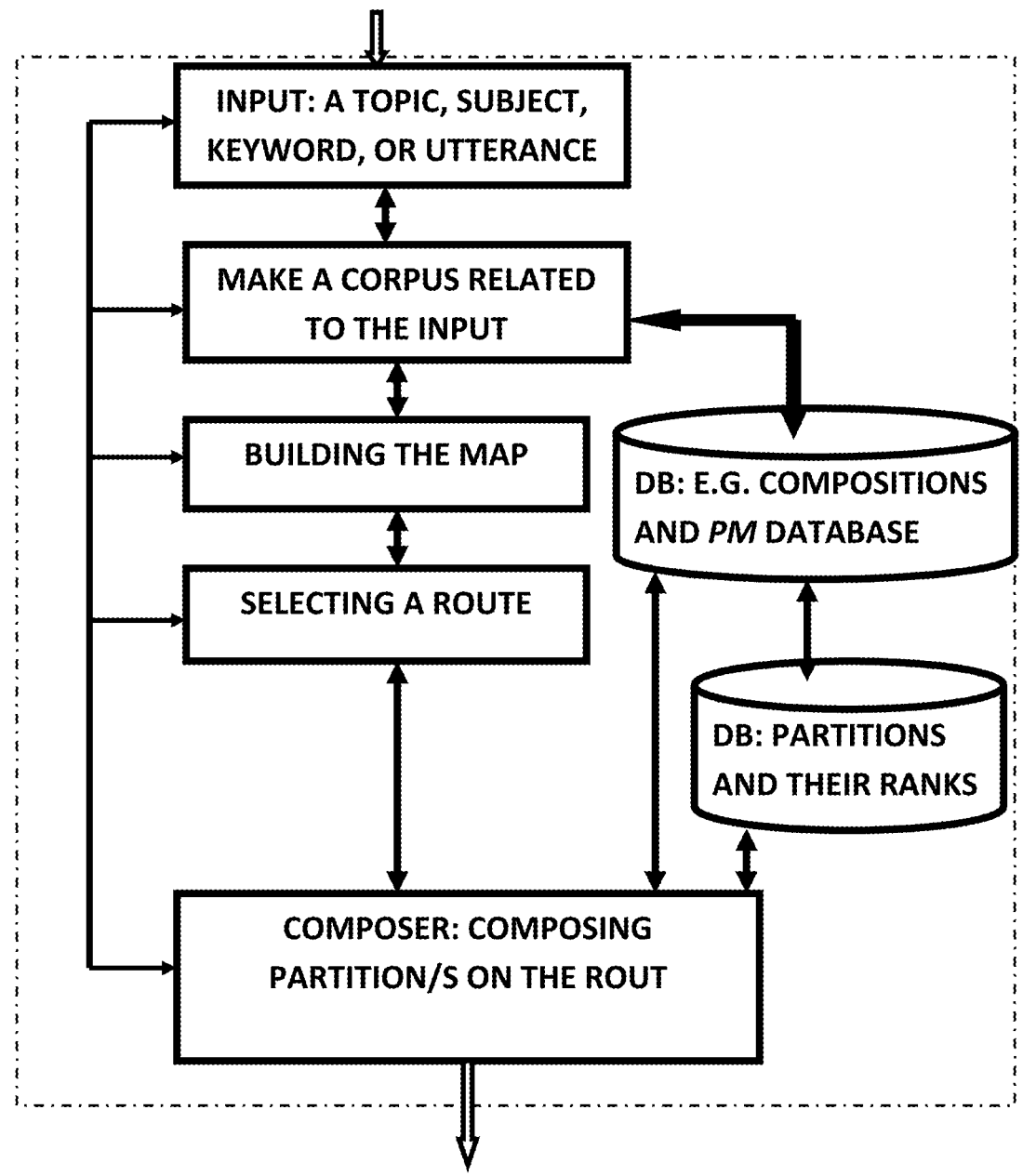
FIGS. 10b and 10c: shows the block diagram of an exemplary content generation system by a composing a context aware content in response to a client input or request.
Figure 10C:
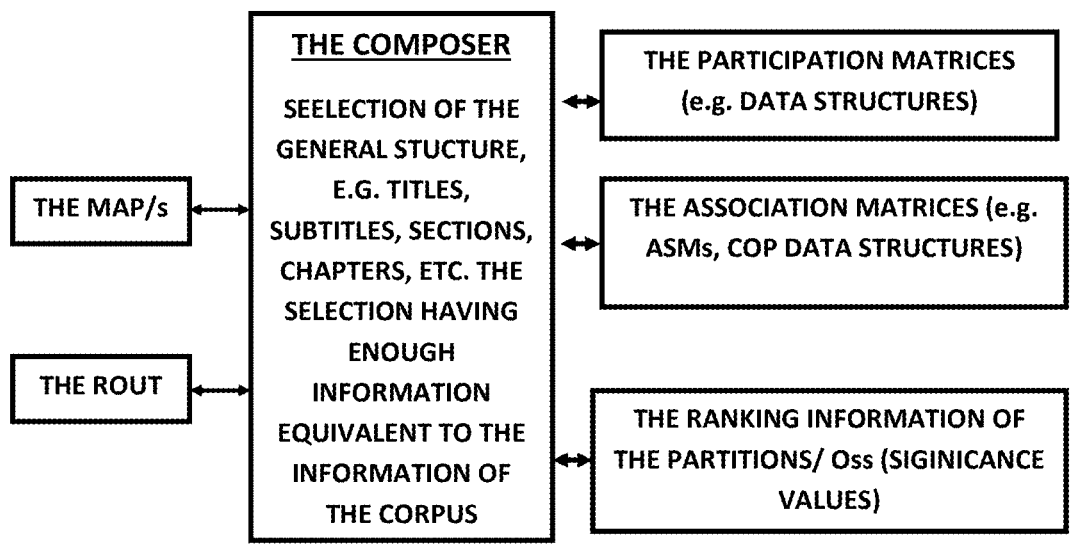
Figure 10D:
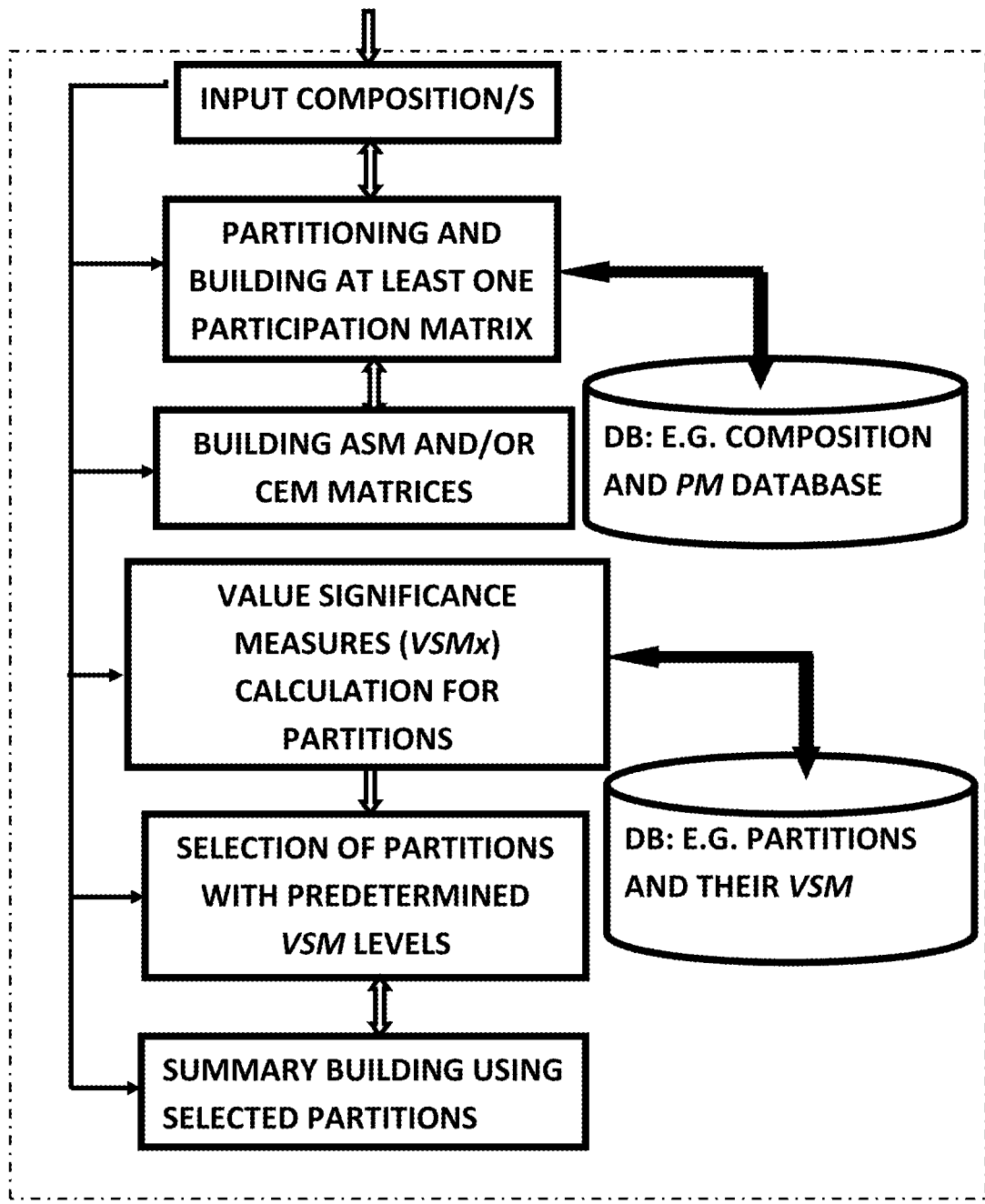
FIG. 10d: is a flowchart of estimating Value Significance Measures (VSMs) of the partitions of a composition following by an exemplary summarization application (which is a general application).

Referring to FIG. 10d now, it shows a block diagram of a general system, application, method and algorithm, of estimating the Value Significance Measure (VSM) of partitions of an input composition, with applications in summarization as described hereinabove and herein below.
Further explanation in reference to FIG. 10d is given by description of an exemplary, and also an important, case of summarization of a single text document in more details.

A composition, e.g. a single document, is entered to the system of FIG. 10d. The system pars the composition, i.e. the document, into words and sentences, and builds the participation matrix showing the participation of each of desired word into some or all sentences of the composition. Then the system, using the algorithm, calculates the COM and ASM and calculates the VSM/s for each sentence. The summarizer then selects the desired number of the sentences (having the desired range of VSM) to represent to a user as the essence, or summary, of the input document. One might choose the different ranges or parts of the VSM for other intended applications.

Referring to FIG. 10d again, the input composition can be a collection of webpages or collection of documents which form a corpus. In this case the output summary is the summary, or distilled form of the corpus. Therefore with the system and method of FIG. 8, single or multi-document, corpus collections and the like, can be summarized, distilled, clustered, or selected as an answer to a question.

At the same time the method and the system can be employed for clustering partitions of the compositions, e.g. sentence in the above case, by simply grouping those partitions having almost the same VSM in the context of the given input composition.

Again in one particular and important case, consider the input composition to be a large number of documents and the preferred PM matrix is built for $PM^{1.5}$ (participation of words, k=1, to document, l=5), which is used to subsequently calculate $VSMx^{5|1}$. The resulting $VSMx^{5|1}$ can therefore be used to separate the documents having the highest merits (e.g. having top substance, most valuable statements, and/or well rounded) within this large collection of the document. In this exemplary case, the winner has the highest VSM after a fair competition, for scoring higher VSMs, with many other documents contained in the collection. Also shown in the FIG. 8 are the databases storing the compositions, participation matrixes, the partitions of the compositions, and the VSMx of the partitions of the composition to be used by other applications, middleware, and/or application servers.

Figure 11:
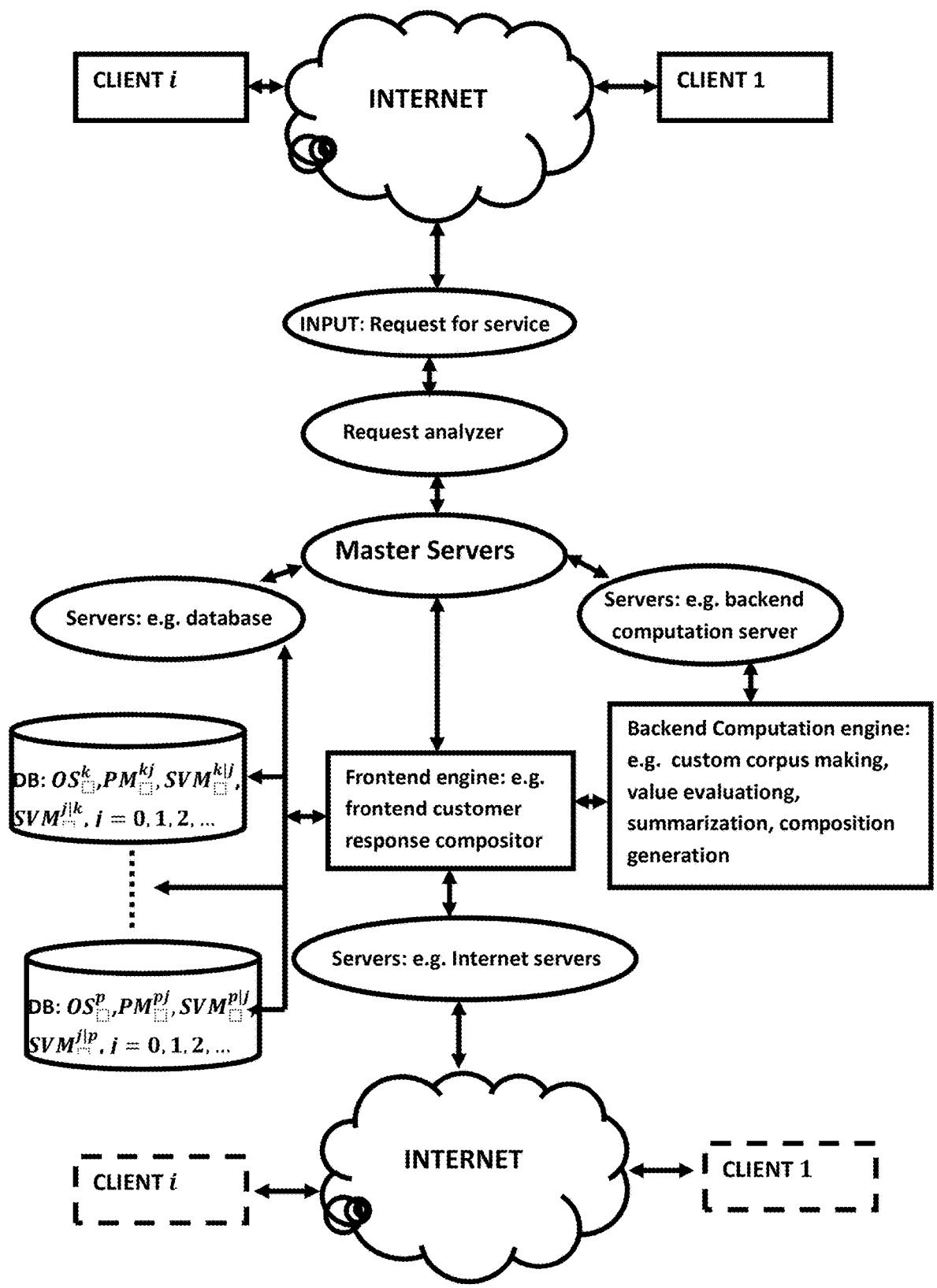
FIG. 11: shows an exemplary client-server type system to fulfill requests of users for services such as composition analysis, summarization, document ranking and comparison, web searching engine, search priority and research trajectory guidance, graphical navigation of knowledge, distilled knowledge answering, knowledge maps and OSM, new document composition, question answering etc.

Referring to FIG. 11 shows an exemplary system of client and server application through internet or any other communication or data networks. As shown the system receives a request for service in predetermined forms or formats such as a keyword, a natural language question, request for summarization, request for list of ranked documents or webpages, or all other types of applications that some were listed before. The system consists of hardware and software programs needed to implement and execute the method and algorithms and to process the requests of clients, such as computer servers and software packages for serving the clients in the frontend or working for the client's request at the backend engine and fulfill the client request. There is a request analyzer which analyze the request and decide where and which one of the server/s is best suited to fulfill the request. The system also can have access to premade databases such as the databases shown in FIG. 11. After processing the client's request the system compose the response/s for the client's request and send it back to the client through internet or any other means of communication or any device and apparatuses suitable to serve the client's requFurthermore many more forms of services can be performed automatically for this exemplary, but important, application such as identifying the most novel piece of the news or the most novel part of the news related to a head category or, as we labeled in this disclosure, to a target OS. Such services can periodically being updated to show the most updated significant and/or novel news content along with their automatic categorization label and/or navigation tools etc.

Figure 12:
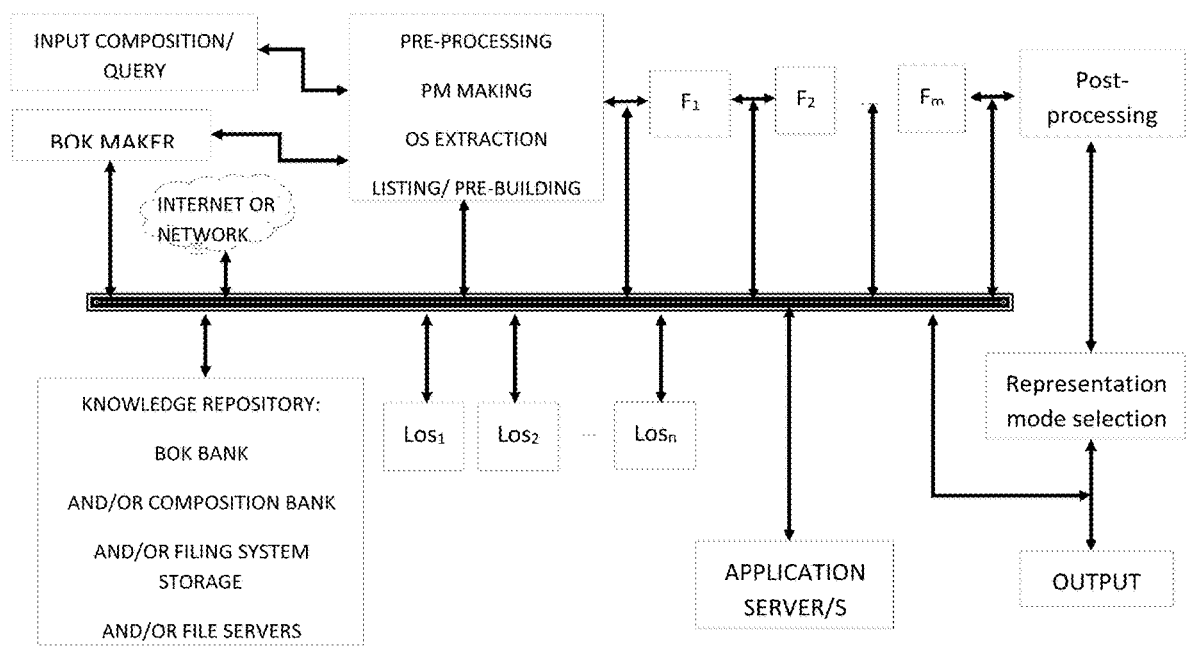
FIG. 12: is another exemplary general system of using the investigator providing various services to the clients over a communication network (e.g. a private or public) according to one embodiment of the present invention. This embodiment shows exemplary general architecture of a system in which one or more of the blocks are optional and can be omitted or one or more blocks can be added.

Referring to FIG. 12 now, it shows one general embodiment of a system implementing the process, methods and algorithms of the present invention to provide one or more services or output to the clients. This figure further illustrates the method that a particular output or service can in practice being implemented. The provider of the service or the outputs can basically utilizes various measures to select from or use the various measures to synthesize the desired sought after part/s of an input compositions. A feature to be noticed in this embodiment is that the system not only might accept an input composition for investigation but also have access to banks of BOKs if the service calls for additional resources related to the input composition or as result of input composition investigation and the mode of the service. Moreover as shown the exemplary embodiment of system of FIG. 12 has a BOK assembler that is able to assemble a BOK from various sources, such as internet or other repositories, in response to an input request and performs the methods of the present invention to provide an appropriate service or output data or content to one or more client. The filtration can be done is several parallel or tandem stages and the output could be provided after any number the step/s of filtrations. The filters $F_1, F_2, \ldots F_n$ can be one of the significance measures or any combinations of them so as to capture the sought after knowledge, information, data, partitions from the compositions. The output and the choice of the filter can be identified by the client or user as an option beside several defaults modes of the services of the system.

Another block in the FIG. 12 to mention is the post-processing block that in fact has the responsibility to transform the output of the filter/s into a predetermined format, or transform the output semantically, or basically composing a new composition as a presentable response to a client from the output/s of the filters of the FIG. 15. Also shown in this exemplary embodiment there is a representation mode selection that based on the selected service the output is tailored for that service and the client in terms of, for instance, transmission mode, web-interfacing style, frontend engineering and designs, etc.

Furthermore the exemplary system embodiment of FIG. 12 shows a network bus that facilitate the data exchange between the various parts of the system such as the BOK bank (e.g. containing file servers) and/or other storages (e.g. storages of $Los_1$, $Los_2$, $Los_3$, etc. and/or list storage/data wherein Los stands for List of the Ontological Subjects and, for instance, $Los_1$ refers to the list of the OSs of order 1) and/or the processing engine/s and/or application servers and/or the connection to internet and/or connection to other networks.

Figure 13:
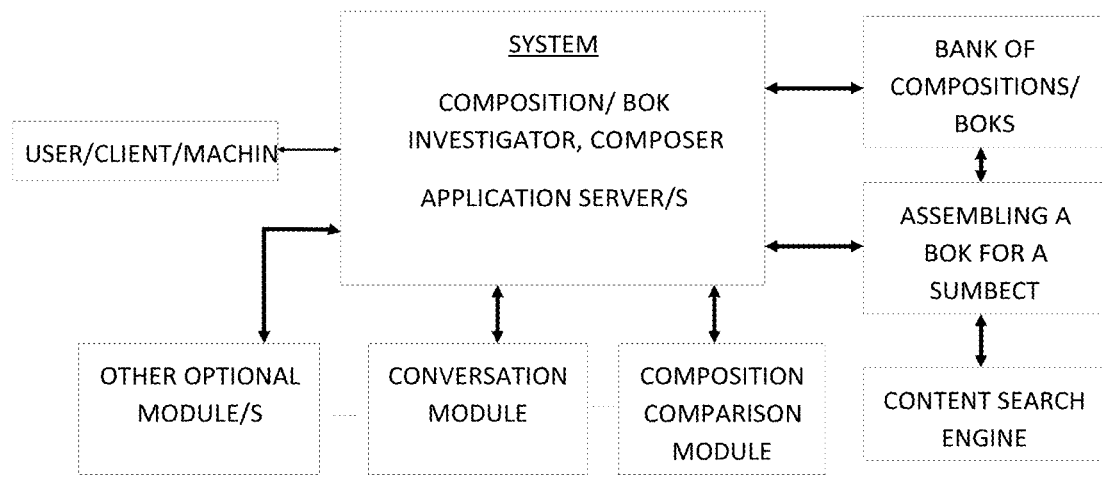
FIG. 13: is another exemplary block diagram of a composition investigation service for a client request for service according to one embodiment of the present invention. One or more functional modules can be still added to this embodiment and/or one or more of the modules can be removed or disabled.

FIG. 13 shows another general embodiment block diagram of a system providing at least one service to a client. In this figure there is a composition investigator wherein the investigator has access to a bank of bodies of knowledge or has access to one or modulus that can assemble a body of knowledge for client. Such said module can for example use search engines to assemble their BOK or from another repository or database. The system can also provide one or more of the services of the FIG. 13 to a client. For instance the system is connected to the client through communication means such as private or public data networks, wireless connection, internet and the like and either can receive a composition from the client or the system can assemble a composition or a body of knowledge for the client and/or the system can enrich or add materials to the client's input composition and perform the investigation and provide the result to the client. For example, by investigating the input composition from the client or user, the system can automatically identifies the related subject matters to the input composition and go on to assemble one or more BOK related to at least one of the dominant OSs of the input composition and offer further services or output such as the information regarding the degree of novelty of the input composition in comparison to one or more of said BOK/s and/or score the input composition in terms of credibility or overall OSore of the merits of the input compositions in comparison to the said BOK/s and/or identify the substantially valuable and/or novelty valuable part or partitions of the input composition back to the user or other clients or agents. In light of the disclosed algorithms and method/s of the composition investigation there could be provided a software/hardware module for composition comparisons that provide one or more of the services or the output data of the just exemplified application.

The mentioned exemplary application and service can, for instance, be of immense value to the content creators, genetic scientists, or editors and referees of scientific journals or in principal to any publishing/broadcasting shops such as printed or online publishing websites, online journals, online content sharing and the like.

Such a system can further provide, for instance, a web interface with required facilities for client's interaction/s with the system so as to send and receive the desired data and to select one or more desired services from the system.

Also as shown in the FIG. 13, other optional modulus can be made available to the client that uses the main composition investigator and or the BOK assembler or BOK banks. One of such optional modulus can be a module for client and computer or the client and system converse or conversation. The conversations is done in such a way that the system of this exemplary embodiment with the "converse module" receives an input from a client and identifies the main subject/s of the input and provide a related answer with the highest merit selected from its own bank of BOK/s or a particular BOK or an available composition. The response from the system to the client can be tuned in such a way to always provide a related content according to a predetermined particular aspect of the conversation. For example, the client might choose to receive only the content with highest novelty yet credibility value from the system. In this case the "converse module" and/or the investigator module will find the corresponding piece of content (employing one or more of the "XY value significant measure") from their repositories and provided to the user. Alternatively, for instance, the user can demand to receive the most significant yet credible piece of knowledge or content related to her/his/it's input. The client/system conversation, hence, can be continued. Such conversation method can be useful and instrumental for variety of reasons/applications such as entertainment, amusement, educational purpose, questions and answering, knowledge seeking, customer relationship management and help desk, automatic examination, artificial intelligence, and very many other purposes.

In light of the teaching of this disclosure, such exemplified modules and services can readily be implemented by those skilled in the art by, for instance, employing or synthesizing one or more the value significance measures, and the disclosed methods of investigation, filtration, and modification of composition or bodies of knowledge.

II-V—Knowledgeable Systems and Machines

Figure 14:
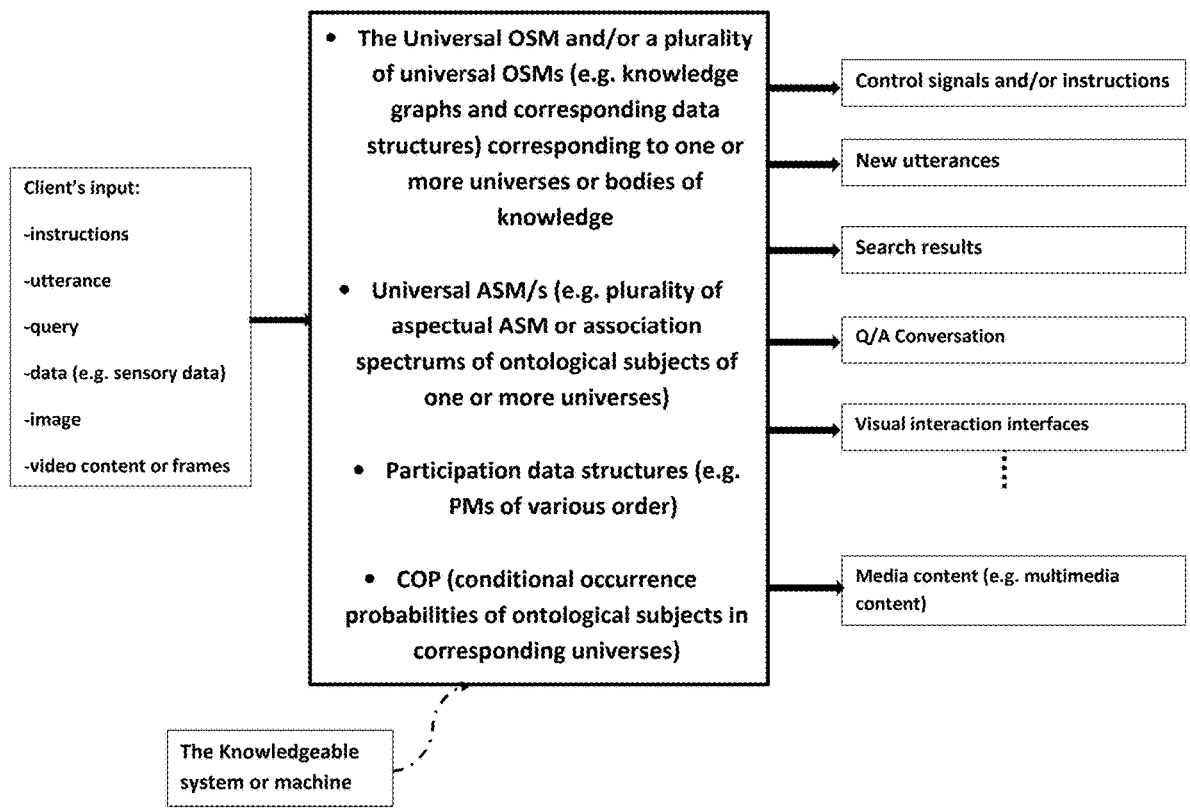
FIG. 14: shows an exemplary block diagram and flow process of a knowledgeable machine system enabling to provide various outputs or services to a client's input or request.

Referring to FIG. 14 now, it shows one exemplary instance or embodiment of a knowledgeable machine as a result of exercising the teachings and/or executing the methods of the present disclosure to build a system that is aware of universal context and the relationships of ontological subjects of such universe, to each other and their aspectual significances, along with stored, or access to, participation and derivative data structures of one or more universes can perform many of the exemplified applications (e.g. FIGS. 10b-10d or . . . ). The system of FIG. 14 therefore is knowledgeable and can employed and utilized as a knowledgeable consul in many applications some which is depicted in the FIG. 14. Having access to participation data, association strength of ontological subjects of universes to each other, and conditional occurrence probabilities, then the system is enabled to first understand the context of a request or an input, and as the result being able to utter or output a composition related and relevant to the request by further using the data of association strength strengths and conditional occurrence probabilities.

For instance in the U.S. patent application Ser. No. 14/018,102, which is incorporated as reference, it is shown on how to plan to compose a new content using association data by determining a relevant body of knowledge (i.e. a relevant universe), and identifying significant ontological subjects of that universe according to the desired aspectual value significance, and construct a rout for producing a new content or composition having desired characteristics such as being informative, or authoritative, or novel.

Further, for another instance in the U.S. patent application Ser. No. 12/908,856, which is incorporated as reference, it is shown on how to generate or compose a new multimedia content which is engaging, informative and entertaining perhaps form a given input or request or content.

For instance, FIG. 10b schematically shows one exemplary the method of producing a new composition according to the teachings of the present invention and the incorporated reference herein.

In another instance, FIG. 10c schematically shows one exemplary the method of producing a new composition in the form of a summary of body of knowledge according to the teachings of the present invention and the incorporated reference herein.

In another instance, FIG. 10d schematically shows one exemplary the method of producing a new composition in the form of utterance or conversation according to the teachings of the present invention and the incorporated reference herein.

Again the method uses the knowledge that gained from investigation and learning, and generating derivative data from one or more universes as explained in great details, for instance in the incorporated reference the U.S. patent application Ser. No. 13/608,333 filed on Sep. 10, 2012. Said application introduce several enabling types of associations, transformations, and conditional associations of ontological subjects of one or more universes.

For instance, for utterance, a language model perhaps is helpful to make sure that the utterance is not only relevant but also familiar (e.g. in syntax, and grammar) to a human client. However, it is worth mentioning that a language model (e.g. a language model for a natural language such as English) can be readily developed for any language by analyzing the one or more compositions composed using that language using the knowledge gained from processing the bodies of knowledge as set forward in, for instance, said reference U.S. patent application Ser. No. 13/608,333.

All these features enables an artisan to construct a knowledgeable system or machine capable of performing various task that exhibits knowledge and intelligence from the built system.

Accordingly in FIG. 14, there is shown the knowledgeable system which provide a variety of services and outputs that is expected from a knowledgeable/intelligent entity.

III—Exemplary Applications

Few exemplary applications of the methods and the systems disclosed here are listed below, which are intended for further emphasize and illustration only and not meant neither as an exhaustive list of applications nor as being restricted to these applications only.

1. Clustering of compositions or their partitions: one of the applications is clustering of compositions versus their constituent ontological subjects having a predetermined level of VSMs values.
2. Composition ranking: another obvious application is ranking of compositions among a collection of compositions to be used in search engines, information and document retrieval, optimum database storing etc. Simply put a composition having the highest evaluated VSMs rank higher among a set of compositions.
3. Summarizations: selecting a number of OSs of a desired order, having a desired range of one or more of the VSMs, and proper choice of ASMs, COPs, from the set of partitions of a composition, a corpus, or a collection, as the summary representation of the composition, corpus, or the collection.
4. Multimedia content generation: selecting a number of OSs of a desired order and desired types (e.g. visual, textual audial) having a desired range of one or more of the VSMs, and proper choice of ASMs, COPs, from the ontological subjects of one or more universe containing various types of ontological subjects (by type we mean either visual OS, or textual or audial) and composing a new multimedia content that is meaningful, informative, and relevant to the client request.
5. Distillations: finding the essence of corpus or a collection of compositions by one or more stages of summarization.
6. Man-machine conversation: while being context ware.
7. Novelty detection: using the association strength and one or more of the VSMs one can spot a novelty depend on the levels of the ranking parameters corresponding to the partitions of the composition. For instance spotting a novelty based one observing a strong association of an OS with low VSM with an OS of high VSM.
8. Main bulk detection of corpuses or compositions: selecting a number of OSs, i.e. the partitions of the composition, having predetermined value significance, e.g. having values around the predetermined range of one or more of the VSMs, for representing the bulk or main body of a corpus or a clustered group of composition related to topic etc.
9. Background information of corpus: selecting a number of OSs, i.e. the partitions of the composition, having predetermined value significance, e.g. having the high VSMs, for representing the verified facts and basic background of a corpus or a clustered group of composition related to a topic etc.
10. Automatic Document Generation: selecting a number of OSs having a predetermined spectrum, e.g. highest, average, lowest of VSMs, i.e. having semantic importance in the composition, or having certain quantity of association strength with one or more particular OSs, for representation and to compose a new document representing the whole corpus covering the desired aspects, (e.g. novel, bulk, background or any combination) of a corpus or a clustered group of composition related to a topic etc.
11. Verified true statements: assuming one have a corpus or a collection of document as the initial composition which is broken to partitions such as words and sentences or statements, then clustering the partitions based on containing one or more keywords, then those partitions or statements that have the highest VSMs can be considered as the true statements expressing facts or true statements related to those keywords contained in the partitions. The true statements corresponding to the keywords may further be stored in databases as premade repositories for using, for instance, by a client server system of services.

12. Question answering: having stored the true statements about one or more keywords, then a question answering engine system can use these statements as the answers to the questions containing the keywords used in the corresponding true statements that have been stored in the databases.
13. Document comparison: using the ranking method disclosed in here one can cluster the documents and further ranks the partitions therein and identifies the partitions as novel, true background, and descriptive, one then can characterize the documents in comparisons to large collection of documents or to each other as being, for instance, novel or deOSriptive among a set of the same etc.
14. Ontology database building: in a similar fashion to finding the verified true statements related to keywords one can build databases as repositories of knowledge about entities or subject matters as well as their relations.
15. DNA sequence interpretation: considering a DNA sequence as a composition, and breaking this composition to OSs of desired orders in order to look for patterns and locations of DNA pieces having predetermined ranges of VSMs, i.e. semantic importance range. The method and the associated system in the form of computer hardware and programs can be used for gene detection, genome summarization, gene ranking, junk DNA detection, genetic modification and engineering, etc.
16. Signal processing: using any form of symbols for representation of physical signals one can make a composition and rank the OSs of the composition for using in different applications and processing of the signal. The method can be used for processing audio and video signals for feature extraction, recognition, pattern recognition, summarizations, compression, conversion from one form to another form of signal etc.
17. New essay or composition generation: new compositions or well written essay can be generated using the generated databases for the listed applications and using the association of the OSs.
18. Mapping OSs of different nature to each other: databases of OSs of different nature, e.g. text and video signal, having similar semantic and syntactic functions can be stored and converted to each other. For example one can build equivalent compositions from text and video signals which can convey the same semantic message.
19. Market research and market analysis: a market research analyst can gather all or some of the contents that are available about an industry, a particular enterprise, a particular product etc. and investigate the real value of all the entities that are related to the industry of the enterprise or the product and from the VSMs evaluation of the OSs of those content have a good evaluation of intrinsic value of the OSs (e.g. the entity or any attribute etc.) of interest. So he can make a corpus containing a desired number of contents containing the OS or OSs of the interest by using for instance a search engine.
20. Social networks and social graph analysis of importance and influence: another example is a social network or social graph in which the OSs of interests are people. So the textual OSs of interests are in fact individual names for which a graph and an association matrix can be obtained from the participation matrices. For instance the Facebook or LinkedIn social graphs or any other social graph or network show the connection of people to each other from which one can build an adjacency matrix for the graph or make an association matrix from their popularity. However the association matrix built from that adjacency matrix is not accurate since those social graphs only show the connections between two people but do not have a way to measure their real association strength with each other. An association strength evaluation or other value significance estimations that disclosed in this invention can be used to more effectively and accurately evaluate the value, or influence significance, of each person in the graph, or finding the connections that have high association strength with each individual in the social graph. A more accurate approach that can show a better indication of the association between two members would be using the actual text or messages that have been exchanged between the two. The value of each person on the graph then is evaluated from the association strength matrix by building the participation matrices and that are extracted from the correspondences of the members of the social network.
21. Identifying research priorities: As described any composition of ontological subjects in the forms of symbols and signal can be transformed to a set of ontological subjects having the common feature of taking part in a composition or a set of compositions. The compositions were further reduced to one or more participation matrices from which useful information about the individual OSs as well the partitions of the compositions can be obtained. After determining the most valuable (e.g. influential OS of the network) the links that connects the high value OSs become important for further investigations and analysis or guidance to knowledge discovery.
22. Personalized advertisement: Another application is personalized advertisement for delivering the right message to the right person. For instance an advertising system can be devised to deliver dynamic content to the user according to their associations bonds and significances.
23. Legal and fraud investigation: legal issues such as criminal investigations, abnormal behavior detection, fraud detections etc. can be done more effectively by having evaluated the relationships and association strength of the subjects and their value significances from the collected data and information corresponding to the subject under investigation.
24. Obtaining the context: having evaluated the value significances of the OSs, e.g. entities and concepts, of a composition and then having evaluated the association strengths of the OSs to each other, one can quickly obtain the real context of the composition and find the role of each OS, e.g. each entity, in this context by looking at the highest value OSs and their strongest associations; and
25. Many other applications described and disclosed in the incorporated references.

In summary, the invention provides a unified and integrated method and systems for constructing knowledgeable systems and machines capable of being aware and having the knowledge of ontological subjects of one or more universe (e.g. bodies of data/knowledge, domains etc.). More importantly the method is language independent and grammar free. The method is not based on the semantic and syntactic roles of symbols, words, or in general the syntactic role of the ontological subjects of the composition. This will make the method very process efficient, language independent, without a need to use syntactic or semantic rules of a particular language, applicable to all types of compositions and languages, and very effective in finding valuable pieces of knowledge embodied in the compositions of all types and natures.

The knowledgeable systems and the presented methods of enabling such systems have numerous applications in knowledge discovery, intelligent assistants, and artificial intelligent beings and their usages.

Those familiar with the art can yet envision, alter, and use the methods and systems of this invention in various situations and for many other applications. It is understood that the preferred or exemplary embodiments, the applications, and examples described herein are given to illustrate the principles of the invention and should not be construed as limiting its scope. Various modifications to the specific embodiments could be introduced by those skilled in the art without departing from the scope and spirit of the invention as set forth in the following claims.

What is claimed is:

1. A knowledgeable system comprising:
one or more data processing devices or computing devices, communicatively or operatively coupled to, one or more non-transitory computer readable storage media, configured to provide:
one or more data structures, corresponding to participations of ontological subjects of predefined orders, of one or more universes, into each other, and is built by executing a set of computer executable instructions comprising:
instructions to access a collection of content forming the one or more universes;
instructions for partitioning the collection of content to one or more pluralities of partitions, wherein at least one plurality of partitions is assigned with a predefined ontological subject order,
obtaining ontological subjects of at least one predefined order, instructions for building one or more data structures corresponding to least one participation pattern of the ontological subjects of predefined order, k into the partitions of said order l, which can be denoted by $PM^{k|l}$,
one or more data structures corresponding to association strengths between the ontological subjects of the said one or more universes, wherein the association strength data structure, denoted by $ASM^{k|l}$, is calculated by processing the said data structures corresponding to least one participation pattern,
one or more data structures corresponding to conditional occurrence probabilities of said ontological subjects, wherein the conditional occurrence probabilities, which can be denoted by $COP^{k|l}$, wherein the entries are given by:

$$cop^{k|l}(i|j) = \frac{iop_i^{k|l} \cdot asm_{ji}^{k|l}}{\sum_q iop_q^{k|l} \cdot asm_{qi}^{k|l}}$$

wherein the $cop^{k|l}$ (i|j) is the conditional occurrence probability of ontological subject of ith of order k given the occurrence of ontological subject of jth of order k in a partition or ontological subject of order l, wherein $iop_i^{k|l}$ and $iop_q^{k|l}$ are the independent probability of occurrences of ontological subject of ith, a qth, of order k, respectively, and $asm_{ji}^{k|l}$ are the individual entries of said data structure $ASM^{k|l}$;
accessing a client request comprising input content;
identifying a context or a universe corresponding to said client request;
using said one or more data processing devices or computing devices to generate a data structure corresponding to one or more composing routes or maps by processing at least one of said data structures corresponding to said participations of ontological subjects of different order into each other, said association strengths, and said conditional occurrence probabilities;
and
output one or more composition of ontological subjects by processing the client's request and one or more of, said one or more composing routes or maps, said data structures corresponding to at least one of said participations, said association strengths, and said conditional occurrence probabilities.

2. The knowledgeable system of claim 1 further comprising access to one or more data structures corresponding to ontological subject map of one or more universes.

3. The knowledgeable system of claim 1, wherein said association strengths of the ontological subjects is a function of number of co-occurrences, in one or more partitions of the compositions, of at least a pair of the ontological subjects and the number of occurrences, in one or more partitions of the compositions, of at least one of the ontological subjects of the pair, wherein said calculated value is an indicative of association strength of the pair of ontological subjects and are represented by one or more data structures.

4. The system of claim 1, further comprising one or more data structures corresponding to information value significance of first type conditional entropy measure which can be denoted by $H2_i^{k|l}$ and is given by:

$$H1_i^{k|l} = -\sum_j iop_j^{k|l} \cdot cop^{k|l}(i|j) \log_2\left(cop^{k|l}(i|j)\right), i, j = 1 \ldots N$$

wherein $H1_i^{k|l}$ is the first type conditional entropy of ith ontological subject of order k, the $cop^{k|l}$ (i|j) is the conditional occurrence probability of ontological subject of ith of order k given the occurrence of ontological subject of jth of order k in a partition or order l, wherein $iop_j^{k|l}$ is the independent probability of occurrences of jth ontological subject of order k, in the partitions or ontological subjects of order l.

5. The system of claim 1, further comprising one or more information value of second type Conditional Entropy Measure" which can be denoted by $H2_i^{k|l}$ and is given by:

$$H2_i^{k|l} = -iop_i^{k|l} \Sigma_j cop^{k|l}(j|i) \log_2(cop^{k|l}(j|i)), i,j=1 \ldots N$$

wherein $H2_i^{k|l}$ is the second type conditional entropy of ith ontological subject of order k, the $cop^{k|l}$ (j|i) is the conditional occurrence probability of ontological subject of jth of order k given the occurrence of ontological subject of ith of order k in a partition or ontological subject of order l, wherein $iop_i^{k|l}$ is the independent probability of occurrences of ith ontological subject of order k, in the partitions or ontological subjects of order l.

6. The system of claim 1, wherein said collection of content further comprises the client input content and/or a collection of content that is assembled in response to the client input.

7. A method of facilitating a service by a knowledgeable system for a client over a computer network, comprising:
  providing an access for the client over the network, said network carries, transmit, or transport data at least at the rate of 10 million bits per second (Mbps)
  receiving an input from the client, said input cause to identify the network address of a provider of said service;
  exchanging signals or data between the client and provider of said service, wherein said service is performed by at least one computer program executed by one or more data processing device or computing devices, wherein said one or more data processing device or computing devices having at least a singular or compound processing speed of 1 gigahertz (Ghz), to process a composition and provides one or more of:
    one or more data structures, corresponding to participations of ontological subjects of predefined orders, of one or more universes, into each other, and is built by executing a set of computer executable instructions comprising:
      instructions to access a collection of content forming the one or more universes;
      instructions for partitioning the collection of content to one or more pluralities of partitions, wherein at least one plurality of partitions is assigned with a predefined ontological subject order, l,
      obtaining ontological subjects of at least one predefined order, k,
      instructions for building one or more data structures corresponding to least one the participation pattern of ontological subjects of predefined order, into the partitions of said order l, which can be denoted by $PM^{k|l}$,
    one or more data structures corresponding to association strengths between the ontological subjects of the said one or more universes, wherein the association strength data structure, which can be denoted by $ASM^{k|l}$, is calculated by processing the said data structures corresponding to least one participation pattern,
    one or more data structures corresponding to conditional occurrence probabilities of said ontological subjects, wherein the conditional occurrence probabilities, $COP^{k|l}$, wherein the entries are given by are given by:

$$cop^{k|l}(i|j) = \frac{iop_i^{k|l} \cdot asm_{ji}^{k|l}}{\sum_q iop_q^{k|l} \cdot asm_{qi}^{k|l}}$$

wherein the $cop^{k|l}(i|j)$ is the conditional occurrence probability of ontological subject of ith of order k given the occurrence of ontological subject of jth of order k in a partition or ontological subject of order l, wherein $iop_i^{k|l}$ and $iop_q^{k|l}$ are the independent probability of occurrences of ontological subject of ith, a qth, of order k, respectively, and $asm_{ji}^{k|l}$ are the individual entries of said data structure $ASM^{k|l}$;
    one or more data structures corresponding to value significances of the ontological subjects of the compositions,
  access a client comprising input content;
  identifying a context or a universe corresponding to said client request;
  using said one or more data processing devices or computing devices generating a data structure corresponding to one or more composing routes or maps by processing at least one of said data structures corresponding to said participations of ontological subjects of different order into each other and said value significances of oncological subjects of the composition;
  composing a response content by processing the client request and one or more of, said one or more composing routes or maps, said data structures corresponding to at least one of said participations and said value significances of oncological subjects of the composition; and
  transmitting the response content back to the provider of the service or the client.

8. The method of claim 7, wherein said client is a computer program having instructions executable by a computer system over the network, said computer system comprising a computer-readable storage medium and at least one data processing device, capable of executing the instructions of at least one computer program embedded thereon.

9. The method of claim 7, wherein provider of the service is at least one computer program having instructions executable by a computer system over the network, said computer system comprising a computer-readable storage medium and one or more data processing or computing devices, capable of executing the instructions of at least one computer program embedded thereon.

10. The method of claim 7, further comprising: providing one or more data structure corresponding to the association strengths of the ontological subjects of the composition.

11. The method of claim 10, further comprising: providing one or more data structures, corresponding to visually displayable graph or network of graphical objects, whose data values are calculated as a function of said association strengths of the ontological subjects of the composition.

12. The method of claim 7, further comprising: providing one or more data structure corresponding to the association strengths of the ontological subjects of the composition having different predefined ontological subject order.

13. The method of claim 7, wherein one of said value significances first type Conditional Entropy Measure which can be denoted by $H2_i^{k|l}$ and is given by:

$$H1_i^{k|l} = -\sum_j iop_j^{k|l} \cdot cop^{k|l}(i|j) \log_2(cop^{k|l}(i|j)), \, i,j = 1 \ldots N$$

wherein $H1_i^{k|l}$ is the first type conditional entropy of ith ontological subject of order k, the $cop^{k|l}(i|j)$ is the conditional occurrence probability of ontological subject of ith of order k given the occurrence of ontological subject of jth of order k in a partition or ontological subject of order l, wherein $iop_j^{k|l}$ is the independent probability of occurrences of jth ontological subject of order k, in the partitions or ontological subjects of order l.

14. The method of claim 7, wherein one of said value significances second type Conditional Entropy Measure" which can be denoted by $H2_i^{k|l}$ and is given by:

$$H2_i^{k|l} = -iop_i^{k|l} \Sigma_j cop^{k|l}(j|i) \log_2(cop^{k|l}(j|i)), \, i,j = 1 \ldots N$$

wherein $H2_i^{k|l}$ is the second type conditional entropy of ith ontological subject of order k, the $cop^{k|l}(j|i)$ is the conditional occurrence probability of ontological subject of jth of order k given the occurrence of ontological subject of ith of order k in a partition or ontological subject of order l, wherein $iop_i^{k|l}$ is the independent probability of occurrences of ith ontological subject of order k, in the partitions or ontological subjects of order l.

* * * * *